(12) United States Patent
Hayashi et al.

(10) Patent No.: US 6,458,453 B1
(45) Date of Patent: Oct. 1, 2002

(54) MAGNETIC RECORDING MEDIUM

(75) Inventors: Kazuyuki Hayashi; Hiroko Morii, both of Hiroshima; Mamoru Kamigaki, Kure; Seiji Ishitani, Hiroshima, all of (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/557,881

(22) Filed: Apr. 25, 2000

(30) Foreign Application Priority Data

| Apr. 30, 1999 | (JP) | 11-125109 |
| Apr. 30, 1999 | (JP) | 11-125115 |
| Apr. 30, 1999 | (JP) | 11-125116 |
| Nov. 16, 1999 | (JP) | 11-326190 |

(51) Int. Cl.$^7$ .............................................. G11B 5/708
(52) U.S. Cl. ................. 428/323; 428/403; 428/405; 428/694 BN; 428/402; 106/287.1; 106/287.13
(58) Field of Search ............... 106/287.12, 287.13, 106/287.1; 428/403, 405, 694 BN, 323, 402; 252/62.55, 62.56

(56) References Cited

U.S. PATENT DOCUMENTS

| 4,089,882 A | * | 5/1978 | Takamizawa et al. | 556/479 |
| 4,482,623 A | * | 11/1984 | Tabaru et al. | 430/137 |
| 4,822,850 A | * | 4/1989 | Yashuda et al. | 528/28 |
| 5,137,783 A | * | 8/1992 | Tanihara et al. | 428/407 |
| 5,286,291 A | * | 2/1994 | Bernhardt et al. | 106/474 |
| 5,686,012 A | * | 11/1997 | Hayashi et al. | 252/62.56 |
| 5,876,833 A | * | 3/1999 | Suzuki et al. | 428/141 |
| 6,024,789 A | * | 2/2000 | Kwan et al. | 106/460 |
| 6,132,743 A | * | 10/2000 | Kuroda et al. | 424/401 |
| 6,143,403 A | * | 11/2000 | Ejiri et al. | 428/323 |

FOREIGN PATENT DOCUMENTS

| EP | 0165076 A2 | 12/1985 |
| EP | 0176368 A2 | 4/1986 |
| EP | 0825235 A2 | 2/1998 |
| EP | 0913431 A2 | 5/1999 |
| EP | 0957474 A1 | 11/1999 |
| JP | 04157615 A | * 5/1992 |

OTHER PUBLICATIONS

English translation of JP 04–157615A (Kitabake et al.).*

* cited by examiner

*Primary Examiner*—Stevan A. Resan
*Assistant Examiner*—Kevin M. Bernatz
(74) *Attorney, Agent, or Firm*—Nixon & Vanderhye P.C.

(57) ABSTRACT

A magnetic recording medium composed of a non-magnetic base film and a magnetic recording layer containing a binder resin, magnetic particles, and as a filler black composite hematite particles having an average diameter of 0.08 to 1.0 $\mu$m. The composite particles have cores of hematite particles which are surface coated with an organosilicon compound. A carbon black coating is formed on the organosilicon coating layer. In addition, the hematite core particles may have an oxide or hydroxide coating layer formed on the surface of the hematite core particle, between the organosilicon coating layer and the surface of the core particles. The magnetic recording medium has not only an excellent durability and a good electromagnetic performance, but also a low light transmittance, a small surface resistivity and an excellent surface smoothness.

23 Claims, 2 Drawing Sheets

(×20000)

(×20000)

(×20000)

(×20000)

MAGNETIC RECORDING MEDIUM

BACKGROUND OF THE INVENTION

The present invention relates to a magnetic recording medium, and more particularly, to a magnetic recording medium having not only an excellent durability and a good electromagnetic performance, but also a low light transmittance, a small surface resistivity and an excellent surface smoothness, and a filler contained in a magnetic recording layer constituting the magnetic recording medium.

With recent tendencies of miniaturization and weight reduction of video or audio magnetic recording and reproducing apparatuses as well as long-time recording by these apparatuses, magnetic recording media such as magnetic tapes or magnetic discs have been strongly required to have a high performance, namely high recording density, high durability, good electromagnetic performance or the like.

The magnetic recording media such as magnetic tapes or magnetic discs are contacted with a magnetic head upon recording and reproduction, so that a magnetic recording layer thereof tends to be abraded, resulting in contamination of the magnetic head as well as deterioration in recording and reproducing characteristics thereof. For this reason, it has been conventionally demanded to provide high-durability magnetic recording media having a high abrasion resistance.

Hitherto, in order to enhance an abrasion resistance of the magnetic recording layer of magnetic recording media, it has been attempted to incorporate various fillers such as alumina ($Al_2O_3$), hematite ($\alpha$-$Fe_2O_3$) and dichromium trioxide ($Cr_2O_3$) into the magnetic recording layer.

For instance, as magnetic recording media using alumina ($Al_2O_3$), there have been proposed magnetic recording media in which $\alpha$-$Al_2O_3$ particles containing an amorphous phase are used as a filler (Japanese Patent Application Laid-Open (KOKAI) No. 5-36059(1993)), magnetic recording media in which $\alpha$-$Al_2O_3$ particles having a specific crystal structure are used as a filler (Japanese Patent Application Laid-Open (KOKAI) No. 7-244836(1995)) and the like; as magnetic recording media using hematite ($\alpha$-$Fe_2O_3$), there have been proposed magnetic recording media in which granular $\alpha$-$Fe_2O_3$ particles are used as a filler (Japanese Patent Application Laid-Open (KOKAI) No. 61-194628(1986)), magnetic recording media in which liquid hydrocarbon and $\alpha$-$Fe_2O_3$ particles are used (Japanese Patent Application Laid-Open (KOKAI) No. 54-70806 (1979)) and the like; and as magnetic recording media using dichromium trioxide ($Cr_2O_3$), there have been proposed magnetic recording media in which acicular $Cr_2O_3$ particles are used as a filler (Japanese Patent Application Laid-Open (KOKAI) No. 62-112221(1987)) and the like.

Specifically, the magnetic recording medium described in Japanese Patent Application Laid-Open (KOKAI) No. 61-194628(1986) contains magnetic particles having a specific surface area of not less than about 28 $m^2$/g and granular $\alpha$-$Fe_2O_3$ having an average particle diameter of about 0.05 to 1 $\mu$m. This magnetic recording medium is produced by dispersing a mixture composed of 300 parts by weight of Co-coated $\gamma$-$Fe_2O_3$, 38 parts by weight of vinyl chloride-vinyl acetate copolymer, 24 parts by weight of polyurethane resin, 7 parts by weight of stearic acid, one part by weight of silicone oil, a prescribed amount of granular $\alpha$-$Fe_2O_3$ having a predetermined particle size and 800 parts by weight of a mixed solvent containing methyl ethyl ketone and toluene in equal amounts, for 40 minutes using a ball mill to prepare a magnetic coating composition, and then coating a base film with the magnetic coating composition.

However, these fillers have respective inherent problems. Namely, it is known that alumina shows a poor dispersibility in binder resin. With increase in amount of alumina added, the obtained magnetic recording medium is considerably deteriorated in electromagnetic performance. Hematite particles exhibit a relatively good dispersibility in binder resin. However, in order to obtain magnetic recording media having a sufficient durability, it is required to add a considerably large amount of the hematite particles thereto, resulting in deteriorated filling percentage of magnetic particles and, therefore, poor electromagnetic performance. Further, the use of dichromium trioxide is unfavorable from environmental and hygienic viewpoints.

It is also known that when the amount of these fillers added to the magnetic layer is increased, resultant magnetic recording media are improved in durability, but deteriorated in dispersibility of magnetic particles in vehicle, thereby causing a considerable deterioration in electromagnetic performance thereof.

Accordingly, it has been strongly demanded to provide magnetic recording media containing such a filler which does not adversely affect the dispersibility of magnetic particles in vehicle even when the filler is added in an amount sufficient to impart a high durability thereto, thereby preventing the magnetic recording media from being deteriorated in electromagnetic performance thereof.

In current general-purpose video tape systems, the end position of such a magnetic tape is recognized by detecting a transparent leader tape provided at the tape end thereof using a sensor. However, with recent demands for high-density recording on magnetic recording media, the particle size of magnetic particles used therein becomes much finer, so that a magnetic recording layer containing such magnetic particles has a high light transmittance. As a result, there arises the risk of occurrence of errors upon detecting the end position of the magnetic tape. Therefore, it has been strongly required that a magnetic recording portion of the magnetic tape has a sufficiently high blackness, i.e., a low light transmittance.

Further, it has been endlessly demanded to further improve characteristics of magnetic recording media. Therefore, it is strongly required to provide magnetic recording media having not only the above-described characteristics but also a small surface resistivity, an improved running property and the like.

The reasons therefor are as follows. When the surface resistivity of magnetic recording media is large, the amount of electrostatic charge thereon is increased, so that cut chips of the magnetic recording media or dusts are adhered onto the surfaces of the magnetic recording media upon production and use thereof, thereby causing problems such as increase in drop-outs.

It is widely known that carbon black fine particles as a black filler are incorporated into a magnetic recording layer. Also, there have been proposed magnetic recording media in which black titanium (TiO) particles are used as a black filler (Japanese Patent Publication (KOKOKU) Nos. 62-21185 (1987) and 62-22179(1987)), magnetic recording media in which graphite fluoride is used a black filler (Japanese Patent Application Laid-Open (KOKAI) No. 56-156930 (1981)), or the like.

Also, hitherto, with the reduction in thicknesses of magnetic recording layer and non-magnetic base film of magnetic recording media, it has been variously attempted to impart good surface smoothness and large stiffness thereto by improving a substrate on which the magnetic recording layer is formed. For instance, there has been proposed a non-magnetic substrate composed of a non-magnetic base film and at least one undercoat layer formed on the non-magnetic base film. The undercoat layer is composed of a binder and non-magnetic particles dispersed in the binder, which contain iron as a main component, e.g., acicular hematite particles or acicular iron oxide hydroxide particles (hereinafter referred to merely as "non-magnetic undercoat layer"). Such a non-magnetic substrate is already put into practice (refer to Japanese Patent Publication (KOKOKU) No. 6-93297(1994), Japanese Patent Application Laid-Open (KOKAI) Nos. 62-159338(1987), 63-187418(1988), 4-167225(1992), 4-325915(1992), 5-73882(1993), 5-182177(1993), 5-347017(1993) and 6-60362(1994), or the like).

Thus, at present, it has been most strongly demanded to provide magnetic recording media having not only an excellent durability and a good electromagnetic performance, but also a low light transmittance, a small surface resistivity and a good surface smoothness. However, such magnetic recording media capable of satisfying all of these requirements have not been obtained yet.

The above-described conventional magnetic recording media containing a filler such as alumina, hematite or dichromium trioxide, are considerably deteriorated in electromagnetic performance when the amount of the filler added thereto is increased in order to enhance the durability thereof. Therefore, the use of these fillers has failed to produce magnetic recording media capable of exhibiting both excellent durability and good electromagnetic performance.

When carbon black fine particles are used as a black filler, it is possible to obtain magnetic recording media having a low light transmittance due to excellent blackness of the carbon black fine particles added. However, since the carbon black fine particles inherently show a poor dispersibility in vehicle, the dispersibility of magnetic particles in vehicle is also deteriorated, thereby adversely affecting properties of the obtained magnetic recording media, e.g., deterioration in electromagnetic performance, durability or the like. In this regard, Japanese Patent Application Laid-Open (KOKAI) No. 4-139619(1992) describes that "When the binder resin and the magnetic particles are kneaded together to produce a coating material, if carbon black fine particles are added to the composition, there arises such a problem that the magnetic particles are deteriorated in orientation and filling property, as described below in Comparative Examples. Further, the carbon black particles are bulky particles having a bulk density of about 0.1 g/cm$^3$, resulting in poor handling and processing properties thereof. Besides, the carbon black particles have problems concerning safety and hygiene such as carcinogenesis".

Thus, it has been demanded to provide a black filler as an alternate material of the carbon black fine particles. However, the above-described conventional fillers cannot contribute to sufficient reduction in light transmittance of magnetic recording media as compared to the carbon black fine particles, since alumina, hematite and dichromium trioxide show white, red and green colors, respectively.

Further, the black titanium tends to be readily oxidized and, therefore, is insufficient in stability in air. The graphite fluoride tends to suffer from the deterioration in electromagnetic performance due to poor dispersibility in binder resin.

As a result of the present inventors' earnest studies for solving the above problems, it has been found that by using as a filler incorporated into a magnetic recording layer of a magnetic recording medium, black composite hematite particles having an average diameter of 0.08 to 1.0 $\mu$m and comprising:
hematite particles as core particles;
a coating layer formed on surface of the said hematite particle, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and
a carbon black coat formed on the said coating layer comprising at least one organosilicon compound, in an amount of 1 to 30 parts by weight based on 100 parts by weight of the said hematite particles,
the obtained magnetic recording medium is free from deterioration in electromagnetic performance even when the back filler is added thereto in an amount sufficient to enhance the durability thereof; and has an excellent durability and a good electromagnetic performance; and can be suitably used for high density recording because the black composite hematite particles which exhibit a sufficient blackness and are capable of considerably reducing the amount of carbon black used in combination therewith, are used as a black filler. The present invention has been attained on the basis of this finding.

SUMMARY OF THE INVENTION

It is an object of the present invention to provide a magnetic recording medium having not only an excellent durability and a good electromagnetic performance, but also a low light transmittance due to high blackness of a filler used therein and a small surface resistivity by using such a black filler capable of inhibiting the electromagnetic performance of the magnetic recording medium from being deteriorated even when the filler is added thereto in an amount sufficient in order to enhance the durability thereof.

It is another object of the present invention to provide a magnetic recording medium having not only an excellent durability and a good electromagnetic performance, but also a smooth surface, a lower light transmittance and a smaller surface resistivity, by using such a black filler capable of suppressing the deterioration of electromagnetic performance of the magnetic recording medium even when the filler is added thereto in an amount sufficient in order to enhance the durability thereof.

To accomplish the aims, in a first aspect of the present invention, there is provided a magnetic recording medium comprising:
a non-magnetic base film; and
a magnetic recording layer comprising a binder resin, magnetic particles, and as a filler black composite hematite particles having an average diameter of 0.08 to 1.0 $\mu$m,
the said black composite hematite particles comprising:
hematite particles as core particles;
a coating layer formed on surface of the said hematite particle, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and
a carbon black coat formed on the said coating layer comprising at least one organosilicon compound, in an amount of 1 to 30 parts by weight based on 100 parts by weight of the said hematite particles.

In a second aspect of the present invention, there is provided a magnetic recording medium comprising:

a non-magnetic base film; and a magnetic recording layer comprising a binder resin, magnetic particles, and as a filler black composite hematite particles having an average diameter of 0.08 to 1.0 µm, the said black composite hematite particles comprising:
hematite particles as core particles, having a coat formed on at least a part of the surface of hematite particles, which coat comprises at least one compound selected from the group consisting of hydroxides of aluminum, oxides of aluminum, hydroxides of silicon and oxides of silicon in an amount of 0.01 to 50% by weight, calculated as Al or $SiO_2$, based on the total weight of the hematite particles;
a coating layer formed on surface of the said hematite particle having the said coat, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and
a carbon black coat formed on the said coating layer comprising at least one organosilicon compound, in an amount of 1 to 30 parts by weight based on 100 parts by weight of the said hematite particles.

In a third aspect of the present invention, there is provided a magnetic recording medium comprising:

a non-magnetic base film; and a magnetic recording layer comprising a binder resin, as magnetic particles magnetic metal particles containing iron as a main component, and as a filler black composite hematite particles having an average diameter of 0.08 to 1.0 µm the said black composite hematite particles comprising:
hematite particles as core particles;
a coating layer formed on surface of the said hematite particle, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and
a carbon black coat formed on the said coating layer comprising at least one organosilicon compound, in an amount of 1 to 30 parts by weight based on 100 parts by weight of the said hematite particles.

In a fourth aspect of the present invention, there is provided a magnetic recording medium comprising:

a non-magnetic base film; and a magnetic recording layer comprising a binder resin, as magnetic particles magnetic metal particles containing iron as a main component, and as a filler black composite hematite particles having an average diameter of 0.08 to 1.0 µm the said black composite hematite particles comprising:
hematite particles as core particles, having a coat formed on at least a part of the surface of the hematite particles, which coat comprises at least one compound selected from the group consisting of hydroxides of aluminum, oxides of aluminum, hydroxides of silicon and oxides of silicon in an amount of 0.01 to 50% by weight, calculated as Al or $SiO_2$, based on the total weight of the hematite particles;
a coating layer formed on surface of the said hematite particle having the said coat, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and
a carbon black coat formed on the said coating layer comprising at least one organosilicon compound, in an amount of 1 to 30 parts by weight based on 100 parts by weight of the said hematite particles.

In a fifth aspect of the present invention, there is provided a magnetic recording medium comprising:

a non-magnetic base film;

a non-magnetic undercoat layer formed on the non-magnetic base film; and a magnetic recording layer formed on the non-magnetic undercoat layer, comprising a binder resin, magnetic particles and as a filler black composite hematite particles having an average diameter of 0.08 to 1.0 µm the said black composite hematite particles comprising:
hematite particles as core particles;
a coating layer formed on surface of the said hematite particle, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and
a carbon black coat formed on the said coating layer comprising at least one organosilicon compound, in an amount of 1 to 30 parts by weight based on 100 parts by weight of the said hematite particles.

In a sixth aspect of the present invention, there is provided a magnetic recording medium comprising:

a non-magnetic base film;

a non-magnetic undercoat layer formed on the non-magnetic base film; and a magnetic recording layer formed on the non-magnetic undercoat layer, comprising a binder resin, magnetic particles, and as a filler black composite hematite particles having an average diameter of 0.08 to 1.0 µm the said black composite hematite particles comprising:
hematite particles as core particles, having a coat formed on at least a part of the surface of the hematite particles, which coat comprises at least one compound selected from the group consisting of hydroxides of aluminum, oxides of aluminum, hydroxides of silicon and oxides of silicon in an amount of 0.01 to 50% by weight, calculated as Al or $SiO_2$, based on the total weight of the hematite particles;
a coating layer formed on surface of the said hematite particle having the said coat, comprising at least one organosilicon compound selected from the group consisting of:

(1) organosilane compounds obtained from an alkoxysilane compounds,
(2) polysiloxanes or modified polysiloxanes, and
(3) fluoroalkyl organosilane compounds obtained from a fluoroalkylsilane compounds; and a carbon black coat formed on the said coating layer comprising at least one organosilicon compound, in an amount of 1 to 30 parts by weight based on 100 parts by weight of said hematite particles.

In a seventh aspect of the present invention, there is provided a magnetic recording medium comprising:

a non-magnetic base film;

a non-magnetic undercoat layer formed on the non-magnetic base film; and a magnetic recording layer formed on the non-magnetic undercoat layer, comprising a binder resin, as magnetic particles magnetic metal particles containing iron as a main component, and as a filler black composite hematite particles having an average diameter of 0.08 to 1.0 $\mu$m the said black composite hematite particles comprising:

hematite particles as core particles;

a coating layer formed on surface of the said hematite particle, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and a carbon black coat formed on the said coating layer comprising at least one organosilicon compound, in an amount of 1 to 30 parts by weight based on 100 parts by weight of the said hematite particles.

In an eighth aspect of the present invention, there is provided a magnetic recording medium comprising:

a non-magnetic base film;

a non-magnetic undercoat layer formed on the non-magnetic base film; and a magnetic recording layer formed on the non-magnetic undercoat layer, comprising a binder resin, as magnetic particles magnetic metal particles containing iron as a main component, and as a filler black composite hematite particles having an average diameter of 0.08 to 1.0 $\mu$m the said black composite hematite particles comprising:

hematite particles as core particles, having a coat formed on at least a part of the surface of the hematite particles, which coat comprises at least one compound selected from the group consisting of hydroxides of aluminum, oxides of aluminum, hydroxides of silicon and oxides of silicon in an amount of 0.01 to 50% by weight, calculated as Al or SiO$_2$, based on the total weight of the hematite particles;

a coating layer formed on surface of the said hematite particle having the said coat, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and a carbon black coat formed on the said coating layer comprising at least one organosilicon compound, in an amount of 1 to 30 parts by weight based on 100 parts by weight of the said hematite particles.

In a ninth aspect of the present invention, there is provided a filler comprising black composite hematite particles having an average diameter of 0.08 to 1.0 $\mu$m and comprising:

hematite particles as core particles;

a coating layer formed on surface of the said hematite particle, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and a carbon black coat formed on the said coating layer comprising at least one organosilicon compound, in an amount of 1 to 30 parts by weight based on 100 parts by weight of the said hematite particles.

In a tenth aspect of the present invention, there is provided a filler comprising black composite hematite particles having an average diameter of 0.08 to 1.0 $\mu$m and comprising:

hematite particles as core particles, having a coat formed on at least a part of the surface of the hematite particles, which coat comprises at least one compound selected from the group consisting of hydroxides of aluminum, oxides of aluminum, hydroxides of silicon and oxides of silicon in an amount of 0.01 to 50% by weight, calculated as Al or SiO$_2$, based on the total weight of the hematite particles;

a coating layer formed on surface of the said hematite particle, comprising at least one organosilicon compound selected from the group consisting of:
(1) organosilane compounds obtained from an alkoxysilane compounds,
(2) polysiloxanes or modified polysiloxanes, and
(3) fluoroalkyl organosilane compounds obtained from a fluoroalkylsilane compounds; and a carbon black coat formed on the said coating layer comprising at least one organosilicon compound, in an amount of 1 to 30 parts by weight based on 100 parts by weight of the said hematite particles.

DETAILED DESCRIPTION OF THE INVENTION

Figure 1:
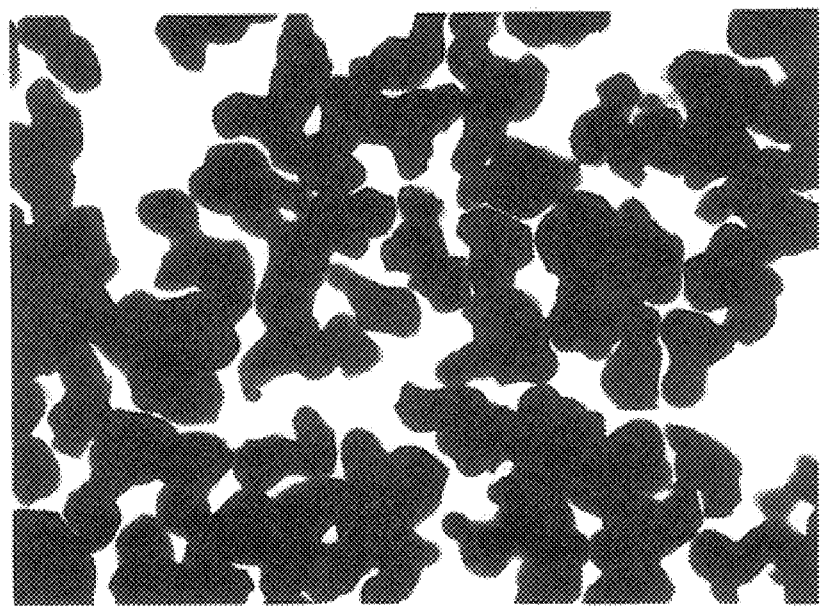
FIG. 1 is an electron micrograph (×20,000) showing a particle structure of black manganese-containing hematite particles used in Example 1.

The present invention is described in detail below.

First, the magnetic recording medium according to the present invention is explained.

In general, the magnetic recording medium (i) comprises a non-magnetic base film, and a magnetic recording layer formed on the non-magnetic base film and comprising a binder resin, magnetic particles and a filler; or (ii) comprises a non-magnetic base film, a non-magnetic undercoat layer formed on the non-magnetic base film and a magnetic recording layer formed on the non-magnetic undercoat layer and comprising a binder resin, magnetic particles and a filler.

In the magnetic recording medium according to the present invention, as a filler, there are used black composite hematite particles having an average diameter of 0.08 to 1.0 μm and comprising hematite particles as core particles which may be coated with at least one compound selected from the group consisting of hydroxides of aluminum, oxides of aluminum, hydroxides of silicon and oxides of silicon; a coating layer formed on surface of the core particles and comprising an organosilicon compound; and a carbon black coat formed on the coating layer comprising the organosilicon compound.

As the core particles of the black composite hematite particles according to the present invention, there may be used hematite particles such as hematite particles or hematite particles containing manganese in an amount of 5 to 40% by weight based on the weight of the Mn-containing hematite particles. In the consideration of sufficient blackness of the black composite hematite particles, it is preferred that the Mn-containing hematite particles be used as the core particles.

The particle shape of the hematite particles as the core particles may include a granular shape such as a spherical shape, an irregular (anisotropic) shape, an octahedral shape, a hexahedral shape, a polyhedral shape or the like; an acicular shape such as a needle shape, a spindle shape, a rice ball shape or the like; and a plate shape, or the like.

The lower limit of the average particle size of the hematite particles as the core particles is usually 0.075 μm, preferably 0.085 μm, more preferably 0.095 μm, and the upper limit thereof is usually 0.95 μm, preferably 0.65 μm, more preferably 0.45 μm.

(i) In the case where the shape of the core particles is granular-shaped, the lower limit of the average particle diameter of the granular-shaped hematite particles is usually 0.075 μm, preferably 0.085 μm, more preferably 0.095 μm, and the upper limit thereof is usually 0.95 μm, preferably 0.65 μm, more preferably 0.45 μm.

(ii) In the case where the shape of the core particles is acicular-shaped, the lower limit of the average particle diameter (average major axis diameter) of the acicular-shaped hematite particles is usually 0.075 μm, preferably 0.085 μm, more preferably 0.095 μm, and the upper limit thereof is usually 0.95 μm, preferably 0.65 μm, more preferably 0.45 μm; and the lower limit-of the aspect ratio (average major axis diameter/average minor axis diameter) of the acicular-shaped hematite particles is usually 2:1, preferably 2.5:1, more preferably 3:1, and the upper limit thereof is usually 20:1, preferably 15:1, more preferably 10:1.

(iii) In the case where the shape of the core particles is plate-shaped, the lower limit of the average particle diameter (average plate surface diameter) of the plate-shaped hematite particles is usually 0.075 μm, preferably 0.085 μm, more preferably 0.095 μm, and the upper limit thereof is usually 0.95 μm, preferably 0.65 μm, more preferably 0.45 μm; and the lower limit of the plate ratio (average plate surface diameter/average thickness) of the plate-shaped hematite particles is usually 2:1, preferably 2.5:1, more preferably 3:1, and the upper limit thereof is usually 50:1, preferably 20:1, more preferably 10:1.

When the average particle size of the hematite particles is more than 0.95 μm, the obtained black composite hematite particles may be coarse particles, thereby causing the deterioration of the tinting strength, so that the light transmittance of the magnetic recording medium obtained may become high. On the other hand, when the average particle size is less than 0.075 μm, the intermolecular force between the particles may be increased due to the reduction in particle diameter, so that agglomeration of the particles tends to be caused. As a result, it may become difficult to uniformly coat the surface of the hematite particles with the organosilicon compounds, and uniformly form the carbon black coat on the surface of the coating layer comprising the organosilicon compounds.

When the aspect ratio of the acicular-shaped hematite particles is more than 20:1, the particles may be entangled with each other in vehicle, so that it may become difficult to uniformly coat the surface of the acicular-shaped hematite particles with the organosilicon compounds, and uniformly form the carbon black coat on the surface of the coating layer comprising the organosilicon compounds.

Further, in the case where the upper limit of the plate ratio of the plate-shaped hematite particles exceeds 50:1, the particles may tend to be stacked each other, and it also may become difficult to uniformly coat the surfaces of the plate-shaped hematite particles with the organosilicon compounds, and uniformly form the carbon black coat on the surface of the coating layer composed of the organosilicon compounds.

The lower limit of the blackness of the Mn-containing hematite particles as core particles used in the present invention is usually 22 when represented by a L* value thereof, and the upper limit of the blackness thereof is usually 28, preferably 26 when represented by a L* value thereof. The lower limit of the blackness of the hematite particles as core particles used in the present invention is usually 22 when represented by a L* value thereof, and the upper limit of the blackness thereof is usually 38, preferably 36 when represented by a L* value thereof. When the L* value of the core particles exceeds the above-mentioned upper limit, the blackness thereof may become insufficient so that it is difficult to obtain black composite hematite particles having an excellent blackness.

The lower limit of the BET specific surface area of the hematite particles as core particles is usually 1.0 m²/g, preferably 2.0 m²/g, more preferably 2.5 m²/g, and the upper limit thereof is usually 200 m²/g, preferably 150 m²/g, more preferably 100 m²/g. When the BET specific surface area is less than 1.0 m²/g, the hematite particles as core particles may become coarse particles, or the sintering between the particles may be caused, so that the obtained black composite hematite particles also may become coarse particles and tend to be deteriorated in tinting strength and as a result, the light transmittance of the magnetic recording medium obtained may become high. On the other hand, when the BET specific surface area thereof is more than 200 m²/g, the intermolecular force between the particles may be increased due to the fineness thereof, so that it may become difficult to uniformly coat the surfaces of the hematite particles with the organosilicon compounds, and uniformly form the carbon black coat on the surface of the coating layer composed of the organosilicon compounds.

As to the particle diameter distribution of the hematite particles used as core particles, the geometrical standard deviation value thereof is preferably not more than 1.8, more preferably not more than 1.7, still more preferably not more than 1.6. When the geometrical standard deviation value thereof is more than 1.8, coarse particles may be contained therein, so that the particles may be inhibited from being uniformly dispersed. As a result, it may also become difficult to uniformly coat the surfaces of the hematite particles with the organosilicon compounds, and uniformly form the carbon black coat on the surface of the coating layer composed of the organosilicon compounds. The lower limit of the geometrical standard deviation value is 1.01 under the consideration of an industrial productivity.

In the hematite particles used as core particles of the present invention, the surfaces of the hematite particles as the core particles may be preliminarily coated with at least one compound selected from the group consisting of hydroxide of aluminum, oxides of aluminum, hydroxides of silicon and oxides of silicon (hereinafter referred to as "hydroxides and/or oxides of aluminum and/or silicon coat"), if required. In this case, the dispersibility of the obtained black composite hematite particles in a vehicle may become improved as compared to those having no hydroxides and/or oxides of aluminum and/or silicon coat, so that a magnetic recording medium having more excellent durability and electromagnetic performance, can be obtained.

The amount of the hydroxides and/or oxides of aluminum and/or silicon coat is 0.01 to 50% by weight (calculated as Al, $SiO_2$ or a sum of Al and $SiO_2$) based on the weight of the hematite particles as the core particles.

When the amount of the hydroxides and/or oxides of aluminum and/or silicon coat is less than 0.01% by weight, the improvement of the dispersibility of the obtained black composite hematite particles in a vehicle cannot be achieved. On the other hand, when the amount of the hydroxides and/or oxides of aluminum and/or silicon coat is more than 50% by weight, the obtained black composite hematite particles can exhibit a good dispersibility in a vehicle, but it is meaningless because the dispersibility cannot be further improved by using such an excess amount of the hydroxides and/or oxides of aluminum and/or silicon coat.

The hematite particles having the hydroxides and/or oxides of aluminum and/or silicon coat may be substantially identical in a particle size, a geometrical standard deviation of particle sizes, a BET specific surface area and a blackness (L* value), to those having no hydroxides and/or oxides of aluminum and/or silicon coat.

The coating layer formed on the surface of the core particle comprises at least one organosilicon compound selected from the group consisting of (1) organosilane compounds obtained from alkoxysilane compounds; (2) polysiloxanes or modified polysiloxanes selected from the group consisting of (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group (hereinafter referred to merely as "terminal-modified polysiloxanes"); and (3) fluoroalkyl organosilane compounds obtained from fluoroalkylsilane compounds.

The organosilane compounds (1) can be produced from alkoxysilane compounds represented by the formula (I):

$$R^1{}_a SiX_{4-a} \quad \text{(I)}$$

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

The alkoxysilane compounds may be dried or heat-treated for producing the organosilane compounds (1), for example, at a temperature of usually 40 to 200° C., preferably 60 to 150° C. for usually 10 minutes to 12 hours, preferably 30 minutes to 3 hours.

Specific examples of the alkoxysilane compounds may include methyl triethoxysilane, dimethyl diethoxysilane, phenyl triethyoxysilane, diphenyl diethoxysilane, methyl trimethoxysilane, dimethyl dimethoxysilane, phenyl trimethoxysilane, diphenyl dimethoxysilane, isobutyl trimethoxysilane, decyl trimethoxysilane or the like. Among these alkoxysilane compounds, in view of the desorption percentage and the adhering effect of carbon black, methyl triethoxysilane, phenyl triethyoxysilane, methyl trimethoxysilane, dimethyl dimethoxysilane and isobutyl trimethoxysilane are preferred, and methyl triethoxysilane and methyl trimethoxysilane are more preferred.

As the polysiloxanes (2), there may be used those compounds represented by the formula (II):

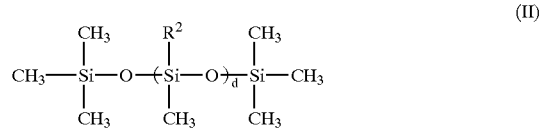

(II)

wherein $R^2$ is H— or $CH_3$—, and d is an integer of 15 to 450.

Among these polysiloxanes, in view of the desorption percentage and the adhering effect of carbon black, polysiloxanes having methyl hydrogen siloxane units are preferred.

As the modified polysiloxanes (2-A), there may be used:
(a1) polysiloxanes modified with polyethers represented by the formula (III):

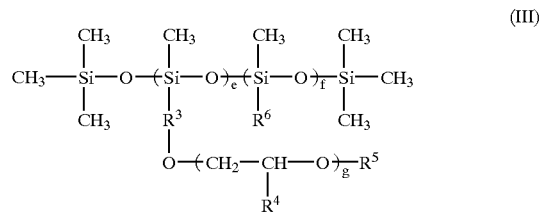

(III)

wherein $R^3$ is —(—$CH_2$—)$_h$—; $R^4$ is —(—$CH_2$—)$_i$—$CH_3$; $R^5$ is —OH, —COOH, —CH=$CH_2$, —CH($CH_3$)=$CH_2$ or —(—$CH_2$—)$_j$—$CH_3$; $R^6$ is —(—$CH_2$—)$_k$—$CH_3$; g and h are an integer of 1 to 15; i, j and k are an integer of 0 to 15; e is an integer of 1 to 50; and f is an integer of 1 to 300;

(a2) polysiloxanes modified with polyesters represented by the formula (IV):

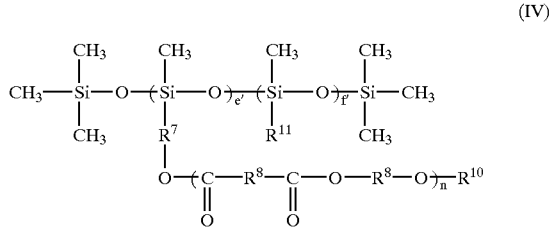

(IV)

wherein $R^7$, $R^8$ and $R^9$ are (—$CH_2$—)$_q$— and may be the same or different; $R^{10}$ is —OH, —COOH, —CH=$CH_2$, —CH($CH_3$)=$CH_2$ or —(—$CH_2$—)$_r$—$CH_3$; $R^{11}$ is —(—$CH_2$—)$_s$—$CH_3$; n and q are an integer of 1 to 15; r and s are an integer of 0 to 15; e' is an integer of 1 to 50; and f' is an integer of 1 to 300;

(a3) polysiloxanes modified with epoxy compounds represented by the formula (V):

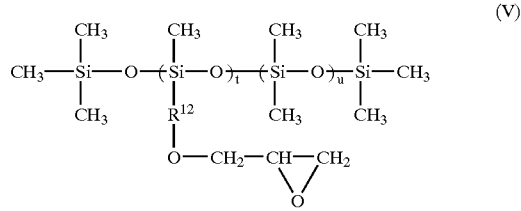

wherein $R^{12}$ is —(—$CH_2$—)$_v$—; v is an integer of 1 to 15; t is an integer of 1 to 50; and u is an integer of 1 to 300; or a mixture thereof.

Among these modified polysiloxanes (2-A), in view of the desorption percentage and the adhering effect of carbon black, the polysiloxanes modified with the polyethers represented by the formula (III), are preferred.

As the terminal-modified polysiloxanes (2-B), there may be used those represented by the formula (VI):

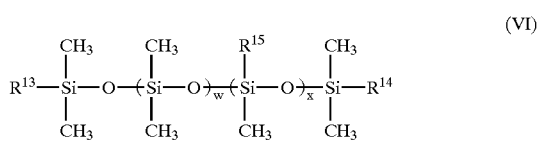

wherein $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —(—$CH_2$—)$_y$—; wherein y is an integer of 1 to 15; w is an integer of 1 to 200; and x is an integer of 0 to 100.

Among these terminal-modified polysiloxanes, in view of the desorption percentage and the adhering effect of carbon black, the polysiloxanes whose terminals are modified with carboxylic acid groups are preferred.

The fluoroalkyl organosilane compounds (3) can be produced from fluoroalkylsilane compounds represented by the formula (VII):

wherein $R^{18}$ is $CH_3$—, $C_2H_5$—, $CH_3O$— or $C_2H_5O$—; X is $CH_3O$— or $C_2H_5O$—; and z is an integer of 0 to 15; and a' is an integer of 0 to 3.

The fluoroalkylsilane compounds may be dried or heat-treated for producing the fluoroalkyl organosilane compounds (3), for example, at a temperature of usually 40 to 200° C., preferably 60 to 150° C. for usually 10 minutes to 12 hours, preferably 30 minutes to 3 hours.

Specific examples of the fluoroalkylsilane compounds may include trifluoropropyl trimethoxysilane, tridecafluorooctyl trimethoxysilane, heptadecafluorodecyl trimethoxysilane, heptadecafluorodecylmethyl dimethoxysilane, trifluoropropyl triethoxysilane, tridecafluorooctyl triethoxysilane, heptadecafluorodecyl triethoxysilane, heptadecafluorodecylmethyl diethoxysilane or the like. Among these fluoroalkylsilane compounds, in view of the desorption percentage and the adhering effect of carbon black, trifluoropropyl trimethoxysilane, tridecafluorooctyl trimethoxysilane and heptadecafluorodecyl trimethoxysilane are preferred, and trifluoropropyl trimethoxysilane and tridecafluorooctyl trimethoxysilane are more preferred.

The amount of the coating layer composed of the organosilicon compounds is usually 0.02 to 5.0% by weight, preferably 0.03 to 4.0% by weight, more preferably 0.05 to 3.0% by weight (calculated as Si) based on the weight of the hematite particles coated with the organosilicon compounds.

When amount of the coating layer composed of the organosilicon compounds is less than 0.02% by weight, it may become difficult to form the carbon black coat on the coating layer in such an amount enough to improve the blackness thereof. On the other hand, even when the coating amount of the organosilicon compounds is more than 5.0% by weight, a sufficient amount of carbon black can be coated on the coating layer. However, it is meaningless because the blackness cannot be further improved by using such an excess amount of the organosilicon compounds.

As the carbon black fine particles used in the present invention, there may be exemplified commercially available carbon blacks such as furnace black, channel black or the like. Specific examples of the commercially available carbon blacks usable in the present invention, may include #3050, #3150, #3250, #3750, #3950, MA100, MA7, #1000, #2400B, #30, MA77, MA8, #650, MA11, #50, #52, #45, #2200B, MA600, etc. (tradename, produced by MITSUBISHI CHEMICAL CORP.), SEAST 9H, SEAST 7H, SEAST 6, SEAST 3H, SEAST 300, SEAST FM, etc. (tradename, produced by TOKAI CARBON CO., LTD.), Raven 1250, Raven 860, Raven 1000, Raven 1190 ULTRA, etc. (tradename, produced by COLOMBIAN CHEMICALS COMPANY), Ketchen black EC, Ketchen black EC60OJD, etc. (tradename, produced by KETCHEN INTERNATIONAL CO., LTD.), BLACK PEARLS-L, BLACK PEARLS 1000, BLACK PEARLS 4630, VULCAN XC72, REGAL 660, REGAL 400, etc. (tradename, produced by CABOT SPECIALTY CHEMICALS INK CO., LTD.), or the like.

Further, in the consideration of more uniform coat of carbon black to the coating layer comprising at least one organosilicon compound, the carbon black fine particles having a DBP oil absorption of not more than 180 ml/100 g is preferred. Especially, there may be exemplified #3050, #3150, #3250, MA100, MA7, #1000, #2400B, #30, MA77, MA8, #650, MA11, #50, #52, #45, #2200B, MA600 (tradename, produced by MITSUBISHI CHEMICAL CORP.), SEAST 9H, SEAST 7H, SEAST 6, SEAST 3H, SEAST 300, SEAST FM (tradename, produced by TOKAI CARBON CO., LTD.), Raven 1250, Raven 860, Raven 1000, Raven 1190 ULTRA (tradename, produced by COLOMBIAN CHEMICALS COMPANY), BLACK PEARLS-L, BLACK PEARLS 1000, BLACK PEARLS 4630, REGAL 660, REGAL 400 (tradename, produced by CABOT SPECIALTY CHEMICALS INK CO., LTD.).

The lower limit of the average particle size of the carbon black fine particles used is usually 0.002 µm, preferably 0.005 µm, and the upper limit thereof is usually 0.05 µm, preferably 0.035 µm. When the average particle size of the carbon black fine particles used is less than 0.002 µm, the carbon black fine particles used are too fine to be well handled.

On the other hand, when the average particle size thereof is more than 0.05 µm, since the particle size of the carbon black fine particles used is much larger, it is necessary to apply a larger mechanical shear force for forming the uniform carbon black coat on the coating layer composed of the organosilicon compounds, thereby rendering the coating process industrially disadvantageous.

The amount of the carbon black formed is usually 1 to 30 parts by weight, preferably 3 to 25 parts by weight based on 100 parts by weight of the hematite particles as the core particles. When the amount of the carbon black coat formed is less than 1 part by weight, the blackness of the resultant black composite hematite particles may be unsatisfactory because of insufficient amount of the carbon black coat formed onto the coating layer. On the other hand, when the amount of the carbon black coat formed is more than 30 parts by weight, the carbon black may tend to be desorbed from the coating layer because of too much amount of the carbon black coat formed thereonto, though the obtained black composite hematite particles can show a sufficient blackness. As a result, since the desorbed carbon black may inhibit the black composite hematite particles from being homogeneously dispersed in vehicle, it may become difficult to obtain magnetic recording media which are excellent in both durability and electromagnetic performance.

The thickness of carbon black coat formed is preferably not more than 0.04 μm, more preferably not more than 0.03 μm, still more preferably not more than 0.02 μm. The lower limit thereof is more preferably 0.0001 μm.

The particle shape and particle size of the black composite hematite particles according to the present invention are considerably varied depending upon those of the hematite particles as core particles. The black composite hematite particles have a similar particle shape to that of the hematite particles as core particle, and a slightly larger particle size than that of the hematite particles as core particles.

The lower limit of the average particle size of the black composite hematite particles according to the present invention is usually 0.08 μm, preferably 0.09 μm, more preferably 0.1 μm, and the upper limit thereof is usually 1.0 μm, preferably 0.7 μm, more preferably 0.5 μm.

More specifically, when the granular-shaped hematite particles are used as core particles, the lower limit of the average particle diameter of the black composite hematite particles according to the present invention is usually 0.08 μm, preferably 0.09 μm, more preferably 0.1 μm, and the upper limit thereof is usually 1.0 μm, preferably 0.7 μm, more preferably 0.5 μm.

When the acicular-shaped hematite particles are used as core particles, the lower limit of the average particle diameter (average major axis diameter) of the black composite hematite particles according to the present invention is usually 0.08 μm, preferably 0.09 μm, more preferably 0.1 μm and the upper limit thereof is usually 1.0 μm, preferably 0.7 μm, more preferably 0.5 μm; and the lower limit of the aspect ratio (average major axis diameter/average minor axis diameter) of the black composite hematite particles according to the present invention, is usually 2:1, preferably 2.5:1, more preferably 3:1, and the upper limit thereof is usually 20:1, preferably 15:1, more preferably 10:1.

When the plate-shaped hematite particles are used as core particles, the lower limit of the average particle diameter (average plate surface diameter) of the black composite hematite particles according to the present invention is usually 0.08 μm, preferably 0.09 μm, more preferably 0.1 μm and the upper limit thereof is usually 1.0 μm, preferably 0.7 μm, more preferably 0.5 μm; and the lower limit of the plate ratio (average plate surface diameter/average thickness) of the black composite hematite particles according to the present invention, is usually 2:1, preferably 2.5:1, more preferably 3:1, and the upper limit thereof is usually 50:1, preferably 20:1, more preferably 10:1.

When the average particle size of the black composite hematite particles is less than 0.08 μm, the black composite hematite particles tends to be agglomerated by the increase of intermolecular force due to the reduction in particle size, thereby deteriorating the dispersibility in a vehicle upon production of the magnetic coating composition. As a result, the obtained magnetic recording media may suffer from deterioration in durability and electromagnetic performance. When the average particle diameter of the black composite hematite particles is more than 1.0 μm, the obtained black composite hematite particles may be coarse particles, and deteriorated in tinting strength, so that it may become difficult to reduce the light transmittance of the magnetic recording medium.

In case of the acicular-shaped black composite hematite particles, when the aspect ratio of the black composite hematite particles is more than 20.0:1, the black composite hematite particles may be entangled with each other in the binder resin, thereby deteriorating the dispersibility in a vehicle upon production of the magnetic coating composition. As a result, it may become difficult to obtain the magnetic recording media showing excellent durability and electromagnetic performance.

In case of the plate-shaped black composite hematite particles, when the plate ratio of the black composite hematite particles is more than 50.0:1, the black composite hematite particles may be stacked each other in the binder resin, thereby deteriorating the dispersibility in a vehicle upon production of the magnetic coating composition. As a result, it may become difficult to obtain the magnetic recording media showing excellent durability and electromagnetic performance.

As to the blackness of the black composite hematite particles according to the present invention, in the case the Mn-containing hematite particles are used as core particles, the upper limit of the blackness of the black composite hematite particles is usually 19.0, preferably 18.5 when represented by L* value. In the case the hematite particles are used as core particles, the upper limit of the blackness of the black composite hematite particles is usually 21.0, preferably 20.5 when represented by L* value.

When the L* value of the black composite hematite particles is more than the above-mentioned upper limit, the lightness of the obtained black composite hematite particles may become high, so that the black composite hematite particles having a sufficient blackness cannot be obtained and as a result, it may become difficult to reduce the light transmittance of the magnetic recording medium. The lower limit of the blackness thereof is preferably 15 when represented by L* value.

The percentage of desorption of carbon black from the black composite hematite particles according to the present invention, is preferably not more than 20%, more preferably not more than 10%. When the desorption percentage of the carbon black is more than 20%, the desorbed carbon black may tend to inhibit the black composite hematite particles from being uniformly dispersed in the binder resin upon production of the magnetic coating composition, so that it may become difficult to obtain magnetic recording media which are excellent in surface smoothness, durability and electromagnetic performance.

The BET specific surface area of the black composite hematite particles according to the present invention, is usually 1 to 200 $m^2/g$, preferably 2 to 150 $m^2/g$, more preferably 2.5 to 100 $m^2/g$. When the BET specific surface area thereof is less than 1 $m^2/g$, the obtained black composite hematite particles may be coarse and/or the sintering between the particles is caused, thereby deteriorating the tinting strength, so that it may become difficult to reduce the light transmittance of the magnetic recording medium. On the other hand, when the BET specific surface area is more than 200 $m^2/g$, the black composite hematite particles tend to be agglomerated together by the increase in intermolecular force due to the reduction in particle diameter, thereby deteriorating the dispersibility in a binder resin upon production of the magnetic coating composition, so that the obtained magnetic recording media may suffer from deterioration in durability and electromagnetic performance.

The geometrical standard deviation value of the black composite hematite particles according to the present invention is preferably not more than 1.8. When the geometrical standard deviation value thereof is more than 1.8, the black composite hematite particles may contain a large amount of coarse particles, so that it may become difficult to disperse the particles in vehicle upon the production of a magnetic coating composition and, therefore, obtain magnetic recording media which are excellent in both durability and electromagnetic performance. In the consideration of the durability and electromagnetic performance of the obtained magnetic recording media, the geometrical standard deviation of diameters of the black composite hematite particles is preferably not more than 1.7, more preferably not more than 1.6. Further in the consideration of industrial productivity of the black composite hematite particles, the lower limit of the geometrical standard deviation of diameters thereof is 1.01.

The volume resistivity of the black composite hematite particles is preferably not more than $1\times10^6$ Ω·cm, more preferably $1\times10^1$ Ω·cm to $5\times10^5$ Ω·cm, still more preferably $1\times10^1$ Ω·cm to $1\times10^5$ Ω·cm. When the volume resistivity is more than $1\times10^6$ Ω·cm, it is difficult to reduce the surface resistivity value of the obtained magnetic recording media to a sufficiently low level.

As the non-magnetic base film, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the non-magnetic base film varies depending upon the material, but it is usually about 1.0 to 300 μm, preferably 2.0 to 200 μm.

In the case of a magnetic disc, polyethylene terephthalate is usually used as the non-magnetic base film. The thickness thereof is usually 50 to 300 μm, preferably 60 to 200 μm. In the case of a magnetic tape, when polyethylene terephthalate is used as the base film, the thickness thereof is usually 3 to 100 μm, preferably 4 to 20 μm. When polyethylene naphthalate is used, the thickness thereof is usually 3 to 50 μm, preferably 4 to 20 μm. When polyamide is used, the thickness thereof is usually 2 to 10 μm, preferably 3 to 7 μm.

As the magnetic particles used in the present invention, there may be exemplified magnetic iron oxide particles such as maghemite particles, magnetite particles and berthollide compound particles which are an intermediate oxide between maghemite and magnetite; particles obtained by incorporating any one or more different kinds of elements other than Fe, such as Co, Al, Ni, P, Zn, Si, B or the like in the said magnetic iron oxide particles; magnetic iron oxide particles obtained by coating the surface of the above-mentioned magnetic iron oxide particles or those containing different kinds of elements, with cobalt, both cobalt and iron or the like (hereinafter referred to merely as "magnetic cobalt-coated iron oxide particles"); magnetic metal particles containing iron as a main component; magnetic metal particles containing iron as a main component and elements other than Fe at least one selected from the group consisting of Co, Al, Ni, P, Si, Zn, B, Nd, La, Sm and Y. including magnetic iron-based alloy particles; magnetoplumbite-type ferrite particles such as plate-like ferrite particles containing-Ba, Sr or Ba-Sr; plate-like magnetoplumbite-type ferrite particles obtained by incorporating divalent metals or tetravalent metals (such as Co, Ni, Zn, Mg, Mn, Nb, Cu, Ti, Sn, Zr, Mo or the like) as a coercive force-reducing agent in the plate-like magnetoplumbite-type ferrite particles; or the like. With the consideration of the high-density recording, magnetic metal particles containing iron as a main component, magnetic cobalt-coated iron oxide particles and magnetic iron-based alloy particles containing elements other than Fe at least one selected from the group consisting of Co, Al, Ni, P, Si, Zn, B, Nd, La, Sm, Y or the like are preferable.

Especially, the magnetic metal particles containing iron as a main component comprising (i) iron and Al; (ii) iron, Co and Al, (iii) iron, Al and at least one rare-earth metal such as Nd, La and Y, or (iv) iron, Co, Al and at least one rare-earth metal such as Nd, La and Y is more preferable from the point of the durability of the magnetic recording medium. Further, the magnetic acicular metal particles containing iron as a main component comprising iron, Al and at least one rare-earth metal such as Nd, La and Y is still more preferable.

More specifically, the magnetic acicular metal particles containing iron as a main component may be exemplified as follows.

1) Magnetic acicular metal particles comprises iron; and cobalt of usually 0.05 to 40% by weight, preferably 1.0 to 35% by weight, more preferably 3 to 30% by weight (calculated as Co) based on the weight of the magnetic acicular metal particles.

2) Magnetic acicular metal particles comprises iron; and aluminum of usually 0.05 to 10% by weight, preferably 0.1 to 7% by weight (calculated as Al) based on the weight of the magnetic acicular metal particles.

3) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and aluminum of usually 0.05 to 10% by weight, preferably 0.1 to 7% by weight (calculated as Al) based on the weight of the magnetic acicular metal particles.

4) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

5) Magnetic acicular metal particles comprises iron; aluminum of usually 0.05 to 10% by weight, preferably 0.1 to 7% by weight (calculated as Al) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

6) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

7) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

8) Magnetic acicular metal particles comprises iron; aluminum of usually 0.05 to 10% by weight, preferably 0.1 to 7% by weight (calculated as Al) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

9) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

10) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; at least one selected from the group consisting of Nd, La and Y of usually 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

11) Magnetic acicular metal particles comprises iron; aluminum of usually 0.05 to 10% by weight, preferably 0.1 to 7% by weight (calculated as Al) based on the weight of the magnetic acicular metal particles; at least one selected from the group consisting of Nd, La and Y of ordinarily 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

12) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; at least one selected from the group consisting of Nd, La and Y of usually 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

The iron content in the particles is the balance, and is preferably 50 to 99% by weight, more preferably 60 to 95% by weight (calculated as Fe) based on the weight of the magnetic particles containing iron as a main component.

From the consideration of the excellent durability of the magnetic recording medium, it is preferred to use as magnetic particles magnetic acicular metal particles containing iron as a main component, which contain aluminum of 0.05 to 10% by weight (calculated as Al) based on the weight of the magnetic acicular metal particles containing iron as a main component, which are present within the particle.

It is more preferable to use as magnetic particles magnetic acicular metal particles containing iron as a main component containing Al in an amount of 0.05 to 10% by weight (calculated as Al) based on the weight of the magnetic acicular metal particles and a rare-earth metal such as Nd, La and Y in an amount of 0.05 to 10% by weight (calculated as element) based on the weight of the magnetic acicular metal particles. Especially, magnetic acicular metal particles containing iron as a main component containing Al and Nd therein are the even more preferable.

The magnetic particles may have not only an acicular shape but also a cubic shape, a plate-like shape or the like. Meanwhile, the term "acicular shape" used herein should be construed as including "needle shape", "spindle shape", "rice grain shape" and the like.

The magnetic particles have an average major axial diameter (an average particle diameter or average plate surface diameter) of usually 0.01 to 0.50 $\mu$m, preferably 0.03 to 0.30 $\mu$m; an average minor axial diameter (an average thickness) of usually 0.0007 to 0.17 $\mu$m, preferably 0.003 to 0.10 $\mu$m; and a geometrical standard deviation of major axial diameters of usually not more than 2.5, preferably 1.01 to 2.3.

When the magnetic particles have an acicular shape, the aspect ratio thereof is usually not less than 3:1, preferably not less than 5:1. In the consideration of good dispersibility of the particles in vehicle upon the production of a magnetic coating composition, the upper limit of the aspect ratio is usually 15:1, preferably 10:1.

When the magnetic particles have a plate shape, the plate ratio thereof is usually not less than 2:1, preferably not less than 3:1. In the consideration of good dispersibility of the particles in vehicle upon the production of a magnetic coating composition, the upper limit of the plate ratio is usually 20:1, preferably 15:1.

The magnetic particles have a BET specific surface area of usually not less than 15 m$^2$/g, preferably not less than 20 m$^2$/g. In the consideration of good dispersibility of the particles in vehicle upon the production of a magnetic coating composition, the upper limit of the BET specific surface area is preferably 100 m$^2$/g, more preferably 80 m$^2$/g. As to magnetic properties of the magnetic particles, in the case of acicular magnetic iron oxide particles or Co-coated acicular magnetic iron oxide particles, the coercive force value thereof is usually 250 to 1,700 Oe (19.9 to 135.3 kA/m), preferably 300 to 1,700 Oe (23.9 to 135.3 kA/m); and the saturation magnetization value thereof is usually 60 to 90 emu/g (60 to 90 Am²/kg), preferably 65 to 90 emu/g (65 to 90 Am²/kg).

In the case of acicular magnetic metal particles containing iron as a main component or acicular magnetic alloy particles containing iron as a main component, the coercive force value thereof is usually 800 to 3,500 Oe (63.7 to 278.5 kA/m), preferably 900 to 3,500 Oe (71.6 to 278.5 kA/m); and the saturation magnetization value thereof is usually 90 to 170 emu/g (90 to 170 Am²/kg), preferably 100 to 170 emu/g (100 to 170 Am²/kg).

In the case of plate-like magnetoplumbite-type ferrite particles, the coercive force value thereof is usually 500 to 4,000 Oe (39.8 to 318.3 kA/m), preferably 650 to 4,000 Oe (51.7 to 318.3 kA/m); and the saturation magnetization value thereof is usually 40 to 70 emu/g (40 to 70 Am²/kg), preferably 45 to 70 emu/g (45 to 70 Am²/kg).

As the binder resin used in the present invention, the following resins which are at present generally used for the production of a magnetic recording medium are usable: vinyl chloride-vinyl acetate copolymer, vinyl chloride-vinyl acetate-maleic acid copolymer, urethane resin, styrene-butadiene copolymer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof. Each of these resin binders may contain a functional group such as —OH, —COOH, —SO$_3$M, —OPO$_2$M$_2$ and —NH$_2$, wherein M represents H, Na or K. With the consideration of the dispersibility of the magnetic particles and the black composite hematite particles as a filler upon the production of the magnetic coating composition, a binder resin containing a functional group —COOH or —SO$_3$M is preferable.

The thickness of the magnetic recording layer obtained by applying the magnetic coating composition on the surface of the non-magnetic base film and dried, is usually in the range of 0.01 to 5.0 μm. If the thickness is less than 0.01 μm, uniform coating may be difficult, so that unfavorable phenomenon such as unevenness on the coating surface may be observed. On the other hand, when the thickness exceeds 5.0 μm, it may be difficult to obtain desired electromagnetic performance due to an influence of diamagnetism. The preferable thickness is in the range of 0.05 to 1.0 μm.

The mixing ratio of the binder resin to the magnetic particles in the magnetic recording layer is usually 5 to 50 parts by weight, preferably 6 to 30 parts by weight based on 100 parts by weight of the magnetic particles.

When the content of the binder resin is more than 50 parts by weight, the content of the magnetic particles in the magnetic recording layer comparatively becomes too small, resulting in low filling percentage of the magnetic particles and further in deteriorated electromagnetic performance of the obtained magnetic recording media. When the content of the binder resin is less than 5 parts by weight, the blending ratio of the binder resin to the magnetic particles become too small, thereby failing to sufficiently disperse the magnetic particles in the magnetic coating composition, so that a coating film formed from such a magnetic coating composition tends to have an insufficient surface smoothness. Further, since the magnetic particles cannot be sufficiently bonded together through the binder resin, the obtained coating film tends to become brittle.

The blending ratio of the black composite hematite particles to the magnetic particles in the magnetic recording layer is usually 1 to 30 parts by weight, preferably 3 to 25 parts by weight based on 100 parts by weight of the magnetic particles.

When the content of the black composite hematite particles in the magnetic recording layer is as small as less than 1 part by weight, the obtained magnetic recording media may be insufficient in its durability, and it becomes difficult to sufficiently reduce the light transmittance and surface resistivity of the magnetic recording media. When the content of the black composite hematite particles is more than 30 parts by weight, the obtained magnetic recording media have a sufficient durability as well as low light transmittance and small surface resistivity. However, in this case, the amount of non-magnetic components in the magnetic recording layer becomes too large, thereby failing to produce magnetic recording media suitable for high-density recording.

It is possible to add an additive such as a lubricant, a polishing agent, an antistatic agent, etc. which are generally used for the production of a magnetic recording medium, to the magnetic recording layer. The mixing ratio of the additive to the binder resin is preferably 0.1 to 50 parts by weight based on 100 parts by weight of the binder resin.

The magnetic recording medium of the fifth to eighth aspects in the present invention, comprises a non-magnetic base film, a non-magnetic undercoat layer formed on the non-magnetic base film and a magnetic recording layer formed on the non-magnetic undercoat layer.

The thickness of the non-magnetic undercoat layer is preferably 0.2 to 10.0 μm. When the thickness of the non-magnetic undercoat layer is less than 0.2 μm, it may be difficult to improve the surface roughness of the non-magnetic substrate, and the stiffness of a coating film formed thereon tends to be unsatisfactory. In the consideration of reduction in total thickness of the magnetic recording medium as well as the stiffness of the coating film, the thickness of the non-magnetic undercoat layer is more preferably in the range of 0.5 to 5.0 μm.

As the binder resin, the same binder resin as that used for the production of the magnetic recording layer is usable.

The mixing ratio of the non-magnetic particles to the binder resin is usually 5 to 2000 parts by weight, preferably 100 to 1000 parts by weight based on 100 parts by weight of the binder resin.

When the content of the non-magnetic particles is as small as less than 5 parts by weight, such a non-magnetic undercoat layer in which the non-magnetic particles are uniformly and continuously dispersed may not be obtained upon coating, resulting in insufficient surface smoothness and insufficient stiffness of the non-magnetic substrate.

When the content of the non-magnetic particles is more than 2,000 parts by weight, the non-magnetic particles may not be sufficiently dispersed in a non-magnetic coating composition since the amount of the non-magnetic particles is too large as compared to that of the binder resin. As a result, when such a non-magnetic coating composition is coated onto the non-magnetic base film, it may become difficult to obtain a coating film having a sufficiently smooth surface. Further, since the non-magnetic particles may not be sufficiently bonded together through the binder resin, the obtained coating film tends to become brittle.

It is possible to add an additive such as a lubricant, a polishing agent, an antistatic agent, etc. which are generally used for the production of a magnetic recording medium, to the non-magnetic undercoating layer. The mixing ratio of the additive to the binder resin is preferably 0.1 to 50 parts by weight based on 100 parts by weight of the binder resin.

As the non-magnetic particles used in the non-magnetic undercoat layer of the present invention, there may be exemplified non-magnetic inorganic particles ordinarily used for forming a non-magnetic undercoat layer in conventional magnetic recording media. Specific examples of the non-magnetic particles may include hematite particles, iron oxide hydroxide particles, titanium oxide particles, zinc oxide particles, tin oxide particles, tungsten oxide particles, silicon dioxide particles, α-alumina particles, β-alumina particles, γ-alumina particles, chromium oxide particles, cerium oxide particles, silicon carbide particles, titanium carbide particles, silicon nitride particles, boron nitride particles, calcium carbonate particles, barium carbonate particles, magnesium carbonate particles, strontium carbonate particles, calcium sulfate particles, barium sulfate particles, molybdenum disulfide particles, barium titanate particles or the like. These non-magnetic particles may be used singly or in the form of a mixture of any two or more thereof. Among them, the use of hematite, iron oxide hydroxide, titanium oxide and the like is preferred.

In the present invention, in order to improve the dispersibility of the non-magnetic particles in vehicle upon the production of non-magnetic coating composition, the non-magnetic particles may be surface-treated with hydroxides of aluminum, oxides of aluminum, hydroxides of silicon, oxides of silicon or the like to form a coat made of any of these compounds on the surfaces thereof. Further, the non-magnetic particles may contain Al, Ti, Zr, Mn, Sn, Sb or the like inside thereof, if required, in order to improve various properties of the obtained magnetic recording media such as light transmittance, surface resistivity, mechanical strength, surface smoothness, durability or the like.

In the consideration of surface smoothness of the obtained non-magnetic undercoat layer, the non-magnetic particles preferably have an acicular shape. The term "acicular shape" used herein should be construed as including "needle shape", "spindle shape", "rice grain shape" or the like.

The non-magnetic particles have an average major axial diameter of usually 0.01 to 0.3 μm, preferably 0.015 to 0.25 μm, more preferably 0.02 to 0.2 μm, an aspect ratio of usually 2:1 to 20:1, preferably 3:1 to 15:1.

The magnetic recording medium according to the first aspect of the present invention in which the black composite hematite particles coated with no hydroxides and/or oxides of aluminum and/or silicon coat are used as a filler, has a coercive force value of usually 250 to 4,000 Oe (19.9 to 318.3 kA/m), preferably 300 to 4,000 Oe (23.9 to 318.3 kA/m); a squareness (residual magnetic flux density Br/saturation magnetic flux density Bm) of usually 0.85 to 0.95, preferably 0.86 to 0.95; a gloss (of the coating film) of usually 160 to 300%, preferably 165 to 300%; a surface roughness Ra (of the coating film) of usually not more than 10.0 nm, preferably 2.0 to 9.5 nm, more preferably 2.0 to 9.0 nm; a Young's modulus (relative value to a commercially available video tape: and AV T-120 produced by Victor Company of Japan, Limited) of usually 122 to 160, preferably 124 to 160; a linear absorption (of the coating film) of usually 1.20 to 5.00 $\mu m^{-1}$, preferably 1.30 to 5.00 $\mu m^{-1}$; and a surface resistivity (of the coating film) of usually not more than $1.0\times10^{10}$ Ω/cm², preferably not more than $7.5\times10^9$ Ω/cm², more preferably not more than $5.0\times10^9$ Ω/cm².

The magnetic recording medium according to the second aspect of the present invention in which the black composite hematite particles coated with hydroxides and/or oxides of aluminum and/or silicon coat are used as a filler, has a coercive force value of usually 250 to 4,000 Oe (19.9 to 318.3 kA/m), preferably 300 to 4,000 Oe (23.9 to 318.3 kA/m); a squareness (residual magnetic flux density Br/saturation magnetic flux density Bm) of usually 0.85 to 0.95, preferably 0.86 to 0.95; a gloss (of the coating film) of usually 165 to 300%, preferably 170 to 300%; a surface roughness Ra (of the coating film) of usually not more than 9.5 nm, preferably 2.0 to 9.0 nm, more preferably 2.0 to 8.5 nm; a Young's modulus (relative value to a commercially available video tape: and AV T-120 produced by Victor Company of Japan, Limited) of usually 124 to 160, preferably 126 to 160; a linear absorption (of the coating film) of usually 1.20 to 5.00 $\mu m^{-1}$, preferably 1.30 to 5.00 $\mu m^{-1}$; and a surface resistivity (of the coating film) of usually not more than $1.0\times10^{10}$ Ω/cm², preferably not more than $7.5\times10^9$ Ω/cm², more preferably not more than $5.0\times10^9$ Ω/cm².

The magnetic recording medium according to the third aspect of the present invention in which the black composite hematite particles coated with no hydroxides and/or oxides of aluminum and/or silicon coat are used as a filler and magnetic metal particles containing iron as a main component or magnetic alloy particles containing iron as a main component are used as magnetic particles, has a coercive force value of usually 800 to 3,500 Oe (63.7 to 278.5 kA/m), preferably 900 to 3,500 Oe (71.6 to 278.5 kA/m); a squareness (residual magnetic flux density Br/saturation magnetic flux density Bm) of usually 0.85 to 0.95, preferably 0.86 to 0.95; a gloss (of the coating film) of usually 185 to 300%, preferably 190 to 300%; a surface roughness Ra (of the coating film) of usually not more than 9.0 nm, preferably 2.0 to 8.5 nm, more preferably 2.0 to 8.0 nm; a Young's modulus (relative value to a commercially available video tape: and AV T-120 produced by Victor Company of Japan, Limited) of usually 122 to 160, preferably 124 to 160; a linear absorption (of the coating film) of usually 1.20 to 5.00 $\mu m^{-1}$, preferably 1.30 to 5.00 $\mu m^{-1}$; and a surface resistivity (of the coating film) of usually not more than $1.0\times10^{10}$ Ω/cm², preferably not more than $7.5\times10^9$ Ω/cm², more preferably not more than $5.0\times10^9$ Ω/cm².

The magnetic recording medium according to the fourth aspect of the present invention in which the black composite hematite particles coated with hydroxides and/or oxides of aluminum and/or silicon coat are used as a filler and magnetic metal particles containing iron as a main component or magnetic alloy particles containing iron as a main component are used as magnetic particles, has a coercive force value of usually 800 to 3,500 Oe (63.7 to 278.5 kA/m), preferably 900 to 3,500 Oe (71.6 to 278.5 kA/m); a squareness (residual magnetic flux density Br/saturation magnetic flux density Bm) of usually 0.85 to 0.95, preferably 0.86 to 0.95; a gloss (of the coating film) of usually 190 to 300%, preferably 195 to 300%; a surface roughness Ra (of the coating film) of usually not more than 8.5 nm, preferably 2.0 to 8.0 nm, more preferably 2.0 to 7.5 nm; a Young's modulus (relative value to a commercially available video tape: and AV T-120 produced by Victor Company of Japan, Limited) of usually 124 to 160, preferably 126 to 160; a linear absorption (of the coating film) of usually 1.20 to 5.00 $\mu m^{-1}$, preferably 1.30 to 5.00 $\mu m^{-1}$; and a surface resistivity (of the coating film) of usually not more than $1.0\times10^{10}$ Ω/cm², preferably not more than $7.5\times10^9$ Ω/cm², more preferably not more than $5.0\times10^9$ Ω/cm².

As to the electromagnetic performance of the magnetic recording medium of the first and third aspects in the present invention in which the black composite hematite particles coated with no hydroxides and/or oxides of aluminum and/or silicon coat are used as a filler, in the case where magnetic particles having a coercive force value of not less than 250 Oe (19.9 kA/m) and less than 800 Oe (63.7 kA/m) is used therein, the output at a recording frequency of 4 MHz is usually not less than +1.0 dB, preferably not less than +1.5 dB when the output is expressed by a relative value on the basis of a reference tape produced by the same method as used in the present invention except that alumina is used as a filler in an amount of 7.0 parts by weight based on 100 parts by weight of the magnetic particles; and in the case where magnetic particles having a coercive force value of 800 to 4,000 Oe (63.7 to 318.3 kA/m) are used in such a magnetic recording medium, the output at a recording frequency of 7 MHz is usually not less than +1.0 dB, preferably not less than +1.5 dB.

As to the electromagnetic performance of the magnetic recording medium of the second and fourth aspects in the present invention in which the black composite hematite particles coated with hydroxides and/or oxides of aluminum and/or silicon coat are used as a filler, in the case where magnetic particles having a coercive force value of not less than 250 Oe (19.9 kA/m) and less than 800 Oe (63.7 kA/m) are used therein, the output at a recording frequency of 4 MHz is usually not less than +1.5 dB, preferably not less than +2.0 dB when also expressed by the same relative value as described above; and in the case where magnetic particles having a coercive force value of 800 to 4,000 Oe (63.7 to 318.3 kA/m) are used, the output at a recording frequency of 7 MHz is usually not less than +1.5 dB, preferably not less than +2.0 dB.

As to the durability of the magnetic recording medium using as a filler the black composite hematite particles coated with no hydroxides and/or oxides of aluminum and/or silicon coat, the running durability time thereof is usually not less than 20 minutes, preferably not less than 22 minutes, more preferably not less than 24 minutes when measured by the below-described method. Further, the degree (rank) of contamination of the magnetic head under the above condition is usually B or A, preferably A.

As to the durability of the magnetic recording medium using as a filler the black composite hematite particles coated with hydroxides and/or oxides of aluminum and/or silicon coat, the running durability time thereof is usually not less than 22 minutes, preferably not less than 24 minutes, more preferably not less than 26 minutes. Further, the degree (rank) of contamination of the magnetic head under the above condition is usually B or A, preferably A.

The magnetic recording medium according to the fifth aspect of the present invention in which the black composite hematite particles coated with no hydroxides and/or oxides of aluminum and/or silicon coat are used as a filler and the non-magnetic undercoating layer is disposed between the non-magnetic base film and the magnetic recording film, has a coercive force value of usually 250 to 4,000 Oe (19.9 to 318.3 kA/m), preferably 300 to 4,000 Oe (23.9 to 318.3 kA/m); a squareness (residual magnetic flux density Br/saturation magnetic flux density Bm) of usually 0.85 to 0.95, preferably 0.86 to 0.95; a gloss (of the coating film) of usually 165 to 300%, preferably 170 to 300%; a surface roughness Ra (of the coating film) of usually not more than 9.5 nm, preferably 2.0 to 9.0 nm, more preferably 2.0 to 8.5 nm; a linear absorption (of the coating film) of usually 1.30 to 5.00 $\mu m^{-1}$, preferably 1.35 to 5.00 $\mu m^{-1}$; and a surface resistivity (of the coating film) of usually not more than $1.0\times10^9$ $\Omega/cm^2$, preferably not more than $7.5\times10^8$ $\Omega/cm^2$, more preferably not more than $5.0\times10^8$ $\Omega/cm^2$.

The magnetic recording medium according to the sixth aspect of the present invention in which the black composite hematite particles coated with hydroxides and/or oxides of aluminum and/or silicon coat are used as a filler and the non-magnetic undercoating layer is disposed between the non-magnetic base film and the magnetic recording film, has a coercive force value of usually 250 to 4,000 Oe (19.9 to 318.3 kA/m), preferably 300 to 4,000 Oe (23.9 to 318.3 kA/m); a squareness (residual magnetic flux density Br/saturation magnetic flux density Bm) of usually 0.85 to 0.95, preferably 0.86 to 0.95; a gloss (of the coating film) of usually 170 to 300%, preferably 175 to 300%; a surface roughness Ra (of the coating film) of usually not more than 9.0 nm, preferably 2.0 to 8.5 nm, more preferably 2.0 to 8.0 nm; a linear absorption (of the coating film) of usually 1.35 to 5.00 $\mu m^{-1}$, preferably 1.40 to 5.00 $\mu m^{-1}$; and a surface resistivity (of the coating film) of usually not more than $1.0\times10^9$ $\Omega/cm^2$, preferably not more than $7.5\times10^8$ $\Omega/cm^2$, more preferably not more than $5.0\times10^8$ $\Omega/cm^2$.

The magnetic recording medium according to the seventh aspect of the present invention in which the black composite hematite particles coated with no hydroxides and/or oxides of aluminum and/or silicon coat are used as a filler, magnetic metal particles containing iron as a main component or magnetic alloy particles containing iron as a main component are used as magnetic particles and the non-magnetic undercoating layer is disposed between the non-magnetic base film and the magnetic recording film, has a coercive force value of usually 800 to 3,500 Oe (63.7 to 278.5 kA/m), preferably 900 to 3,500 Oe (71.6 to 278.5 kA/m); a squareness (residual magnetic flux density Br/saturation magnetic flux density Bm) of usually 0.85 to 0.95, preferably 0.86 to 0.95; a gloss (of the coating film) of usually 190 to 300%, preferably 195 to 300%; a surface roughness Ra (of the coating film) of usually not more than 8.5 nm, preferably 2.0 to 8.0 nm, more preferably 2.0 to 7.5 nm; a linear absorption (of the coating film) of usually 1.30 to 5.00 $\mu m^{-1}$, preferably 1.35 to 5.00 $\mu m^{-1}$; and a surface resistivity (of the coating film) of usually not more than $1.0\times10^9$ $\Omega/cm^2$, preferably not more than $7.5\times10^8$ $\Omega/cm^2$, more preferably not more than $5.0\times10^8$ $\Omega/cm^2$.

The magnetic recording medium according to the eighth aspect of the present invention in which the black composite hematite particles coated with hydroxides and/or oxides of aluminum and/or silicon coat are used as a filler, magnetic metal particles containing iron as a main component or magnetic alloy particles containing iron as a main component are used as magnetic particles and the non-magnetic undercoating layer is disposed between the non-magnetic base film and the magnetic recording film, has a coercive force value of usually 800 to 3,500 Oe (63.7 to 278.5 kA/m), preferably 900 to 3,500 Oe (71.6 to 278.5 kA/m); a squareness (residual magnetic flux density Br/saturation magnetic flux density Bm) of usually 0.85 to 0.95, preferably 0.86 to 0.95; a gloss (of the coating film) of usually 195 to 300%, preferably 200 to 300%; a surface roughness Ra (of the coating film) of usually not more than 8.0 nm, preferably 2.0 to 7.5 nm, more preferably 2.0 to 7.0 nm; a linear absorption (of the coating film) of usually 1.35 to 5.00 $\mu m^{-1}$, preferably 1.40 to 5.00 $\mu m^{-1}$; and a surface resistivity (of the coating film) of usually not more than $1.0\times10^9$ $\Omega/cm^2$, preferably not more than $7.5\times10^8$ $\Omega/cm^2$, more preferably not more than $5.0\times10^8$ $\Omega/cm^2$.

As to the electromagnetic performance of the magnetic recording medium of the fifth and seventh aspects in the present invention, which has a non-magnetic undercoat layer and contains as a filler the black composite hematite particles coated with no hydroxides and/or oxides of aluminum and/or silicon coat, in the case where magnetic particles having a coercive force value of not less than 250 Oe (19.9 kA/m) and less than 1,200 Oe (95.5kA/m) is used therein, the output value at a recording frequency of 4 MHz is usually not less than +1.2 dB, preferably not less than +1.7 dB; and in the case where magnetic particles having a coercive force value of 1,200 to 4,000 Oe (95.5 to 318.3 kA/m) are used in such a magnetic recording medium, the output value at a recording frequency of 7 MHz is usually not less than +1.2 dB, preferably not less than +1.7 dB.

As to the electromagnetic performance of the magnetic recording medium of the sixth and eighth aspects in the present invention, which has a non-magnetic undercoat layer and contains as a filler the black composite hematite particles coated with hydroxides and/or oxides of aluminum and/or silicon coat, in the case where magnetic particles having a coercive force value of not less than 250 Oe (19.9 kA/m) and less than 1,200 Oe (95.5kA/m) is used therein, the output value at a recording frequency of 4 MHz is usually not less than +1.7 dB, preferably not less than +2.2 dB; and in the case where magnetic particles having a coercive force value of 1,200 to 4,000 Oe (95.5 to 318.3 kA/m) are used in such a magnetic recording medium, the output value at a recording frequency of 7 MHz is usually not less than +1.7 dB, preferably not less than +2.2 dB.

As to the durability of the magnetic recording medium of the fifth and seventh aspects in the present invention which has a non-magnetic undercoat layer and uses as a filler the black composite hematite particles coated with no hydroxides and/or oxides of aluminum and/or silicon coat, the running durability time is usually not less than 24 minutes, preferably not less than 25 minutes, more preferably not less than 26 minutes. Further, the degree (rank) of contamination of the magnetic head under the above condition is usually B or A, preferably A.

As to the durability of the magnetic recording medium of the sixth and eighth aspects in the present invention which has a non-magnetic undercoat layer and uses as a filler the black composite hematite particles coated with hydroxides and/or oxides of aluminum and/or silicon coat, the running durability time is usually not less than 25 minutes, preferably not less than 26 minutes, more preferably not less than 27 minutes. Further, the degree (rank) of contamination of the magnetic head under the above condition is usually B or A, preferably A.

Next, the process for producing the black composite hematite particles according to the present invention, is described.

The coating of the hematite particles as core particles with the alkoxysilane compounds, the polysiloxanes, the modified polysiloxanes, the terminal-modified polysiloxanes or the fluoroalkylsilane compounds, may be conducted (i) by mechanically mixing and stirring the hematite particles as core particles together with the alkoxysilane compounds, the polysiloxanes, the modified polysiloxanes, the terminal-modified polysiloxanes or the fluoroalkylsilane compounds; or (ii) by mechanically mixing and stirring both the components together while spraying the alkoxysilane compounds, the polysiloxanes, the modified polysiloxanes, the terminal-modified polysiloxanes or the fluoroalkylsilane compounds onto the hematite particles as core particles. In these cases, substantially whole amount of the alkoxysilane compounds, the polysiloxanes, the modified polysiloxanes, the terminal-modified polysiloxanes or the fluoroalkylsilane compounds added can be applied onto the surfaces of the hematite particles as core particles.

In order to uniformly coat the surfaces of the hematite particles as core particles with the alkoxysilane compounds, the polysiloxanes, the modified polysiloxanes, the terminal-modified polysiloxanes or the fluoroalkylsilane compounds, it is preferred that the hematite particles as core particles are preliminarily diaggregated by using a pulverizer.

As apparatus (a) for mixing and stirring the core particles with the alkoxysilane compounds, the polysiloxanes, the modified polysiloxanes, the terminal-modified polysiloxanes or the fluoroalkylsilane compounds to form the coating layer thereof, and (b) for mixing and stirring carbon black fine particles with the particles whose surfaces are coated with the alkoxysilane compounds, the polysiloxanes, the modified polysiloxanes, the terminal-modified polysiloxanes or the fluoroalkylsilane compounds to form the carbon black coat, there may be preferably used those apparatus capable of applying a shear force to the particles, more preferably those apparatuses capable of conducting the application of shear force, spaturate force and compressed force at the same time.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In addition, by conducting the above-mentioned mixing or stirring treatment (a) of the hematite particles as core particles together with the alkoxysilane compounds, the polysiloxanes, the modified polysiloxanes, the terminal-modified polysiloxanes or the fluoroalkylsilane compounds, at least a part of the alkoxysilane compounds and the fluoroalkylsilane compounds coated on the hematite particles as core particles may be changed to the organosilane compounds and fluoroalkyl organosilane compounds, respectively.

In order to coat the surfaces of the core particles with the alkoxysilane compounds, the polysiloxanes, the modified polysiloxanes, the terminal-modified polysiloxanes or the fluoroalkylsilane compounds as uniformly as possible, the conditions of the above mixing or stirring treatment may be appropriately controlled such that the linear load is usually 2 to 200 Kg/cm (19.6 to 1960 N/cm), preferably 10 to 150 Kg/cm (98 to 1470 N/cm), more preferably 15 to 100 Kg/cm (147 to 980 N/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes, the terminal-modified polysiloxanes or the fluoroalkylsilane compounds added, is preferably 0.15 to 45 parts by weight based on 100 parts by weight of the hematite particles as core particles. When the amount of the alkoxysilane compounds, the polysiloxanes, the modified polysiloxanes, the terminal-modified polysiloxanes or the fluoroalkylsilane compounds added is less than 0.15 part by weight, it may become difficult to form the carbon black coat in such an amount enough to improve the blackness of the obtained black composite hematite particles.

On the other hand, when the amount of the alkoxysilane compounds, the polysiloxanes, the modified polysiloxanes, the terminal-modified polysiloxanes or the fluoroalkylsilane compounds added is more than 45 parts by weight, a sufficient amount of the carbon black coat can be formed on the surface of the coating layer, but it is meaningless because the blackness of the composite particles cannot be further improved by using such an excess amount of the alkoxysilane compounds, the polysiloxanes, the modified polysiloxanes, the terminal-modified polysiloxanes or the fluoroalkylsilane compounds.

Next, the carbon black fine particles are added to the hematite particles coated with the alkoxysilane compounds, the polysiloxanes, the modified polysiloxanes, the terminal-modified polysiloxanes or the fluoroalkylsilane compounds, and the resultant mixture is continuously mixed and stirred to form a carbon black coat on the surfaces of the coating layer composed of the alkoxysilane compounds, the polysiloxanes, the modified polysiloxanes, the terminal-modified polysiloxanes or the fluoroalkylsilane compounds.

In addition by conducting the above-mentioned mixing or stirring treatment (b) of the carbon black fine particles together with the hematite particles coated with the alkoxysilane compounds, the polysiloxanes, the modified polysiloxanes, the terminal-modified polysiloxanes or the fluoroalkylsilane compounds, at least a part of the alkoxysilane compounds and the fluoroalkylsilane compounds coated on the hematite particles may be changed to the organosilane compounds and fluoroalkyl organosilane compounds, respectively.

In the case where the alkoxysilane compounds and the fluoroalkylsilane compounds are used as the coating compound, after the carbon black coat is formed on the surface of the coating layer, the resultant black composite hematite particles may be dried or heat-treated, for example, at a temperature of usually 40 to 200° C., preferably 60 to 150° C. for usually 10 minutes to 12 hours, preferably 30 minutes to 3 hours, thereby forming a coating layer composed of the organosilicon compounds (1) and the fluoroalkyl organosilicon compounds (3), respectively.

It is preferred that the carbon black fine particles are added little by little and slowly, especially about 5 to 60 minutes.

In order to form carbon black coat onto the coating layer composed of the alkoxysilane compounds, the polysiloxanes, the modified polysiloxanes, the terminal-modified polysiloxanes or the fluoroalkylsilane compounds as uniformly as possible, the conditions of the above mixing or stirring treatment can be appropriately controlled such that the linear load is usually 2 to 200 Kg/cm (19.6 to 1960 N/cm), preferably 10 to 150 Kg/cm (98 to 1470 N/cm), more preferably 15 to 100 Kg/cm (147 to 980 N/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the carbon black fine particles added, is preferably 1 to 30 parts by weight based on 100 parts by weight of the hematite particles as core particles. When the amount of the carbon black fine particles added is less than 1 part by weight, it may become difficult to form the carbon black coat in such an amount enough to improve the blackness of the obtained composite particles. On the other hand, when the amount of the carbon black fine particles added is more than 30 parts by weight, a sufficient blackness of the resultant composite particles can be obtained, but the carbon black tend to be desorbed from the surface of the coating layer because of too large amount of the carbon black adhered, resulting in deteriorated dispersibility in a vehicle.

At least a part of the surface of the hematite particles as core particles may be coated with at least one compound selected from the group consisting of hydroxides of aluminum, oxides of aluminum, hydroxides of silicon and oxides of silicon, in advance of mixing and stirring with the alkoxysilane compounds, the polysiloxanes, the modified polysiloxanes, the terminal-modified polysiloxanes or the fluoroalkylsilane compounds.

The coating of the hydroxides and/or oxides of aluminum and/or silicon may be conducted by adding an aluminum compound, a silicon compound or both the compounds to a water suspension in which the hematite particles are dispersed, followed by mixing and stirring, and further adjusting the pH of the suspension, if required, thereby coating the surfaces of the hematite particles with at least one compound selected from the group consisting of hydroxides of aluminum, oxides of aluminum, hydroxides of silicon and oxides of silicon. The thus obtained particles coated with the hydroxides and/or oxides of aluminum and/or silicon are then filtered out, washed with water, dried and pulverized. Further, the particles coated with the hydroxides and/or oxides of aluminum and/or silicon may be subjected to post-treatments such as deaeration treatment and compaction treatment.

As the aluminum compounds, there may be exemplified aluminum salts such as aluminum acetate, aluminum sulfate, aluminum chloride or aluminum nitrate, alkali aluminates such as sodium aluminate, or the like.

The amount of the aluminum compound added is 0.01 to 50.00% by weight (calculated as Al) based on the weight of the hematite particles. When the amount of the aluminum compound added is less than 0.01% by weight, it may be difficult to sufficiently coat the surfaces of the hematite particles with hydroxides or oxides of aluminum or silicon, thereby failing to improve the dispersibility in a vehicle. On the other hand, when the amount of the aluminum compound added is more than 50.00% by weight, the coating effect is saturated and, therefore, it is meaningless to add such an excess amount of the aluminum compound.

As the silicon compounds, there may be exemplified water glass #3, sodium orthosilicate, sodium metasilicate, colloidal silica or the like.

The amount of the silicon compound added is 0.01 to 50.00% by weight (calculated as $SiO_2$) based on the weight of the hematite particles. When the amount of the silicon compound added is less than 0.01% by weight, it may be difficult to sufficiently coat the surfaces of the hematite particles with hydroxides or oxides of silicon, thereby failing to improve the dispersibility in a vehicle. On the other hand, when the amount of the silicon compound added is more than 50.00% by weight, the coating effect is saturated and, therefore, it is meaningless to add such an excess amount of the silicon compound.

In the case where both the aluminum and silicon compounds are used in combination for the coating, the total amount of the aluminum and silicon compounds added is preferably 0.01 to 50.00% by weight (calculated as a sum of Al and $SiO_2$) based on the weight of the hematite particles.

Next, the process for producing the magnetic recording medium according to the present invention is described.

The magnetic recording medium according to the first aspect of the present invention can be produced by an ordinary method, i.e., by coating the surface of the non-magnetic base film with a magnetic coating composition comprising magnetic particles, a binder resin, black composite hematite particles as a filler and a solvent to form a magnetic recording layer thereon, and then magnetically orienting the magnetic recording layer.

The magnetic recording medium according to the fifth aspect of the present invention can be produced by an ordinary method, i.e., by coating the surface of the non-magnetic base film with a non-magnetic coating composition comprising non-magnetic particles, a binder resin and a solvent to form a coating film thereon; drying the coating film to form a non-magnetic undercoat layer; coating the surface of the non-magnetic undercoat layer with a magnetic coating composition comprising magnetic particles, a binder resin, black composite hematite particles and a solvent to form a magnetic recording layer thereon, and then magnetically orienting the magnetic recording layer.

Upon kneading and dispersing the non-magnetic coating composition and magnetic coating composition, as kneaders, there may be used, for example, twin-screw kneader, twin-screw extruder, pressure kneader, twin-roll mill, triple-roll mill or the like; and as dispersing devices, there may be used ball mill, sand grinder, attritor, disper, homogenizer, ultrasonic dispersing device or the like.

The coating of the non-magnetic coating composition and magnetic coating composition may be conducted using gravure coater, reverse-roll coater, slit coater, die coater or the like. The thus obtained coating film may be magnetically oriented using counter magnet, solenoid magnet or the like.

As the solvents, there may be exemplified those ordinarily used for the production of conventional magnetic recording media such as methyl ethyl ketone, toluene, cyclohexanone, methyl isobutyl ketone, tetrahydrofuran or a mixture thereof.

The total amount of the solvent(s) used in the non-magnetic coating composition or magnetic coating composition is 65 to 1,000 parts by weight based on 100 parts by weight of the non-magnetic particles or magnetic particles. When the amount of the solvent used is less than 65 parts by weight, the viscosity of the obtained non-magnetic coating composition or magnetic coating composition may be too high, so that it is difficult to coat such a composition. When the amount of the solvent used is more than 1,000 parts by weight, the amount of the solvent vaporized upon coating may be too large, resulting in industrial disadvantages.

In the case where the black composite hematite particles having an average diameter of 0.08 to 1.0 $\mu$m and comprising hematite particles as core particles which may be coated with at least one compound selected from the group consisting of hydroxides of aluminum, oxides of aluminum, hydroxides of silicon and oxides of silicon; a coating layer formed on surface of each core particle and comprising an organosilicon compound; and a carbon black coat formed on the organosilicon coating, are used as a black filler to be incorporated into the magnetic recording layer, there is obtained the magnetic recording medium capable of exhibiting not only an excellent durability and a good electromagnetic performance, but also a low light transmittance and a small surface resistivity.

The reason why the magnetic recording medium according to the present invention has an excellent durability and a good electromagnetic performance, is considered as follows. That is, due to the fact that the amount of carbon black desorbed from the surface of each black composite hematite particle is very small, respective components present in the system, especially the magnetic particles are well dispersed without being adversely affected by carbon black. Further, since carbon black coat is formed onto the surface of each black composite hematite particle, irregularities are formed thereon. Therefore, the magnetic particles are prevented from contacting with each other because such black composite hematite particles having surface irregularities are interposed therebetween, so that the magnetic particles tends to be packed with a high density in the magnetic recording layer.

Especially, in the case of using the alkoxysilane compounds or the fluoroalkylsilane compounds, metalloxane bonds ($\equiv$Si—O—M, wherein M represents a metal atom contained in the hematite particle as core particle, such as Si, Al or Fe) are formed between the metal elements such as Si, Al or Fe which are contained within the hematite particle or present at the surface thereof, and alkoxy groups of the alkoxysilane compounds or the fluoroalkylsilane compounds on which the carbon black coat is formed, so that the organosilicon compounds onto which the carbon black coat is formed, can be more strongly bonded to the surface of the hematite particle. Further, in the case of using the polysiloxanes or modified polysiloxanes, the functional groups in the polysiloxanes or modified polysiloxanes onto which the carbon black coat is formed, are strongly bonded to the surface of the hematite particle.

The reason why the magnetic recording medium according to the present invention exhibits a low light transmittance, is considered as follows. That is, the low light transmittance is attributed to the excellent blackness of the black composite hematite particles contained in the magnetic recording layer. More specifically, in the black composite hematite particles of the present invention, carbon black fine particles which behave as an agglomarated matter caused by usually fine particles, are adhered on the surfaces of the hematite particles through the organosilicon compounds, so that the carbon black coat is uniformly and densely formed on the surface thereof. Therefore, the effect and function of the carbon black are more remarkably exhibited.

The reason why the magnetic recording medium according to the present invention exhibits a small surface resistivity, is considered as follows. That is, due to the fact that the black composite hematite particles are uniformly dispersed in the magnetic recording layer, the carbon black coat uniformly and densely formed onto the surfaces thereof is continuously contacted with each other.

In the magnetic recording medium according to the present invention, as a black filler, there are used the black composite hematite particles capable of preventing the deterioration of electromagnetic performance even when added in an amount sufficient to enhance the durability, and of reducing an amount of carbon black fine particles added together therewith, due to sufficient blackness thereof. As a result, the magnetic recording medium has an excellent durability and a good electromagnetic performance and, therefore, is suitable for high-density recording.

Since the amount of carbon black fine particles used is very small, the magnetic recording medium according to the present invention is favorable from standpoints of safety and hygiene.

The black composite hematite particles of the present invention have an excellent dispersibility in vehicle upon the production of a magnetic coating composition and, therefore, are excellent in handling and processing properties, thereby providing industrial and economical advantages.

Further, the magnetic recording medium having the non-magnetic undercoating layer, since the black composite hematite particles having an excellent blackness and a low volume resistivity are used as a filler, has a smooth surface, a low light transmittance and a small surface resistivity. Therefore, the magnetic recording medium of the present invention is more suitable as those for high-density recording.

EXAMPLES

The present invention is described in more detail by Examples and Comparative Examples, but the Examples are only illustrative and, therefore, not intended to limit the scope of the present invention.

Various properties were measured by the following methods.

(1) The average particle diameter, the average major axial diameter and average minor axial diameter of hematite particles, black composite hematite particles and carbon black fine particles were respectively expressed by the average of values (measured in a predetermined direction) of about 350 particles which were sampled from a micrograph obtained by magnifying an original electron micrograph by four times (×80,000) in each of the longitudinal and transverse directions.

(2) The aspect ratio of the particles was expressed by the ratio of average major axial diameter to average minor axial diameter thereof. The plate ratio of the particles was expressed by the ratio of the average plate surface diameter to the average thickness thereof.

(3) The geometrical standard deviation of particle diameter was expressed by values obtained by the following method. That is, the particle sizes were measured from the above magnified electron micrograph. The actual particle sizes and the number of the particles were calculated from the measured values. On a logarithmic normal probability paper, the particle sizes were plotted at regular intervals on the abscissa-axis and the accumulative number (under integration sieve) of particles belonging to each interval of the particle sizes were plotted by percentage on the ordinate-axis by a statistical technique.

The particle sizes corresponding to the number of particles of 50% and 84.13%, respectively, were read from the graph, and the geometrical standard deviation was calculated from the following formula:

Geometrical standard deviation={particle sizes corresponding to 84.13% under integration sieve}/{particle sizes (geometrical average diameter) corresponding to 50% under integration sieve}

The closer to 1 the geometrical standard deviation value, the more excellent the particle size distribution.

(4) The specific surface area was expressed by the value measured by a BET method.

(5) The amount of Mn, Al and Si which were present within hematite particles or black composite hematite particles, or on surfaces thereof, and the amount of Si contained in the organosilicon compounds, were measured by a fluorescent X-ray spectroscopy device 3063 (manufactured by Rigaku Denki Kogyo Co., Ltd.) according to JIS K0119 "General rule of fluorescent X-ray analysis".

(6) The amount of carbon black coat formed on the surface of the black composite hematite particles was measured by "Horiba Metal, Carbon and Sulfur Analyzer EMIA-2200 Model" (manufactured by Horiba Seisakusho Co., Ltd.).

(7) The thickness of carbon black coat formed on the surfaces of the black composite hematite particles is expressed by the value which was obtained by first measuring an average thickness of carbon black coat formed onto the surfaces of the particles on a photograph (×5,000,000) obtained by magnifying (ten times) a micrograph (×500,000) produced at an accelerating voltage of 200 kV using a transmission-type electron microscope (JEM-2010, manufactured by Japan Electron Co., Ltd.), and then calculating an actual thickness of carbon black coat formed from the measured average thickness.

(8) The desorption percentage (T %) of carbon black desorbed from the black composite hematite particles was measured by the following method.

That is, 3 g of the black composite hematite particles and 40 ml of ethanol were placed in a 50-ml precipitation pipe and then was subjected to ultrasonic dispersion for 20 minutes. Thereafter, the obtained dispersion was allowed to stand for 120 minutes, and separated the carbon black desorbed from the black composite hematite particles on the basis of the difference in specific gravity therebetween. Next, the thus separated black composite hematite particles were mixed again with 40 ml of ethanol, and the obtained mixture was further subjected to ultrasonic dispersion for 20 minutes. Thereafter, the obtained dispersion was allowed to stand for 120 minutes, thereby separating the black composite hematite particles and carbon black desorbed, from each other. The thus separated black composite hematite particles were dried at 100° C. for one hour, and then the carbon content thereof was measured by the "Horiba Metal, Carbon and Sulfur Analyzer EMIA-2200 Model" (manufactured by HORIBA SEISAKUSHO CO., LTD.). The desorption percentage (T %) was calculated according to the following formula:

$$T(\%) = \{(W_a - W_e)/W_a\} \times 100$$

wherein $W_a$ represents an amount of carbon black initially formed on the black composite hematite particles; and $W_e$ represents an amount of carbon black which still remains on the black composite hematite particles after the above desorption test.

The closer to zero the desorption percentage (T %), the smaller the amount of carbon black desorbed from the black composite hematite particles.

(9) The blackness of the hematite particles and black composite hematite particles was measured by the following method. That is, 0.5 g of sample particles and 1.5 ml of castor oil were intimately kneaded together by a Hoover's muller to form a paste. 4.5 g of clear lacquer was added to the obtained paste and was intimately kneaded to form a paint. The obtained paint was applied on a cast-coated paper by using a 6-mil (150 $\mu$m) applicator to produce a coating film piece (having a film thickness of about 30 $\mu$m). The thus obtained coating film piece was measured according to JIS Z 8729 by a multi-light source spectrographic colorimeter MSC-IS-2D (manufactured by Suga Testing Machines Manufacturing Co., Ltd.) to determine an L* value of calorimetric indices thereof. The blackness was expressed by the L* value measured.

Here, the L* value represents a lightness, and the smaller the L* value, the more excellent the blackness.

(10) The volume resistivity of the hematite particles and the black composite hematite particles was measured by the following method.

That is, first, 0.5 g of a sample particles to be measured was weighted, and press-molded at 140 Kg/cm$^2$ (13,720 kPa) using a KBr tablet machine (manufactured by Simazu Seisakusho Co., Ltd.), thereby forming a cylindrical test piece.

Next, the thus obtained cylindrical test piece was exposed to an atmosphere maintained at a temperature of 25° C. and a relative humidity of 60% for 12 hours. Thereafter, the cylindrical test piece was set between stainless steel electrodes, and a voltage of 15V was applied between the electrodes using a Wheatstone bridge (model 4329A, manufactured by Yokogawa-Hokushin Denki Co., Ltd.) to measure a resistance value R ($\Omega$).

The cylindrical test piece was measured with respect to an upper surface area A (cm$^2$) and a thickness $t_0$ (cm) thereof. The measured values were inserted into the following formula, thereby obtaining a volume resistivity X ($\Omega \cdot$cm).

$$X(\Omega \cdot cm) = R \times (A/t_0)$$

(11) The viscosity of the coating composition was obtained by measuring the viscosity of the coating composition at 25° C. at a shear rate D of 1.92 sec$^{-1}$ by using "E type viscometer EMD-R" (manufactured by Tokyo Keiki, Co., Ltd.).

(12) The magnetic properties of the magnetic particles and magnetic recording medium were measured under an external magnetic field of 795.8 kA/m (10 kOe) by "Vibration Sample Magnetometer VSM-3S-15 (manufactured by Toei Kogyo, Co., Ltd.)".

(13) The gloss of the surface of the coating film of the magnetic recording layer was measured at an angle of incidence of 45° by "glossmeter UGV-5D" (manufactured by Suga Shikenki, Co., Ltd.).

(14) The surface roughness Ra is expressed by the average value of the center-line average roughness of the profile curve of the surface of the coating film of the magnetic recording layer by using "Surfcom-575A" (manufactured by Tokyo Seimitsu Co., Ltd.).

(15) The light transmittance is expressed by the linear adsorption coefficient calculated by substituting the light transmittance measured by using "UV-Vis Recording Spectrophotometer UV-2100" (manufactured by Shimazu Seisakusho, Ltd.) for the following formula. The larger the value, the more difficult it is for the magnetic recording medium to transmit light:

Linear adsorption coefficient ($\mu m^{-1}$) {1 n (1/t)}/FT wherein t represents a light transmittance (–) at $\lambda$=900 nm, and FT represents thickness ($\mu$m) of the coating film used for the measurement.

(16) The electromagnetic performance was expressed by a relative value of an output of a magnetic recording medium (tape) with respect to that of a reference tape which outputs were measured by reproducing signals recorded at a frequency of 4 MHz or 7 MHz by setting a relative speed between magnetic tape and magnetic head to 5.8 m/s, using a DRUM TESTER BX-3168 (manufactured by BELDEX Co., Ltd.).

The reference tape was produced by the same method as used in the present invention except that the black composite hematite particles in the magnetic coating composition were replaced with alumina (tradename: AKP-30, produced by Sumitomo Kagaku Co., Ltd.), and the alumina was added in an amount of 7.0 parts by weight based on 100 parts by weight of the magnetic particles.

(17) The durability of the magnetic medium was evaluated by the following running durability and the head contamination.

The running durability was evaluated by the actual operating time under the conditions that the load was 9.6 N (200 gw) and the relative speed of the head and the tape was 16 m/s by using "Media Durability Tester MDT-3000" (manufactured by Steinberg Associates). The longer the actual operating time, the higher the running durability.

(18) The head contamination was evaluated by visually observing the magnetic head after running the magnetic tape under a load of 19.6 N (200 gw) for 30 minutes by setting a relative speed between the magnetic tape and the magnetic head to 16 m/s, using a MEDIA DURABILITY TESTER MDT-3000 (manufactured by Steinberg Associates Co. Ltd.). The evaluation results were classified into the following four ranks. The A rank represents the smallest head contamination.

A: Not contaminated

B: Slightly contaminated

C: Contaminated

D: Severely contaminated

(19) The friction coefficient of the magnetic recording medium was determined by measuring a frictional force between a surface of the magnetic tape and a metal surface (aluminum polished surface) using a tensile tester TENSILON (manufactured by Shimadzu Seisakusho Co., Ltd.), and expressed by the ratio of the measured value to the load.

(20) The surface resistivity of the coating film of the magnetic recording layer was measured by the following method. That is, the coating film to be measured was exposed to the environment maintained at a temperature of 25° C. and a relative humidity of 60%, for not less than 12 hours. Thereafter, the coating film was slit into 6 mm width, and the slit coating film was placed on two metal electrodes having a width of 6.5 mm such that a coating surface thereof was contacted with the electrodes. 1.7 N (170 gw) were respectively suspended at opposite ends of the coating film so as to bring the coating film into close contact with the electrodes. D.C. 500 V was applied between the electrodes, thereby measuring the surface resistivity of the coating film.

(21) The strength of the non-magnetic undercoat layer was expressed the Young's modulus obtained by "Autograph" (produced by Shimazu Seisakusho Co., Ltd.). The Young's modulus was expressed by the ratio of the Young's modulus of the coating film to that of a commercially available video tape "AV T-120" (produce by Victor Company of Japan, Limited). The higher the relative value, the more favorable.

(22) The thickness of each of the non-magnetic base film, the non-magnetic undercoat layer and the magnetic recording layer constituting the magnetic recording medium was measured in the following manner by using "Digital Electronic Micrometer R351C" (manufactured by Anritsu Corp.) The thickness (A) of a base film was first measured. Similarly, the thickness (B) (B=the sum of the thicknesses of the base film and the non-magnetic undercoat layer) of a non-magnetic substrate obtained by forming a non-magnetic undercoat layer on the base film was measured. Furthermore, the thickness (C) (C=the sum of the thicknesses of the base film, the non-magnetic undercoat layer and the magnetic recording layer) of a magnetic recording medium obtained by forming a magnetic recording layer on the non-magnetic substrata was measured. The thickness of the non-magnetic undercoat layer is expressed by (B)–(A), and the thickness of the magnetic recording layer is expressed by (C)–(B).

Example 1

Production of Black Non-magnetic Composite Particles 20 kg of Mn-containing hematite particles shown in the electron micrograph (×20,000) of FIG. 1 (average particle size: 0.30 $\mu$m; geometrical standard deviation value: 1.46;

BET specific surface area value: 3.6 m²/g; Mn content: 13.3% by weight (calculated as Mn) based on the weight of the particle; blackness (L* value): 22.6; volume resistivity: $2.0 \times 10^7$ Ω·cm), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the Mn-containing hematite particles.

Successively, the obtained slurry containing the Mn-containing hematite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the Mn-containing hematite particles were dispersed.

The particles in the obtained slurry which remained on a sieve of 325 meshes (mesh size: 44 μm) was 0%. The slurry was filtered and washed with water, thereby obtaining a filter cake containing the Mn-containing hematite particles. After the obtained filter cake containing the Mn-containing hematite particles was dried at 120° C., 11.0 kg of the dried particles were then charged into an edge runner "MPLTV-2 Model" (tradename, manufactured by Matsumoto Chuzo Tekkosho Co., Ltd.), and mixed and stirred at 294 N/cm (30 Kg/cm) and a stirring speed of 22 rpm for 30 minutes, thereby lightly deagglomerating the particles. 220 g of methyl triethoxysilane (tradename: "TSL8123", produced by TOSHIBA SILICONE CO., LTD.) was mixed and diluted with 200 ml of ethanol to obtain a methyl triethoxysilane solution. The methyl triethoxysilane solution was added to the deagglomerated Mn-containing hematite particles under the operation of the edge runner. The Mn-containing hematite particles were continuously mixed and stirred at a linear load of 60 Kg/cm (588 N/cm) and a stirring speed of 22 rpm for 45 minutes.

Figure 2:
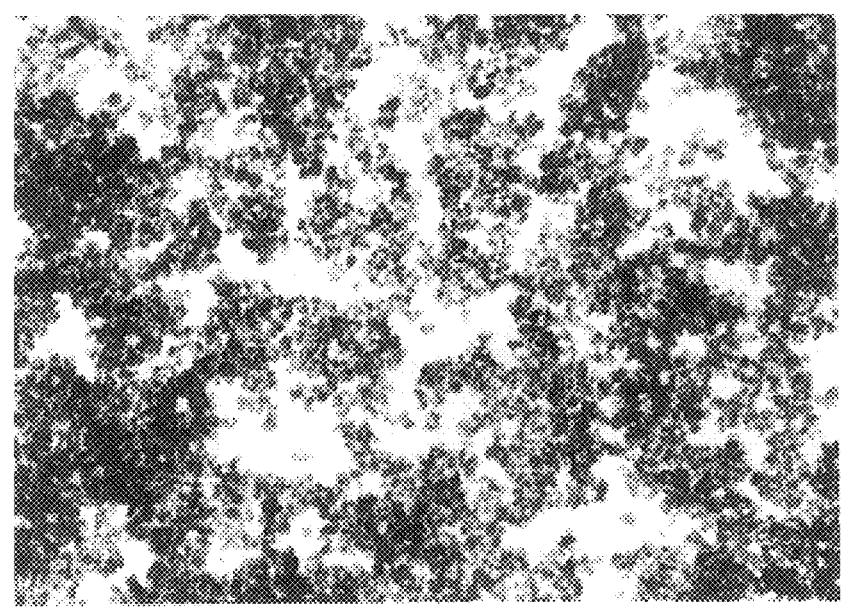
FIG. 2 is an electron micrograph (×20,000) showing a particle structure of carbon black fine particles used in Example 1.

Next, 1,100 g of carbon black fine particles A shown in the electron micrograph (×20,000) of FIG. 2 (particle shape: granular shape; average particle size: 0.022 μm; geometrical standard deviation value: 1.68; BET specific surface area value: 134 m²/g; and blackness (L* value): 16.6; pH value: 3.4; DBP oil absorption: 89 ml/100 g) were added to the Mn-containing hematite particles coated with methyl triethoxysilane for 10 minutes while operating the edge runner. Further, the mixed particles were continuously stirred at a linear load of 60 Kg/cm (588 N/cm) and a stirring speed of 22 rpm for 60 minutes to form the carbon black coat on the coating layer composed of methyl triethoxysilane, thereby obtaining black composite hematite particles.

Figure 3:
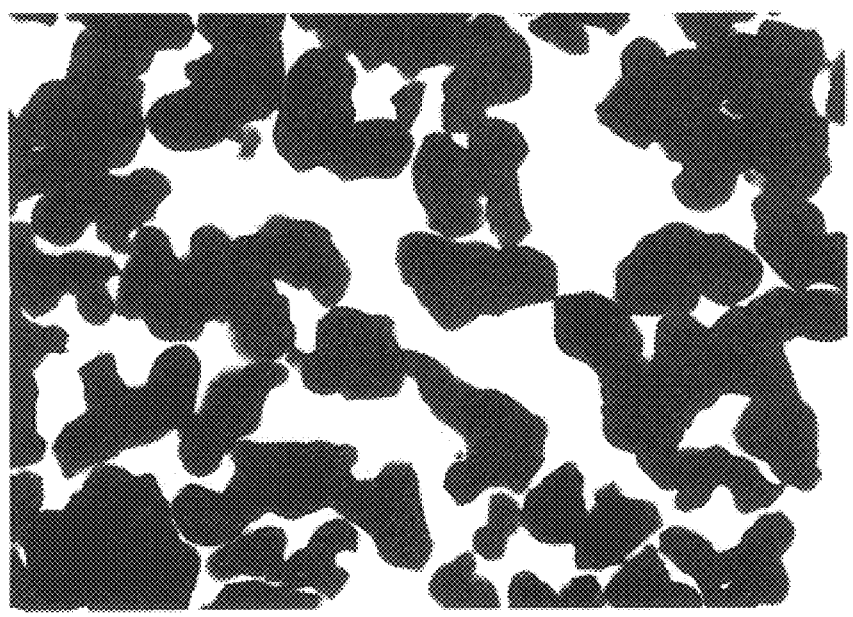
FIG. 3 is an electron micrograph (×20,000) showing a particle structure of black composite hematite particles obtained in Example 1.

The obtained black composite hematite particles were heat-treated at 105° C. for 60 minutes by using a drier to evaporate water, ethanol or the like which were remained on surfaces of the black composite hematite particles. As shown in the electron micrograph (×20,000) of FIG. 3, the resultant black composite hematite particles had an average particle diameter of 0.31 μm. In addition, the black composite hematite particles showed a geometrical standard deviation value of 1.46, a BET specific surface area value of 9.3 m²/g, a blackness (L* value) of 17.5 and a volume resistivity of $9.2 \times 10^3$ Ω·cm. The desorption percentage of the carbon black from the black composite hematite particles was 6.7%. The amount of a coating organosilane compound produced from methyl triethoxysilane was 0.30% by weight (calculated as Si). The amount of the carbon black coat formed on the coating layer composed of the organosilane compound produced from methyl triethoxysilane is 9.05% by weight (calculated as C) based on the weight of the black composite hematite particles (corresponding to 10 parts by weight based on 100 parts by weight of the Mn-containing hematite particles). The thickness of the carbon black coat formed was 0.0024 μm. Since no carbon black was recognized on the electron photograph of FIG. 3, it was confirmed that a whole amount of the carbon black used contributed to the formation of the carbon black coat on the coating layer composed of the organosilane compound produced from methyl triethoxysilane.

Figure 4:
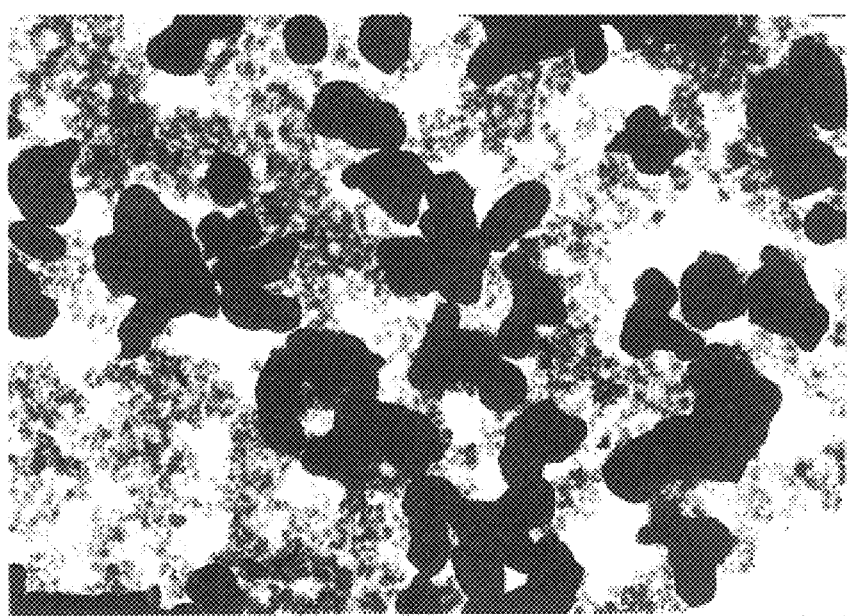
FIG. 4 is an electron micrograph (×20,000) showing a particle structure of mixed particles composed of the black manganese-containing hematite particles and the carbon black fine particles, for comparison.

For a comparative purpose, the Mn-containing hematite particles not coated with methyl triethoxysilane and the carbon black fine particles were mixed and stirred together by an edge runner in the same manner as described above, thereby obtaining treated particles as shown in the electron photograph (×20,000) of FIG. 4. As shown in FIG. 4, it was recognized that the carbon black fine particles were not adhered on the Mn-containing hematite particles, and the individual particles were present separately.

Production of Magnetic Recording Medium 100 parts by weight of Co-coated acicular magnetite particles (average major axial diameter: 0.24 μm, aspect ratio: 7.1, BET specific surface area: 31.3 m²/g, coercive force value: 714 Oe (56.8 kA/m), saturation magnetization value: 83.1 emu/g (83.1 Am²/kg), Co content: 2.26 wt. %), 10.0 parts by weight of vinyl chloride-vinyl acetate copolymer resin (tradename: MR-110, produced by Nippon Zeon Co., Ltd.), 23.3 parts by weight of cyclohexanone, 10.0 parts by weight of methyl ethyl ketone, 1.0 part by weight of carbon black fine particles (produced by Mitsubishi Chemical Corp., average diameter: 26 nm, BET specific surface area: 130 m²/g) and 7.0 parts by weight of the above obtained black composite hematite particles were kneaded together for 20 minutes using a kneader. The obtained kneaded material was diluted by adding 79.6 parts by weight of toluene, 110.2 parts by weight of methyl ethyl ketone and 17.8 parts by weight of cyclohexanone thereto, and then the resultant mixture was mixed and dispersed for 3 hours by a sand grinder, thereby obtaining a dispersion.

The obtained dispersion was mixed with 33.3 parts by weight of a solution prepared by dissolving 10.0 parts weight (solid content) of polyurethane resin (tradename: TI-1075, produced by Sanyo Kasei Kogyo Co., Ltd.) in a mixed solvent containing methyl ethyl ketone and cyclohexanone (weight ratio: 1/1), and the resultant mixture was mixed and dispersed for 30 minutes by a sand grinder. Thereafter, the obtained dispersion was passed through a filter having a mesh size of 1 μm. The obtained filter cake was mixed while stirring with 12.1 parts by weight of a solution prepared by dissolving 1.0 part by weight of myristic acid and 3.0 parts by weight of butyl stearate in a mixed solvent containing methyl ethyl ketone, toluene and cyclohexanone (weight ratio: 5/3/2), and with 15.2 parts by weight of a solution prepared by dissolving 5.0 parts by weight of trifunctional low molecular weight polyisocyanate (tradename: E-31, produced by Takeda Yakuhin Kogyo Co., Ltd.) in a mixed solvent containing methyl ethyl ketone, toluene and cyclohexanone (weight ratio: 5/3/2), thereby producing a magnetic coating composition.

The obtained magnetic coating composition had the following composition:

| | |
|---|---|
| Magnetic particles | 100 parts by weight |
| Vinyl chloride-vinyl acetate copolymer resin | 10 parts by weight |

-continued

| | |
|---|---|
| Polyurethane resin | 10 parts by weight |
| Black composite hematite particles (filler) | 7.0 parts by weight |
| Carbon black fine particles | 1.0 part by weight |
| Myristic acid | 1.0 part by weight |
| Butyl stearate | 3.0 parts by weight |
| Trifunctional low molecular weight polyisocyanate | 5.0 parts by weight |
| Cyclohexanone | 56.6 parts by weight |
| Methyl ethyl ketone | 141.5 parts by weight |
| Toluene | 85.4 parts by weight |

The obtained magnetic coating composition had a viscosity of 2,380 cP.

The thus obtained magnetic coating composition was passed through a filter having a mesh size of 1 μm. Thereafter, the magnetic coating composition was coated on a 14 μm-thick polyester base film using a slit coater having a gap width of 45 μm and the magnetic recording medium obtained was oriented and dried in a magnetic field, thereby forming a magnetic layer having a thickness of 3.9 μm on the base film. The surface of the obtained magnetic layer was calendered and smoothened by an ordinary method, and then the obtained film was slit into a width of ½ inch (1.27 cm). The obtained tape was allowed to stand in a curing oven maintained at 60° C., for 24 hours, and sufficiently cured therein, thereby producing a magnetic tape. The magnetic layer of the obtained magnetic tape had a thickness of 3.4 μm.

The obtained magnetic tape had a coercive force value of 743 Oe (59.1 kA/m), a squareness (Br/Bm) of 0.87, a gloss of 180%, a surface roughness (Ra) of 6.8 nm, a linear absorption of 1.26 $\mu m^{-1}$ and a surface resistivity of $1.2 \times 10^9$ $\Omega/cm^2$. As to the electromagnetic performance of the obtained magnetic tape, the output thereof at a recording frequency of 4 MHz was +2.1 dB. Further, as to the durability of the magnetic tape, the running durability time was not less than 30 minutes, and the head contamination was A.

Meanwhile, the measurement of the electromagnetic performance was conducted using a reference tape 1 described in Tables 8 and 9 hereinafter.

Core Particles 1 to 5:

Various hematite particles were prepared by known methods. The same procedure as defined in Example 1 was conducted by using the thus hematite particles, thereby obtaining deagglomerated hematite particles as core particles.

Various properties of the thus obtained hematite particles are shown in Table 1.

Core Particles 6:

The same procedure as defined in Example 1 was conducted by using 20 kg of the diaggregated Mn-containing hematite particles (core particles 1) and 150 liters of water, thereby obtaining a slurry containing the Mn-containing hematite particles. The pH value of the obtained re-dispersed slurry containing the Mn-containing hematite particles was adjusted to 10.5, and then the concentration of the solid content in the slurry was adjusted to 98 g/liter by adding water thereto. After 150 liters of the slurry was heated to 60° C., 2722 ml of a 1.0 mol/liter $NaAlO_2$ solution (corresponding to 0.5% by weight (calculated as Al) based on the weight of the Mn-containing hematite particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the Mn-containing hematite particles whose surface was coated with hydroxides of aluminum.

Main production conditions are shown in Table 2, and various properties of the obtained Mn-containing hematite particles are shown in Table 3.

Core Particles 7 to 10:

The same procedure as defined above for the production of the core particles 6, was conducted except that kinds of core particles and kinds and amounts of additives used in the above surface treatment were changed variously, thereby obtaining surface-treated hematite particles.

The essential treating conditions are shown in Table 2, and various properties of the obtained surface-treated hematite particles are shown in Table 3.

Examples 2 to 11 and Production Comparative Examples 1 to 5

The same procedure as defined in Example 1 was conducted except that kinds of the core particles, addition or non-addition of alkoxysilane, kinds and amounts of alkoxysilane added, treating conditions of an edge runner used in the alkoxysilane-coating process, kinds and amounts of the carbon black fine particles added, and treating conditions of an edge runner used in the process for forming the carbon black coat, were changed variously, thereby obtaining black composite hematite particles. As a result of the observation by an electron microscope, liberated carbon black fine particles were not recognized in the black composite hematite particles obtained in Examples 2 to 11. Therefore, it was confirmed that a substantially whole amount of the carbon black used in Examples 2 to 11 contributed to the formation of the carbon black coat on the coating layer composed of an organosilane compound produced from the alkoxysilane.

Various properties of the carbon black fine particles A to F used, are shown in Table 4. The essential treating conditions are shown in Table 5, and various properties of the obtained black composite hematite particles are shown in Table 6.

Example 12 to 21, Comparative Examples 6 to 12

Production of Magnetic Recording Medium

The same procedure as defined in Example 1 was conducted except for varying the kind of the magnetic particles, the kind and amount of the black composite hematite particles added, thereby producing a magnetic recording medium.

Various properties of the magnetic particles (1) to (6) used, are shown in Table 7.

The shape of the magnetic particles (3) is plate shape. In the Table 7, the average major axis diameter, average minor axis diameter and aspect ratio of the magnetic particles (3) means an average plate surface diameter, an average thickness and a plate ratio (average plate surface diameter/average thickness), respectively.

The main producing conditions of reference tapes using the magnetic particles shown in Table 8 and various properties are shown in Table 9.

The main producing conditions of the magnetic recording medium shown in Table 8 and various properties are shown in Table 9 and 10.

Example 22

Production of Black Non-magnetic Composite Particles 20 kg of Mn-containing hematite particles (average particle size: 0.30 µm; geometrical standard deviation value: 1.46; BET specific surface area value: 3.6 m$^2$/g; Mn content: 13.3% by weight (calculated as Mn) based on the weight of the particle; blackness (L* value): 22.6; volume resistivity: 2.0×10$^7$ Ω·cm), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the Mn-containing hematite particles.

Successively, the obtained slurry containing the Mn-containing hematite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the Mn-containing hematite particles were dispersed.

The particles in the obtained slurry which remained on a sieve of 325 meshes (mesh size: 44 µm) was 0%. The slurry was filtered and washed with water, thereby obtaining a filter cake containing the Mn-containing hematite particles. After the obtained filter cake containing the Mn-containing hematite particles was dried at 120° C., 11.0 kg of the dried particles were then charged into an edge runner "MPUV-2 Model" (tradename, manufactured by Matsumoto Chuzo Tekkosho Co., Ltd.), and mixed and stirred at 30 Kg/cm (294 N/cm) and a stirring speed of 22 rpm for 30 minutes, thereby lightly deagglomerating the particles.

110 g of methyl hydrogen polysiloxane (tradename: "TSF484", produced by TOSHIBA SILICONE CO., LTD.) were added to the deagglomerated Mn-containing hematite particles under the operation of the edge runner. The Mn-containing hematite particles were continuously mixed and stirred at a linear load of 60 Kg/cm (588 N/cm) and a stirring speed of 22 rpm for 45 minutes.

Next, 1,100 g of carbon black fine particles A shown in the electron micrograph (×20,000) of FIG. 2 (particle shape: granular shape; average particle size: 0.022 µm; geometrical standard deviation value: 1.68; BET specific surface area value: 134 m$^2$/g; and blackness (L* value): 16.6; pH value: 3.4; DBP oil absorption: 89 ml/100 g) were added to the Mn-containing hematite particles coated with methyl hydrogen polysiloxane for 10 minutes while operating the edge runner. Further, the mixed particles were continuously stirred at a linear load of 60 Kg/cm (588 N/cm) and a stirring speed of 22 rpm for 60 minutes to form the carbon black coat on the coating layer composed of methyl hydrogen polysiloxane, thereby obtaining black composite hematite particles.

The obtained black composite hematite particles were dried at 105° C. for 60 minutes by using a drier to evaporate water or the like which were remained on surfaces of the black composite hematite particles. As shown in the electron micrograph, the resultant black composite hematite particles had an average particle diameter of 0.32 µm. In addition, the black composite hematite particles showed a geometrical standard deviation value of 1.45, a BET specific surface area value of 8.9 m$^2$/g, a blackness (L* value) of 17.9 and a volume resistivity of 8.6×10$^3$ Ω·cm. The desorption percentage of the carbon black from the black composite hematite particles was 6.8%. The amount of an organosilane compound coating layer composed of methyl hydrogen polysiloxane was 0.44% by weight (calculated as Si). The amount of the carbon black coat formed on the coating layer composed of methyl hydrogen polysiloxane is 9.04% by weight (calculated as C) based on the weight of the black composite hematite particles (corresponding to 10 parts by weight based on 100 parts by weight of the Mn-containing hematite particles). The thickness of the carbon black coat formed was 0.0024 µm. Since no carbon black was recognized on the electron photograph, it was confirmed that a whole amount of the carbon black used contributed to the formation of the carbon black coat on the coating layer composed of methyl hydrogen polysiloxane.

Production of Magnetic Recording Medium 100 parts by weight of Co-coated acicular magnetite particles (average major axial diameter: 0.24 µm aspect ratio: 7.1, BET specific surface area: 31.3 m$^2$/g, coercive force value: 714 Oe (56.8 kA/m), saturation magnetization value: 83.1 emu/g (83.1 Am$^2$/kg), Co content: 2.26 wt. %), 10.0 parts by weight of vinyl chloride-vinyl acetate copolymer resin (tradename: MR-110, produced by Nippon Zeon Co., Ltd.), 23.3 parts by weight of cyclohexanone, 10.0 parts by weight of methyl ethyl ketone, 1.0 part by weight of carbon black fine particles (produced by Mitsubishi Chemical Corp., average diameter: 26 nm, BET specific surface area: 130 m$^2$/g) and 7.0 parts by weight of the above obtained black composite hematite particles were kneaded together for 20 minutes using a kneader. The obtained kneaded material was diluted by adding 79.6 parts by weight of toluene, 110.2 parts by weight of methyl ethyl ketone and 17.8 parts by weight of cyclohexanone thereto, and then the resultant mixture was mixed and dispersed for 3 hours by a sand grinder, thereby obtaining a dispersion.

The obtained dispersion was mixed with 33.3 parts by weight of a solution prepared by dissolving 10.0 parts weight (solid content) of polyurethane resin (tradename: TI-1075, produced by Sanyo Kasei Kogyo Co., Ltd.) in a mixed solvent containing methyl ethyl ketone and cyclohexanone (weight ratio: 1/1), and the resultant mixture was mixed and dispersed for 30 minutes by a sand grinder. Thereafter, the obtained dispersion was passed through a filter having a mesh size of 1 µm. The obtained filter cake was mixed while stirring with 12.1 parts by weight of a solution prepared by dissolving 1.0 part by weight of myristic acid and 3.0 parts by weight of butyl stearate in a mixed solvent containing methyl ethyl ketone, toluene and cyclohexanone (weight ratio: 5/3/2), and with 15.2 parts by weight of a solution prepared by dissolving 5.0 parts by weight of trifunctional low molecular weight polyisocyanate (tradename: E-31, produced by Takeda Yakuhin Kogyo Co., Ltd.) in a mixed solvent containing methyl ethyl ketone, toluene and cyclohexanone (weight ratio: 5/3/2), thereby producing a magnetic coating composition.

The obtained magnetic coating composition had the following composition:

| | |
|---|---|
| Magnetic particles | 100 parts by weight |
| Vinyl chloride-vinyl acetate copolymer resin | 10 parts by weight |
| Polyurethane resin | 10 parts by weight |
| Black composite hematite particles (filler) | 7.0 parts by weight |
| Carbon black fine particles | 1.0 part by weight |
| Myristic acid | 1.0 part by weight |
| Butyl stearate | 3.0 parts by weight |

-continued

| | |
|---|---|
| Trifunctional low molecular weight polyisocyanate | 5.0 parts by weight |
| Cyclohexanone | 56.6 parts by weight |
| Methyl ethyl ketone | 141.5 parts by weight |
| Toluene | 85.4 parts by weight |

The obtained magnetic coating composition had a viscosity of 2,560 cP.

The thus obtained magnetic coating composition was passed through a filter having a mesh size of 1 μm. Thereafter, the magnetic coating composition was coated on a 14 μm-thick polyester base film using a slit coater having a gap width of 45 μm, and the magnetic recording medium obtained was oriented and dried in a magnetic field, thereby forming a magnetic layer having a thickness of 4.0 μm on the base film. The surface of the obtained magnetic layer was calendered and smoothened by an ordinary method, and then the obtained film was slit into a width of ½ inch (1.27 cm). The obtained tape was allowed to stand in a curing oven maintained at 60° C., for 24 hours, and sufficiently cured therein, thereby producing a magnetic tape. The magnetic layer of the obtained magnetic tape had a thickness of 3.5 μm.

The obtained magnetic tape had a coercive force value of 754 Oe (59.3 kA/m), a squareness (Br/Bm) of 0.88, a gloss of 183%, a surface roughness (Ra) of 6.7 nm, a linear absorption of 1.28 $\mu m^{-1}$ and a surface resistivity of $4.8 \times 10^8$ $\Omega/cm^2$. As to the electromagnetic performance of the obtained magnetic tape, the output thereof at a recording frequency of 4 MHz was +2.3 dB. Further, as to the durability of the magnetic tape, the running durability time was not less than 30 minutes, and the head contamination was A.

Meanwhile, the measurement of the electromagnetic performance was conducted using a reference tape 1 described in Tables 8 and 9 hereinafter.

Examples 23 to 32 and Comparative Examples 13 to 17

The same procedure as defined in Example 22 was conducted except that kind of core particles to be treated; addition or non-addition of polysiloxane compound in the coating treatment, kind and amount of polysiloxane compound added, treating conditions of edge runner in the coating treatment; kind and amount of carbon black fine particles added, and treating conditions of edge runner used in the forming process of the carbon black coat, are varied, thereby obtaining black composite hematite particles.

The black composite hematite particles obtained in Examples 23 to 32 were observed by an electron microscope. As a result, almost no liberated carbon black fine particles were recognized. Therefore, it was confirmed that a substantially whole amount of the carbon black used contributed to the formation of the carbon black coat on the coating layer composed the polysiloxane formed on each core particle.

Main production conditions are shown in Table 13, and various properties of the obtained black magnetic acicular composite particles are shown in Table 14.

Examples 33 to 42 and Comparative Examples 16 to 18

The same procedure as defined in Example 22 was conducted except that kind of core particles to be treated, addition or non-addition of a modified polysiloxane compound in the coating treatment, kind and amount of the modified polysiloxane compound added, treating conditions of edge runner in the coating treatment, kind and amount of carbon black fine particles added, and treating conditions of edge runner used in the forming process of the carbon black coat, were varied, thereby obtaining black composite hematite particles.

The black composite hematite particles obtained in Examples 33 to 42 were observed by an electron microscope. As a result, almost no liberated carbon black fine particles was recognized. Therefore, it was confirmed that a substantially whole amount of the carbon black used contributed to the formation of the carbon black coat on the coating layer composed of modified polysiloxane.

Main production conditions are shown in Table 15, and various properties of the obtained black composite hematite particles are shown in Table 16.

Examples 43 to 52 and Comparative Examples 19 to 21

The same procedure as defined in Example 22 was conducted except that kind of core particles to be treated, addition or non-addition of a terminal-modified polysiloxane compound in the coating treatment, kind and amount of the terminal-modified polysiloxane compound added, treating conditions of edge runner in the coating treatment, kind and amount of carbon black fine particles added, and treating conditions of edge runner used in the forming process of the carbon black coat, were varied, thereby obtaining black composite hematite particles.

The black composite hematite particles obtained in Examples 43 to 52 were observed by an electron microscope. As a result, almost no liberated carbon black fine particles was recognized. Therefore, it was confirmed that a substantially whole amount of the carbon black used contributed to the formation of the carbon black coat on the coating layer composed of terminal-modified polysiloxane.

Main production conditions are shown in Table 17, and various properties of the obtained black composite hematite particles are shown in Table 18.

Example 53 to 82, Comparative Examples 22 to 30

Production of Magnetic Recording Medium

The same procedure as defined in Example 22 was conducted except for varying the kind of the magnetic particles, the kind and amount of the black composite hematite particles added as a filler, thereby producing a magnetic recording medium.

The main producing conditions of the magnetic recording medium shown in Tables 19 to 20 and various properties are shown in Tables 21 and 24.

Example 83

Production of Black Composite Hematite Particles 20 kg of Mn-containing hematite particles (average particle size: 0.30 μm; geometrical standard deviation value: 1.46; BET specific surface area value: 3.6 m²/g; Mn content: 13.3% by weight (calculated as Mn) based on the weight of the particle; blackness (L* value): 22.6; volume resistivity: $2.0 \times 10^7$ Ω·cm), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the Mn-containing hematite particles.

Successively, the obtained slurry containing the Mn-containing hematite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the Mn-containing hematite particles were dispersed.

The particles in the obtained slurry which remained on a sieve of 325 meshes (mesh size: 44 μm) was 0%. The slurry was filtered and washed with water, thereby obtaining a filter cake containing the Mn-containing hematite particles. After the obtained filter cake containing the Mn-containing hematite particles was dried at 120° C., 11.0 kg of the dried particles were then charged into an edge runner "MPUV-2 Model" (tradename, manufactured by Matsumoto Chuzo Tekkosho Co., Ltd.), and mixed and stirred at 30 Kg/cm (294 N/cm) and a stirring speed of 22 rpm for 30 minutes, thereby lightly deagglomerating the particles.

220 g of tridecafluorooctyl trimethoxysilane (tradename "TSL8257", produced by TOSHIBA SILICONE CO., LTD.) were added to the deagglomerated Mn-containing hematite particles under the operation of the edge runner. The Mn-containing hematite particles were continuously mixed and stirred at a linear load of 60 Kg/cm (588 N/cm) and a stirring speed of 22 rpm for 45 minutes.

Next, 1,100 g of carbon black fine particles A shown in the electron micrograph (×20,000) of FIG. 2 (particle shape: granular shape; average particle size: 0.022 μm; geometrical standard deviation value: 1.68; BET specific surface area value: 134 m$^2$/g; and blackness (L* value): 16.6; pH value: 3.4; DBP oil absorption: 89 ml/100 g) were added to the Mn-containing hematite particles coated with tridecafluorooctyl trimethoxysilane for 10 minutes while operating the edge runner. Further, the mixed particles were continuously stirred at a linear load of 60 Kg/cm (588 N/cm) and a stirring speed of 22 rpm for 60 minutes to form the carbon black coat on the coating layer composed of tridecafluorooctyl trimethoxysilane, thereby obtaining black composite hematite particles.

The obtained black composite hematite particles were heat-treated at 105° C. for 60 minutes by using a drier to evaporate water or the like which were remained on surfaces of the black composite hematite particles. As shown in the electron micrograph, the resultant black composite hematite particles had an average particle diameter of 0.32 μm. In addition, the black composite hematite particles showed a geometrical standard deviation value of 1.45, a BET specific surface area value of 9.1 m$^2$/g, a blackness (L* value) of 17.8 and a volume resistivity of $9.0 \times 10^3$ Ω·cm. The desorption percentage of the carbon black from the black composite hematite particles was 6.7%. The amount of a organosilane compound coating produced from tridecafluorooctyl trimethoxysilane was 0.11% by weight (calculated as Si). The amount of the carbon black coat formed on the coating layer composed of the organosilane compound produced from tridecafluorooctyl trimethoxysilane is 9.02% by weight (calculated as C) based on the weight of the black composite hematite particles (corresponding to 10 parts by weight based on 100 parts by weight of the black Mn-containing hematite particles). The thickness of the carbon black coat formed was 0.0024 μm. Since no liberated carbon black fine particles was recognized on the electron photograph, it was confirmed that a whole amount of the carbon black used contributed to the formation of the carbon black coat on the coating layer composed of the organosilane compound produced from tridecafluorooctyl trimethoxysilane.

Production of Magnetic Recording Medium 100 parts by weight of Co-coated acicular magnetite particles (average major axial diameter: 0.24 μm, aspect ratio: 7.1, BET specific surface area: 31.3 m$^2$/g, coercive force value: 714 Oe (56.8 kA/m), saturation magnetization value: 83.1 emu/g (83.1 Am$^2$/kg), Co content: 2.26 wt. %), 10.0 parts by weight of vinyl chloride-vinyl acetate copolymer resin (tradename: MR-110, produced by Nippon Zeon Co., Ltd.), 23.3 parts by weight of cyclohexanone, 10.0 parts by weight of methyl ethyl ketone, 1.0 part by weight of carbon black fine particles (produced by Mitsubishi Chemical Corp., average diameter: 26 nm, BET specific surface area: 130 m$^2$/g) and 7.0 parts by weight of the above obtained black composite hematite particles were kneaded together for 20 minutes using a kneader. The obtained kneaded material was diluted by adding 79.6 parts by weight of toluene, 110.2 parts by weight of methyl ethyl ketone and 17.8 parts by weight of cyclohexanone thereto, and then the resultant mixture was mixed and dispersed for 3 hours by a sand grinder, thereby obtaining a dispersion.

The obtained dispersion was mixed with 33.3 parts by weight of a solution prepared by dissolving 10.0 parts weight (solid content) of polyurethane resin (tradename: TI-1075, produced by Sanyo Kasei Kogyo Co., Ltd.) in a mixed solvent containing methyl ethyl ketone and cyclohexanone (weight ratio: 1/1), and the resultant mixture was mixed and dispersed for 30 minutes by a sand grinder. Thereafter, the obtained dispersion was passed through a filter having a mesh size of 1 μm. The obtained filter cake was mixed while stirring with 12.1 parts by weight of a solution prepared by dissolving 1.0 part by weight of myristic acid and 3.0 parts by weight of butyl stearate in a mixed solvent containing methyl ethyl ketone, toluene and cyclohexanone (weight ratio: 5/3/2), and with 15.2 parts by weight of a solution prepared by dissolving 5.0 parts by weight of trifunctional low molecular weight polyisocyanate (tradename: E-31, produced by Takeda Yakuhin Kogyo Co., Ltd.) in a mixed solvent containing methyl ethyl ketone, toluene and cyclohexanone (weight ratio: 5/3/2), thereby producing a magnetic coating composition.

The obtained magnetic coating composition had the following composition:

| | |
|---|---|
| Magnetic particles | 100 parts by weight |
| Vinyl chloride-vinyl acetate copolymer resin | 10 parts by weight |
| Polyurethane resin | 10 parts by weight |
| Black composite hematite particles (filler) | 7.0 parts by weight |
| Carbon black fine particles | 1.0 part by weight |
| Myristic acid | 1.0 part by weight |
| Butyl stearate | 3.0 parts by weight |
| Trifunctional low molecular weight polyisocyanate | 5.0 parts by weight |
| Cyclohexanone | 56.6 parts by weight |
| Methyl ethyl ketone | 141.5 parts by weight |
| Toluene | 85.4 parts by weight |

The obtained magnetic coating composition had a viscosity of 2,048 cP.

The thus obtained magnetic coating composition was passed through a filter having a mesh size of 1 μm. Thereafter, the magnetic coating composition was coated on a 14 μm-thick polyester base film using a slit coater having a gap width of 45 μm, and the magnetic recording medium obtained was oriented and dried in a magnetic field, thereby forming a magnetic layer having a thickness of 3.9 μm on the base film. The surface of the obtained magnetic layer was calendered and smoothened by an ordinary method, and then the obtained film was slit into a width of ½ inch (1.27 cm). The obtained tape was allowed to stand in a curing oven maintained at 60° C., for 24 hours, and sufficiently cured therein, thereby producing a magnetic tape. The magnetic layer of the obtained magnetic tape had a thickness of 3.4 μm.

The obtained magnetic tape had a coercive force value of 746 Oe (59.4 kA/m), a squareness (Br/Bm) of 0.88, a gloss of 182%, a surface roughness (Ra) of 6.8 nm, a linear absorption of 1.23 μm$^{-1}$ and a surface resistivity of $8.6 \times 10^8$ $\Omega/cm^2$. As to the electromagnetic performance of the obtained magnetic tape, the output thereof at a recording frequency of 4 MHz was +2.3 dB. Further, as to the durability of the magnetic tape, the running durability time was not less than 30 minutes, and the head contamination was A.

Meanwhile, the measurement of the electromagnetic performance was conducted using a reference tape 1 described in Tables 8 and 9 hereinafter.

Examples 84 to 93 and Comparative Examples 31 to 33

The same procedure as defined in Example 83 was conducted except that kind of core particles to be treated; addition or non-addition of fluoroalkylsilane compound in the coating treatment, kind and amount of fluoroalkylsilane compound added, treating conditions of edge runner in the coating treatment; kind and amount of carbon black fine particles added, and treating conditions of edge runner used in the forming process of the carbon black coat, are varied, thereby obtaining black composite hematite particles.

The black composite hematite particles obtained in Examples 84 to 93 were observed by an electron microscope. As a result, almost no liberated carbon black fine particles were recognized. Therefore, it was confirmed that a substantially whole amount of the carbon black used contributed to the formation of the carbon black coat on the coating layer composed the fluoroalkyl organosilane compound produced from the fluoroalkylsilane compound, formed on each core particle.

Main production conditions are shown in Table 13, and various properties of the obtained black magnetic acicular composite particles are shown in Table 14.

Main production conditions are shown in Table 25, and various properties of the obtained black composite hematite particles are shown in Table 26.

Examples 94 to 103 and Comparative Examples 34 to 36

Production of Magnetic Recording Medium

The same procedure as defined in Example 83 was conducted except for varying the kind of the black composite hematite particles, the kind and amount of the carbon black fine particles added, thereby producing a magnetic recording medium.

The main producing conditions of the magnetic recording medium shown in Table 27 and various properties are shown in Table 28.

Example 104

Production of Black Non-magnetic Composite Particles 20 kg of Mn-containing hematite particles (average particle size: 0.30 μm; geometrical standard deviation value: 1.46; BET specific surface area value: 3.6 m$^2$/g; Mn content: 13.3% by weight (calculated as Mn) based on the weight of the particle; blackness (L* value): 22.6; volume resistivity: $2.0 \times 10^7$ $\Omega \cdot cm$), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the Mn-containing hematite particles.

Successively, the obtained slurry containing the Mn-containing hematite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the Mn-containing hematite particles were dispersed.

The particles in the obtained slurry which remained on a sieve of 325 meshes (mesh size: 44 μm) was 0%. The slurry was filtered and washed with water, thereby obtaining a filter cake containing the Mn-containing hematite particles. After the obtained filter cake containing the Mn-containing hematite particles was dried at 120° C., 11.0 kg of the dried particles were then charged into an edge runner "MPLTV-2 Model" (tradename, manufactured by Matsumoto Chuzo Tekkosho Co., Ltd.), and mixed and stirred at 30 Kg/cm (294 N/cm) and a stirring speed of 22 rpm for 30 minutes, thereby lightly deagglomerating the particles.

165 g of methyl triethoxysilane (tradename: "TSL8123", produced by TOSHIBA SILICONE CO., LTD.) was mixed and diluted with 200 ml of ethanol to obtain a methyl triethoxysilane solution. The methyl triethoxysilane solution was added to the deagglomerated Mn-containing hematite particles under the operation of the edge runner. The Mn-containing hematite particles were continuously mixed and stirred at a linear load of 60 Kg/cm (588 N/cm) and a stirring speed of 22 rpm for 20 minutes.

Next, 1,925 g of carbon black fine particles B (particle shape: granular shape; average particle size: 0.022 μm; geometrical standard deviation value: 1.78; BET specific surface area value: 133.5 m$^2$/g; and blackness (L* value): 14.6; pH value: 3.4; DBP oil absorption: 84 ml/100 g) were added to the Mn-containing hematite particles coated with methyl triethoxysilane for 10 minutes while operating the edge runner. Further, the mixed particles were continuously stirred at a linear load of 30 Kg/cm (294 N/cm) and a stirring speed of 22 rpm for 30 minutes to form the carbon black coat on the coating layer composed of methyl triethoxysilane, thereby obtaining black composite hematite particles.

The obtained black composite hematite particles were heat-treated at 80° C. for 120 minutes by using a drier to evaporate water, ethanol or the like which were remained on surfaces of the black composite hematite particles. As shown in the electron micrograph, the resultant black hematite composite particles had an average particle diameter of 0.31 μm. In addition, the black non-magnetic composite particles showed a geometrical standard deviation value of 1.46, a BET specific surface area value of 7.8 m$^2$/g, a blackness (L* value) of 17.6 and a volume resistivity of $6.8 \times 10^3$ $\Omega \cdot cm$. The desorption percentage of the carbon black from the black composite hematite particles was 7.8%. The amount of a coating organosilane compound produced from methyl triethoxysilane was 0.22% by weight (calculated as Si). The amount of the carbon black coat formed on the coating layer composed of the organosilane compound produced from methyl triethoxysilane is 14.78% by weight (calculated as C) based on the weight of the black composite hematite particles (corresponding to 17.5 parts by weight based on 100 parts by weight of the Mn-containing hematite particles). The thickness of the carbon black coat formed was 0.0024 μm. Since no liberated carbon black fine particles was recognized on the electron photograph, it was confirmed that a whole amount of the carbon black used contributed to the formation of the carbon black coat on the coating layer composed of the organosilane compound produced from methyl triethoxysilane.

Production of Non-magnetic Substrate: Formation of Non-magnetic Undercoat Layer on Non-magnetic Base Film 12 g of the non-magnetic particles 1 (hematite particles: particle shape: spindle shape; average major axis diameter: 0.187 μm; average minor axis diameter: 0.0240 μm; aspect ratio: 7.8:1; geometrical standard deviation value: 1.33; BET specific surface area value: 43.3 m$^2$/g; blackness (L* value): 32.6; volume resistivity: 8.6×10$^8$ Ω·cm) shown in the Table 31, were mixed with a binder resin solution (30% by weight of vinyl chloride-vinyl acetate copolymer resin having a sodium sulfonate group and 70% by weight of cyclohexanone) and cyclohexanone, and each of the obtained mixtures (solid content: 72% by weight) was kneaded by a plast-mill for 30 minutes.

Each of the thus-obtained kneaded material was charged into a 140 ml-glass bottle together with 95 g of 1.5 mmϕ glass beads, a binder resin solution (30% by weight of polyurethane resin having a sodium sulfonate group and 70% by weight of a solvent (methyl ethyl ketone:toluene= 1:1)), cyclohexanone, methyl ethyl ketone and toluene, and the obtained mixture was mixed and dispersed by a paint shaker for 6 hours to obtain a non-magnetic coating composition.

The thus-obtained non-magnetic coating composition was as follows:

| | |
|---|---|
| Non-magnetic particles 1 | 100 parts by weight |
| Vinyl chloride-vinyl acetate copolymer resin having a sodium sulfonate group | 10 parts by weight |
| Polyurethane resin having a sodium sulfonate group | 10 parts by weight |
| Lubricant (myristic acid: butyl stearate = 1:1) | 2 parts by weight |
| Cyclohexanone | 56.9 parts by weight |
| Methylethyl ketone | 142.3 parts by weight |
| Toluene | 85.4 parts by weight |

The viscosity of the obtained non-magnetic coating composition was 310 cP.

The non-magnetic coating composition obtained was applied to a polyethylene terephthalate film of 12 μm thick to a thickness of 55 μm by an applicator, and the coating film was then dried, thereby forming a non-magnetic undercoat layer. The thickness of the non-magnetic undercoat layer was 3.4 μm.

The thus obtained non-magnetic undercoat layer had a gloss of 193%, and a surface roughness Ra of 8.2 nm. The Young's modulus (relative value) thereof was 123. The linear adsorption coefficient (of the coating film) thereof was 1.01 μm$^{-1}$; and the surface resistivity thereof was 1.1×10$^{14}$ Ω/cm$^2$.

Production of Magnetic Recording Medium: Formation of Magnetic Recording Layer 100 parts by weight of Co-coated acicular magnetite particles (average major axial diameter: 0.23 μm, aspect ratio: 7.3:1, BET specific surface area: 30.3 m$^2$/g, coercive force value: 726 Oe (57.8 kA/m), saturation magnetization value: 81.9 emu/g (81.9 AM$^2$/kg), Co content: 2.22 wt. %), 10.0 parts by weight of vinyl chloride-vinyl acetate copolymer resin (tradename: MR-110, produced by Nippon Zeon Co., Ltd.), 23.3 parts by weight of cyclohexanone, 10.0 parts by weight of methyl ethyl ketone, 1.0 part by weight of carbon black fine particles (produced by Mitsubishi Chemical Corp., average diameter: 26 nm, BET specific surface area: 130 m$^2$/g) and 7.0 parts by weight of the above obtained black composite hematite particles were kneaded together for 20 minutes using a kneader. The obtained kneaded material was diluted by adding 79.6 parts by weight of toluene, 110.2 parts by weight of methyl ethyl ketone and 17.8 parts by weight of cyclohexanone thereto, and then the resultant mixture was mixed and dispersed for 3 hours by a sand grinder, thereby obtaining a dispersion.

The obtained dispersion was mixed with 33.3 parts by weight of a solution prepared by dissolving 10.0 parts weight (solid content) of polyurethane resin (tradename: TI-1075, produced by Sanyo Kasei Kogyo Co., Ltd.) in a mixed solvent containing methyl ethyl ketone and cyclohexanone (weight ratio: 1/1), and the resultant mixture was mixed and dispersed for 30 minutes by a sand grinder. Thereafter, the obtained dispersion was passed through a filter having a mesh size of 1 μm. The obtained filter cake was mixed while stirring with 12.1 parts by weight of a solution prepared by dissolving 1.0 part by weight of myristic acid and 3.0 parts by weight of butyl stearate in a mixed solvent containing methyl ethyl ketone, toluene and cyclohexanone (weight ratio: 5/3/2), and with 15.2 parts by weight of a solution prepared by dissolving 5.0 parts by weight of trifunctional low molecular weight polyisocyanate (tradename: E-31, produced by Takeda Yakuhin Kogyo Co., Ltd.) in a mixed solvent containing methyl ethyl ketone, toluene and cyclohexanone (weight ratio: 5/3/2), thereby producing a magnetic coating composition.

The obtained magnetic coating composition had the following composition:

| | |
|---|---|
| Magnetic particles | 100 parts by weight |
| Vinyl chloride-vinyl acetate copolymer resin | 10 parts by weight |
| Polyurethane resin | 10 parts by weight |
| Black composite hematite particles (filler) | 7.0 parts by weight |
| Carbon black fine particles | 1.0 part by weight |
| Myristic acid | 1.0 part by weight |
| Butyl stearate | 3.0 parts by weight |
| Trifunctional low molecular weight polyisocyanate | 5.0 parts by weight |
| Cyclohexanone | 56.6 parts by weight |
| Methyl ethyl ketone | 141.5 parts by weight |
| Toluene | 85.4 parts by weight |

The obtained magnetic coating composition had a viscosity of 2,816 cP.

The thus obtained magnetic coating composition was passed through a filter having a mesh size of 1 μm and then was coated on the obtained non-magnetic undercoat layer using a slit coater, and the obtained product was oriented and dried in a magnetic field, thereby forming a magnetic layer on the non-magnetic undercoat layer. The surface of the obtained magnetic layer was calendered and smoothened by an ordinary method, and then the obtained film was slit into a width of ½ inch (1.27 cm). The obtained tape was allowed to stand in a curing oven maintained at 60° C., for 24 hours, and sufficiently cured therein, thereby producing a magnetic tape. The magnetic layer of the obtained magnetic tape had a thickness of 3.4 μm.

The obtained magnetic tape had a coercive force value of 754 Oe (60.0 kA/m), a squareness (Br/Bm) of 0.88, a gloss of 194%, a surface roughness (Ra) of 6.8 nm, a linear absorption of 1.36 $\mu m^{-1}$ and a surface resistivity of $6.8 \times 10^7$ $\Omega/cm^2$. As to the electromagnetic performance of the obtained magnetic tape, the output thereof at a recording frequency of 4 MHz was +2.3 dB. Further, as to the durability of the magnetic tape, the running durability time was 29.2 minutes, and the head contamination was A.

Meanwhile, the measurement of the electromagnetic performance was conducted using a reference tape 5 described in Tables 33 and 34 hereinafter.

Examples 105 to 116 and Comparative Examples 37 to 40

Production of Black Composite Hematite Particles

The same procedure as defined in Example 104 was conducted except that kind of core particles to be treated; addition or non-addition of alkoxysilane, polysiloxane and silicon compound in the coating treatment, kind and amount of the alkoxysilane, polysiloxane and as a coupling agent silicon compound added, treating conditions of edge runner in the coating treatment, and kind and amount of carbon black fine particles added and treating conditions of edge runner used in the forming process of the carbon black coat, are changed variously, thereby obtaining black composite hematite particles. When the black composite hematite particles obtained in Examples 105 to 116 were observed by an electron microscope, no liberated carbon black fine particles were recognized. Therefore, it was confirmed that a substantially whole amount of carbon black used contributed to the formation of the carbon black coat on the coating layer composed of an organosilane compound obtained from alkoxysilane or the polysiloxane.

Main production conditions are shown in Table 29, and various properties of the obtained black composite hematite particles are shown in Table 30.

All of the additives used in Examples 112 to 114 were polysiloxane ("TSF484" (tradename, produced by Toshiba Silicone Co. Ltd.): methyl hydrogen polysiloxane; "BYK-080" (tradename, produced by BYK Chemie Japan Co., Ltd.): modified polysiloxane; "TSF-4770" (tradename, produced by Toshiba Silicone Co. Ltd.): terminal-carboxyl-modified polysiloxane).

Production of Non-magnetic Substrate: Formation of Non-magnetic Undercoat Layer on Non-magnetic Base Film By using the non-magnetic particles 1 to 6, non-magnetic undercoat layers were formed in the same way as in Example 104.

Various properties of the non-magnetic particles are shown in Table 31.

Main production conditions and various properties of the obtained non-magnetic undercoating layer are shown in Table 32.

Reference Tapes 5 to 8

By using the non-magnetic undercoating layers and magnetic particles, reference tapes were produced. The main producing conditions are shown in Table 33 and various properties of the reference tapes are shown in Table 34.

Examples 117 to 128 and Comparative Examples 41 to 44

Production of Magnetic Recording Medium: Formation of Magnetic Recording Layer

Magnetic recording media were produced in the same way as in Example 104 except for varying the kind and amount of magnetic particles and black composite hematite particles as a filler.

The main producing conditions are shown in Table 35 and various properties are shown in Table 36.

TABLE 1

| Core particles | Properties of hematite particles | |
|---|---|---|
| | Kind | Particle shape |
| Core particles 2 | Mn-containing hematite particles | Granular |
| Core particles 2 | Mn-containing hematite particles | Granular |
| Core particles 3 | Hematite particles | Granular |
| Core particles 4 | Hematite particles | Granular |
| Core particles 5 | Hematite particles | Acicular |

| Core particles | Properties of hematite particles | | |
|---|---|---|---|
| | Average major axial diameter (average particle size) ($\mu$m) | Average minor axial diameter ($\mu$m) | Aspect ratio (-) |
| Core particles 1 | 0.32 | — | — |
| Core particles 2 | 0.18 | — | — |
| Core particles 3 | 0.11 | — | — |
| Core particles 4 | 0.29 | — | — |
| Core particles 5 | 0.23 | 0.029 | 7.9:1 |

| Core particles | Properties of hematite particles | | |
|---|---|---|---|
| | Geometrical standard deviation value (-) | BET specific surface area value (m$^2$/g) | Mn content (wt. %) |
| Core particles 1 | 1.49 | 3.1 | 13.1 |
| Core particles 2 | 1.41 | 7.8 | 15.6 |
| Core particles 3 | 1.35 | 15.3 | — |
| Core particles 4 | 1.41 | 3.8 | — |
| Core particles 5 | 1.38 | 35.6 | — |

| Core particles | Properties of hematite particles | |
|---|---|---|
| | Volume resistivity value ($\Omega$.cm) | Blackness (L* value) (-) |
| Core particles 1 | $1.8 \times 10^7$ | 22.4 |
| Core particles 2 | $2.3 \times 10^7$ | 24.4 |
| Core particles 3 | $7.6 \times 10^8$ | 35.5 |
| Core particles 4 | $6.4 \times 10^8$ | 32.1 |
| Core particles 5 | $3.6 \times 10^8$ | 34.0 |

TABLE 2

| Core particles | Kind of core particles | Surface-treatment step Additive Kind | Calculated as | Amount (wt. %) |
|---|---|---|---|---|
| Core particles 6 | Core particles 1 | Sodium aluminate | Al | 0.5 |
| Core particles 7 | Core particles 2 | Water glass #3 | SiO$_2$ | 0.2 |
| Core particles 8 | Core particles 3 | Aluminum sulfate | Al | 0.5 |
|  |  | Water glass #3 | SiO$_2$ | 1.5 |
| Core particles 9 | Core particles 4 | Sodium aluminate | Al | 1.0 |
|  |  | Colloidal silica | SiO$_2$ | 1.0 |
| Core particles 10 | Core particles 5 | Aluminum sulfate | Al | 5.5 |
| Core particles 11 | Core particles 4 | Sodium aluminate | Al | 2.0 |

| Core particles | Surface-treatment step Coating material Kind | Calculated as | Amount (wt. %) |
|---|---|---|---|
| Core particles 6 | A | Al | 0.49 |
| Core particles 7 | S | SiO$_2$ | 0.18 |
| Core particles 8 | A | Al | 0.48 |
|  | S | SiO$_2$ | 1.45 |
| Core particles 9 | A | Al | 0.97 |
|  | S | SiO$_2$ | 0.97 |
| Core particles 10 | A | Al | 5.21 |
| Core particles 11 | A | Al | 1.90 |

Note;
A: Hydroxide of aluminum
S: Oxide of silicon

TABLE 3

| Core particles | Properties of surface-treated hematite particles Average major axial diameter (average particles size) (μm) | Average minor axial diameter (μm) | Aspect ratio (-) |
|---|---|---|---|
| Core particles 6 | 0.32 | — | — |
| Core particles 7 | 0.18 | — | — |
| Core particles 8 | 0.11 | — | — |
| Core particles 9 | 0.29 | — | — |
| Core particles 10 | 0.23 | 0.030 | 7.7:1 |
| Core particles 11 | 0.29 | — | — |

| Core particles | Properties of surface-treated hematite particles Geometrical standard deviation value (-) | BET specific surface area value (m$^2$/g) | Mn content (wt. %) |
|---|---|---|---|
| Core particles 6 | 1.47 | 3.8 | 13.0 |
| Core particles 7 | 1.40 | 7.5 | 15.6 |
| Core particles 8 | 1.35 | 17.1 | — |
| Core particles 9 | 1.41 | 5.1 | — |
| Core particles 10 | 1.38 | 35.2 | — |
| Core particles 11 | 1.41 | 5.2 | — |

| Core particles | Properties of surface-treated hematite particles Volume resistivity value (Ω.cm) | Blackness (L* value) (-) |
|---|---|---|
| Core particles 6 | 3.2 × 10$^7$ | 22.6 |
| Core particles 7 | 4.8 × 10$^7$ | 25.1 |
| Core particles 8 | 9.3 × 10$^8$ | 35.6 |
| Core particles 9 | 6.8 × 10$^8$ | 32.3 |
| Core particles 10 | 5.1 × 10$^8$ | 34.6 |
| Core particles 11 | 7.6 × 10$^8$ | 32.5 |

TABLE 4

| Kind of carbon black fine particles | Properties of carbon black fine particles Particle shape | Average particle size (μm) | Geometrical standard deviation value (-) |
|---|---|---|---|
| Carbon black A | Granular | 0.022 | 1.68 |
| Carbon black B | Granular | 0.022 | 1.78 |
| Carbon black C | Granular | 0.015 | 1.56 |
| Carbon black D | Granular | 0.030 | 2.06 |
| Carbon black E | Granular | 0.024 | 1.69 |
| Carbon black F | Granular | 0.028 | 1.71 |

| Kind of carbon black fine particles | Properties of carbon black fine particles BET specific surface area value (m$^2$/g) | pH value (-) |
|---|---|---|
| Carbon black A | 134.0 | 3.4 |
| Carbon black B | 133.5 | 3.4 |
| Carbon black C | 265.3 | 3.7 |
| Carbon black D | 84.6 | 8.0 |
| Carbon black E | 113.6 | 10.8 |
| Carbon black F | 800.0 | 7.0 |

TABLE 4-continued

Properties of carbon black fine particles

| Kind of carbon black fine particles | DBP oil absorption (ml/100 g) | Blackness (L* value) (-) |
|---|---|---|
| Carbon black A | 89 | 16.6 |
| Carbon black B | 84 | 14.6 |
| Carbon black C | 57 | 15.2 |
| Carbon black D | 95 | 17.0 |
| Carbon black E | 102 | 16.2 |
| Carbon black F | 200 | 15.3 |

TABLE 5

Production of black composite hematite particles
Coating with alkoxysilane Additive

| Examples and Comparative Examples | Kind of core particles | Kind | Amount added (part by weight) |
|---|---|---|---|
| Example 2 | Core particles 1 | Methyl triethoxysilane | 1.0 |
| Example 3 | Core particles 2 | Methyl trimethoxysilane | 2.0 |
| Example 4 | Core particles 3 | Dimethyl dimethoxysilane | 1.0 |
| Example 5 | Core particles 4 | Phenyl triethoxysilane | 0.5 |
| Example 6 | Core particles 5 | Isobutyl trimethoxysilane | 5.0 |
| Example 7 | Core particles 6 | Methyl triethoxysilane | 3.0 |
| Example 8 | Core particles 7 | Methyl triethoxysilane | 1.5 |
| Example 9 | Core particles 8 | Methyl triethoxysilane | 2.0 |
| Example 10 | Core particles 9 | Methyl trimethoxysilane | 5.0 |
| Example 11 | Core particles 10 | Dimethyl dimethoxysilane | 0.5 |
| Comparative Example 1 | Core particles 1 | — | — |
| Comparative Example 2 | Core particles 1 | Methyl triethoxysilane | 1.0 |
| Comparative Example 3 | Core particles 3 | Dimethyl dimethoxysilane | 0.5 |
| Comparative Example 4 | Core particles 3 | Methyl triethoxysilane | 0.005 |
| Comparative Example 5 | Core particles 1 | γ-aminopropyl triethoxysilane | 1.0 |

Production of black composite hematite particles
Coating with alkoxysilane

| Examples and Comparative Examples | Edge runner treatment | | Coating amount (calculated as Si) (wt. %) |
|---|---|---|---|
| | Linear load (N/cm) | Time (min) | |
| | (Kg/cm) | | |
| Example 2 | 588 | 60 | 30 | 0.15 |
| Example 3 | 294 | 30 | 30 | 0.40 |
| Example 4 | 441 | 45 | 20 | 0.22 |
| Example 5 | 588 | 60 | 25 | 0.06 |
| Example 6 | 294 | 30 | 30 | 0.72 |
| Example 7 | 441 | 45 | 20 | 0.45 |
| Example 8 | 588 | 60 | 30 | 0.22 |
| Example 9 | 294 | 30 | 60 | 0.29 |
| Example 10 | 441 | 45 | 20 | 0.96 |
| Example 11 | 588 | 60 | 30 | 0.11 |
| Comparative Example 1 | — | — | — | — |
| Comparative Example 2 | 588 | 60 | 20 | 0.15 |
| Comparative Example 3 | 588 | 60 | 30 | 0.11 |
| Comparative Example 4 | 588 | 60 | 30 | $7 \times 10^{-4}$ |
| Comparative Example 5 | 588 | 60 | 30 | 0.13 |

Production of black composite hematite particles
Coating of carbon black

| Examples and Comparative Examples | Carbon black | |
|---|---|---|
| | Kind | Amount added (part by weight) |
| Example 2 | B | 8.5 |
| Example 3 | B | 5.0 |
| Example 4 | C | 5.0 |
| Example 5 | C | 10.0 |
| Example 6 | D | 15.0 |
| Example 7 | B | 15.0 |
| Example 8 | B | 12.0 |
| Example 9 | C | 10.0 |
| Example 10 | C | 15.0 |
| Example 11 | D | 20.0 |
| Comparative Example 1 | B | 10.0 |
| Comparative Example 2 | — | — |
| Comparative Example 3 | B | 0.01 |
| Comparative Example 4 | C | 5.0 |
| Comparative Example 5 | D | 10.0 |

Production of black composite hematite particles
Coating with carbon black

| Examples and Comparative Examples | Edge runner treatment | | Amount coated (calculated as C) (wt. %) |
|---|---|---|---|
| | Linear load (N/cm) (Kg/cm) | Time (min) | |
| Example 2 | 588 | 60 | 20 | 7.82 |
| Example 3 | 441 | 45 | 30 | 4.75 |
| Example 4 | 294 | 30 | 30 | 4.76 |
| Example 5 | 441 | 45 | 60 | 9.08 |
| Example 6 | 294 | 30 | 25 | 13.03 |
| Example 7 | 588 | 60 | 20 | 13.04 |
| Example 8 | 294 | 30 | 30 | 10.71 |
| Example 9 | 441 | 45 | 45 | 9.09 |
| Example 10 | 588 | 60 | 30 | 13.03 |
| Example 11 | 588 | 60 | 45 | 16.60 |
| Comparative Example 1 | 588 | 60 | 30 | 9.06 |
| Comparative Example 2 | — | — | — | — |
| Comparative Example 3 | 294 | 30 | 60 | 0.01 |
| Comparative Example 4 | 588 | 60 | 45 | 4.75 |
| Comparative Example 5 | 588 | 60 | 30 | 9.00 |

TABLE 6

Properties of black composite hematite particles

| Examples and Comparative Examples | Average major axial diameter (average particle size) (μm) | Average minor axial diameter (μm) | Aspect ratio (-) | Geometrical standard deviation value (-) |
|---|---|---|---|---|
| Example 2 | 0.32 | — | — | 1.49 |
| Example 3 | 0.18 | — | — | 1.40 |
| Example 4 | 0.11 | — | — | 1.36 |
| Example 5 | 0.30 | — | — | 1.41 |
| Example 6 | 0.23 | 0.031 | 7.4:1 | 1.38 |
| Example 7 | 0.32 | — | — | 1.49 |
| Example 8 | 0.19 | — | — | 1.41 |
| Example 9 | 0.12 | — | — | 1.36 |
| Example 10 | 0.30 | — | — | 1.41 |
| Example 11 | 0.23 | 0.031 | 7.4:1 | 1.38 |
| Comparative Example 1 | 0.33 | — | — | — |
| Comparative Example 2 | 0.32 | — | — | 1.47 |
| Comparative Example 3 | 0.11 | — | — | — |
| Comparative Example 4 | 0.11 | — | — | — |
| Comparative Example 5 | 0.33 | — | — | — |

Properties of black composite hematite particles

| Examples and Comparative Examples | BET specific surface area value (m²/g) | Mn content (wt. %) | Blackness (L* value) (-) |
|---|---|---|---|
| Example 2 | 5.0 | 11.9 | 17.3 |
| Example 3 | 7.4 | 14.5 | 18.4 |
| Example 4 | 17.6 | — | 19.8 |
| Example 5 | 6.8 | — | 18.7 |
| Example 6 | 41.3 | — | 18.3 |
| Example 7 | 4.6 | 11.0 | 17.1 |
| Example 8 | 9.3 | 13.5 | 17.3 |
| Example 9 | 16.6 | — | 19.3 |
| Example 10 | 7.8 | — | 18.7 |
| Example 11 | 42.6 | — | 18.1 |
| Comparative Example 1 | 16.6 | 11.9 | 22.2 |
| Comparative Example 2 | 4.6 | 12.9 | 23.1 |
| Comparative Example 3 | 14.8 | — | 36.4 |
| Comparative Example 4 | 21.0 | — | 29.7 |
| Comparative Example 5 | 10.7 | 11.8 | 22.1 |

Properties of black composite hematite particles

| Examples and Comparative Examples | Volume resistivity value (Ω·cm) | Carbon black desorption percentage (%) | Thickness of carbon black coated (μm) |
|---|---|---|---|
| Example 2 | $6.4 \times 10^3$ | 7.1 | 0.0023 |
| Example 3 | $7.8 \times 10^3$ | 8.2 | 0.0021 |
| Example 4 | $2.3 \times 10^4$ | 6.4 | 0.0022 |
| Example 5 | $9.4 \times 10^3$ | 8.9 | 0.0023 |
| Example 6 | $8.6 \times 10^3$ | 8.8 | 0.0024 |
| Example 7 | $5.3 \times 10^3$ | 4.3 | 0.0025 |
| Example 8 | $6.5 \times 10^3$ | 1.5 | 0.0024 |
| Example 9 | $9.3 \times 10^3$ | 3.6 | 0.0024 |
| Example 10 | $8.4 \times 10^3$ | 4.3 | 0.0024 |
| Example 11 | $6.6 \times 10^3$ | 4.6 | 0.0025 |
| Comparative Example 1 | $8.7 \times 10^6$ | 68.3 | — |
| Comparative Example 2 | $2.5 \times 10^7$ | — | — |
| Comparative Example 3 | $5.2 \times 10^8$ | — | — |
| Comparative Example 4 | $1.3 \times 10^8$ | 47.3 | — |
| Comparative Example 5 | $6.8 \times 10^6$ | 51.6 | — |

TABLE 7

Properties of magnetic particles

| Magnetic particles | Kind of magnetic particles | Average major axial diameter (μm) | Average minor axial diameter (μm) |
|---|---|---|---|
| Magnetic particles 1 | Co-coated magnetite particles | 0.180 | 0.0252 |
| Magnetic particles 2 | Magnetic metal particles | 0.135 | 0.0191 |
| Magnetic particles 3 | Ba ferrite particles | 0.053 | 0.0160 |
| Magnetic particles 4 | Co-coated magnetite particles | 0.181 | 0.0250 |
| Magnetic particles 5 | Magnetic metal particles | 0.133 | 0.0188 |
| Magnetic particles 6 | Ba ferrite particles | 0.052 | 0.0159 |

Properties of magnetic particles

| Magnetic particles | Geometrical standard deviation value (-) | Aspect ratio (-) | BET specific surface area value (m²/g) |
|---|---|---|---|
| Magnetic particles 1 | 1.35 | 7.1:1 | 41.6 |
| Magnetic particles 2 | 1.38 | 7.1:1 | 53.5 |
| Magnetic particles 3 | 1.21 | 3.3:1 | 58.2 |
| Magnetic particles 4 | 1.36 | 7.2:1 | 41.7 |
| Magnetic particles 5 | 1.37 | 7.1:1 | 53.4 |
| Magnetic particles 6 | 1.21 | 3.3:1 | 58.2 |

Properties of magnetic particles

| Magnetic particles | Coercive force value (kA/m) | Coercive force value (Oe) | Saturation magnetization value (Am²/kg) | Saturation magnetization value (emu/g) |
|---|---|---|---|---|
| Magnetic particles 1 | 77.0 | 968 | 78.6 | 78.6 |
| Magnetic particles 2 | 178.3 | 2,240 | 138.2 | 138.2 |
| Magnetic particles 3 | 199.7 | 2,510 | 52.6 | 52.6 |
| Magnetic particles 4 | 75.8 | 953 | 78.3 | 78.3 |
| Magnetic particles 5 | 175.9 | 2,210 | 135.2 | 135.2 |
| Magnetic particles 6 | 199.0 | 2,500 | 52.6 | 52.6 |

TABLE 8

Production conditions of reference tape
Magnetic particles

| Reference tape | Kind | Amount blended (part by weight) |
|---|---|---|
| Reference tape 1 | Magnetic particles used in Example 1 | 100.0 |
| Reference tape 2 | Magnetic particles 1 | 100.0 |
| Reference tape 3 | Magnetic particles 2 | 100.0 |
| Reference tape 4 | Magnetic particles 3 | 100.0 |

| | Production conditions of reference tape Filler | | Properties of magnetic coating composition |
|---|---|---|---|
| Reference taper | Kind | Amount blended (part by weight) | Viscosity (cP) |
| Reference tape 1 | $Al_2O_3$ | 7.0 | 2,623 |
| Reference tape 2 | $Al_2O_3$ | 7.0 | 2,511 |
| Reference tape 3 | $Al_2O_3$ | 7.0 | 8,795 |
| Reference tape 4 | $Al_2O_3$ | 7.0 | 6,418 |

TABLE 9

| | Properties of reference tape | | |
|---|---|---|---|
| Reference tape | Coercive force value (Oe) (kA/m) | Coercive force value (Oe) (Oe) | Squareness (-) | Gloss (%) |
| Reference tape 1 | 59.5 | 748 | 0.81 | 134 |
| Reference tape 2 | 79.2 | 995 | 0.83 | 148 |
| Reference tape 3 | 182.8 | 2,297 | 0.82 | 181 |
| Reference tape 4 | 196.6 | 2,471 | 0.80 | 155 |

| | Properties of reference tape | | | |
|---|---|---|---|---|
| | Surface roughness | Linear absorption | Electromagnetic performance | |
| Reference tape | Ra (nm) | ($\mu m^{-1}$) | 4 MHz (dB) | 7 MHz (dB) |
| Reference tape 1 | 12.6 | 1.10 | ±0 | — |
| Reference tape 2 | 11.8 | 1.08 | — | ±0 |
| Reference tape 3 | 10.4 | 1.15 | — | ±0 |
| Reference tape 4 | 12.3 | 1.11 | — | ±0 |

| | Properties of reference tape | | |
|---|---|---|---|
| | Durability | | Surface resistivity value ($\Omega \cdot cm^2$) |
| Reference tape | Running durability time (min) | Head contamination | |
| Reference tape 1 | 23.2 | A | $1.2 \times 10^{10}$ |
| Reference tape 2 | 22.5 | A | $4.3 \times 10^{10}$ |
| Reference tape 3 | 21.0 | B | $2.6 \times 10^{10}$ |
| Reference tape 4 | 21.8 | B | $7.9 \times 10^{10}$ |

TABLE 10

Production conditions of magnetic recording medium
Magnetic particles

| Examples and Comparative Examples | Kind | Amount blended (part by weight) |
|---|---|---|
| Example 12 | Magnetic particles used in Example 1 | 100.0 |
| Example 13 | Magnetic particles used in Example 1 | 100.0 |
| Example 14 | Magnetic particles 1 | 100.0 |
| Example 15 | Magnetic particles 1 | 100.0 |
| Example 16 | Magnetic particles 1 | 100.0 |
| Example 17 | Magnetic particles 1 | 100.0 |
| Example 18 | Magnetic particles 1 | 100.0 |
| Example 19 | Magnetic particles 1 | 100.0 |
| Example 20 | Magnetic particles 2 | 100.0 |
| Example 21 | Magnetic particles 3 | 100.0 |
| Comparative Example 6 | Magnetic particles used in Example 1 | 100.0 |
| Comparative Example 7 | Magnetic particles used in Example 1 | 100.0 |
| Comparative Example 8 | Magnetic particles 1 | 100.0 |
| Comparative Example 9 | Magnetic particles 1 | 100.0 |
| Comparative Example 10 | Magnetic particles 1 | 100.0 |
| Comparative Example 11 | Magnetic particles 1 | 100.0 |
| Comparative Example 12 | Magnetic particles 1 | 100.0 |

| | Production conditions of magnetic recording medium Filler | | Properties of magnetic coating composition |
|---|---|---|---|
| Examples and Comparative Examples | Kind | Amount blended (part by weight) | Viscosity (cP) |
| Example 12 | Example 1 | 7.0 | 2,380 |
| Example 13 | Example 2 | 7.0 | 2,560 |
| Example 14 | Example 3 | 10.0 | 2,355 |
| Example 15 | Example 4 | 14.0 | 2,074 |
| Example 16 | Example 5 | 21.0 | 2,150 |
| Example 17 | Example 6 | 7.0 | 2,022 |
| Example 18 | Example 7 | 7.0 | 3,072 |
| Example 19 | Example 8 | 15.0 | 2,944 |
| Example 20 | Example 9 | 10.0 | 8,832 |
| Example 21 | Example 10 | 7.0 | 5,594 |
| Comparative Example 6 | Core particles 1 | 7.0 | 2,893 |
| Comparative Example 7 | Core particles 3 | 7.0 | 3,098 |
| Comparative Example 8 | Comparative Example 1 | 7.0 | 3,302 |
| Comparative Example 9 | Comparative Example 2 | 7.0 | 3,456 |
| Comparative Example 10 | Comparative Example 3 | 7.0 | 2,867 |
| Comparative Example 11 | Comparative Example 4 | 7.0 | 3,456 |
| Comparative Example 12 | Comparative Example 5 | 7.0 | 3,200 |

TABLE 11

| Examples | Reference tape | Properties of magnetic recording medium Coercive force value (kA/m) | (Oe) |
|---|---|---|---|
| Example 12 | Reference tape 1 | 59.8 | 752 |
| Example 13 | Reference tape 1 | 59.9 | 753 |
| Example 14 | Reference tape 2 | 79.8 | 1,003 |
| Example 15 | Reference tape 2 | 79.3 | 996 |
| Example 16 | Reference tape 2 | 79.4 | 998 |
| Example 17 | Reference tape 2 | 80.6 | 1,013 |
| Example 18 | Reference tape 2 | 79.5 | 999 |
| Example 19 | Reference tape 2 | 79.8 | 1,003 |
| Example 20 | Reference tape 3 | 183.1 | 2,301 |
| Example 21 | Reference tape 4 | 203.8 | 2,561 |

| Examples | Properties of magnetic recording medium Squareness (−) | Gloss (%) |
|---|---|---|
| Example 12 | 0.86 | 189 |
| Example 13 | 0.86 | 182 |
| Example 14 | 0.88 | 196 |
| Example 15 | 0.88 | 198 |
| Example 16 | 0.88 | 189 |
| Example 17 | 0.88 | 191 |
| Example 18 | 0.89 | 191 |
| Example 19 | 0.88 | 193 |
| Example 20 | 0.89 | 235 |
| Example 21 | 0.86 | 218 |

| | Properties of magnetic recording medium | | | |
|---|---|---|---|---|
| | Surface | Linear | Electromagnetic performance | |
| Examples | roughness Ra (nm) | absorption ($\mu m^{-1}$) | 4 MHz (dB) | 7 MHz (dB) |
| Example 12 | 6.4 | 1.63 | +2.2 | — |
| Example 13 | 7.1 | 1.64 | +2.1 | — |
| Example 14 | 6.0 | 1.53 | — | +2.1 |
| Example 15 | 5.8 | 1.56 | — | +2.2 |
| Example 16 | 6.3 | 1.58 | — | +2.3 |
| Example 17 | 6.0 | 1.53 | — | +2.2 |
| Example 18 | 6.2 | 1.57 | — | +2.0 |
| Example 19 | 5.9 | 1.59 | — | +2.1 |
| Example 20 | 6.0 | 1.86 | — | +2.3 |
| Example 21 | 5.6 | 1.48 | — | +2.1 |

| | Properties of magnetic recording medium Durability | | |
|---|---|---|---|
| Examples | Running durability time (min) | Head contamination | Surface resistivity value ($\Omega/cm^2$) |
| Example 12 | 27.3 | A | $7.4 \times 10^7$ |
| Example 13 | ≧30 | A | $7.8 \times 10^7$ |
| Example 14 | 26.8 | B | $1.3 \times 10^8$ |
| Example 15 | 28.3 | A | $2.4 \times 10^8$ |
| Example 16 | 26.5 | A | $7.6 \times 10^7$ |
| Example 17 | ≧30 | A | $5.4 \times 10^7$ |
| Example 18 | ≧30 | A | $3.8 \times 10^7$ |
| Example 19 | ≧30 | A | $1.6 \times 10^8$ |
| Example 20 | 28.8 | A | $3.8 \times 10^7$ |
| Example 21 | 26.1 | B | $3.4 \times 10^8$ |

TABLE 12

| Comparative Examples | Reference tape | Properties of magnetic recording medium Coercive force value (kA/m) | (Oe) |
|---|---|---|---|
| Comparative Example 6 | Reference tape 1 | 58.8 | 739 |
| Comparative Example 7 | Reference tape 1 | 59.0 | 741 |
| Comparative Example 8 | Reference tape 2 | 79.5 | 999 |
| Comparative Example 9 | Reference tape 2 | 79.0 | 993 |
| Comparative Example 10 | Reference tape 2 | 78.7 | 989 |
| Comparative Example 11 | Reference tape 2 | 79.6 | 1,000 |
| Comparative Example 12 | Reference tape 2 | 63.3 | 796 |

| Comparative Examples | Properties of magnetic recording medium Squareness (−) | Gloss (%) | Surface roughness Ra (nm) |
|---|---|---|---|
| Comparative Example 6 | 0.84 | 158 | 10.3 |
| Comparative Example 7 | 0.85 | 152 | 10.7 |
| Comparative Example 8 | 0.84 | 138 | 9.8 |
| Comparative Example 9 | 0.84 | 156 | 10.1 |
| Comparative Example 10 | 0.85 | 153 | 10.3 |
| Comparative Example 11 | 0.84 | 138 | 11.2 |
| Comparative Example 12 | 0.84 | 136 | 9.6 |

| | Properties of magnetic recording medium | | |
|---|---|---|---|
| | Linear | Electromagnetic performance | |
| Comparative Examples | absorption ($\mu m^{-1}$) | 4 MHz (dB) | 7 MHz (dB) |
| Comparative Example 6 | 1.23 | +0.7 | — |
| Comparative Example 7 | 1.08 | +0.3 | — |
| Comparative Example 8 | 1.21 | — | −0.2 |
| Comparative Example 9 | 1.20 | — | +0.1 |
| Comparative Example 10 | 1.06 | — | +0.2 |
| Comparative Example 11 | 1.21 | — | ±0.0 |
| Comparative Example 12 | 1.24 | — | −0.1 |

TABLE 12-continued

Properties of magnetic recording medium

| Comparative Examples | Durability Running durability time (min) | Head contamination | Surface resistivity value ($\Omega/cm^2$) |
|---|---|---|---|
| Comparative Example 6 | 17.8 | C | $8.6 \times 10^9$ |
| Comparative Example 7 | 13.2 | C | $9.3 \times 10^{10}$ |
| Comparative Example 8 | 15.3 | C | $7.6 \times 10^9$ |
| Comparative Example 9 | 15.0 | C | $1.4 \times 10^{10}$ |
| Comparative Example 10 | 10.3 | D | $2.4 \times 10^{10}$ |
| Comparative Example 11 | 11.2 | C | $1.8 \times 10^{10}$ |
| Comparative Example 12 | 14.6 | C | $9.3 \times 10^9$ |

TABLE 13

Production of black composite hematite particles — Coating with polysiloxane

| Examples and Comparative Examples | Kind of core particles | Additive Kind | Amount added (part by weight) |
|---|---|---|---|
| Example 23 | Core particles 1 | TSF484 | 1.0 |
| Example 24 | Core particles 2 | TSF484 | 5.0 |
| Example 25 | Core particles 3 | KF99 | 2.0 |
| Example 26 | Core particles 4 | L-9000 | 1.0 |
| Example 27 | Core particles 5 | TSF484/L-45 | 0.5/1.5 |
| Example 28 | Core particles 6 | TSF484 | 1.0 |
| Example 29 | Core particles 7 | TSF484 | 5.0 |
| Example 30 | Core particles 8 | KF99 | 2.0 |
| Example 31 | Core particles 9 | L-9000 | 1.0 |
| Example 32 | Core particles 10 | TSF484/L-45 | 0.5/1.5 |
| Comparative Example 13 | Core particles 1 | TSF484 | 1.0 |
| Comparative Example 14 | Core particles 3 | TSF484 | 0.5 |
| Comparative Example 15 | Core particles 3 | TSF484 | 0.005 |

Production of black composite hematite particles — Coating with polysiloxane

| Examples and Comparative Examples | Edge runner treatment Linear load (N/cm) | Linear load (kg/cm) | Time (min) | Coating amount (calculated as Si) (wt. %) |
|---|---|---|---|---|
| Example 23 | 588 | 60 | 30 | 0.44 |
| Example 24 | 294 | 30 | 45 | 2.13 |
| Example 25 | 588 | 60 | 30 | 0.86 |
| Example 26 | 441 | 45 | 20 | 0.43 |
| Example 27 | 588 | 60 | 45 | 0.78 |
| Example 28 | 588 | 60 | 30 | 0.44 |
| Example 29 | 588 | 60 | 20 | 2.12 |
| Example 30 | 294 | 30 | 30 | 0.86 |
| Example 31 | 588 | 60 | 45 | 0.44 |
| Example 32 | 441 | 45 | 30 | 0.81 |
| Comparative Example 13 | 588 | 60 | 30 | 0.44 |
| Comparative Example 14 | 588 | 60 | 30 | 0.22 |
| Comparative Example 15 | 588 | 60 | 30 | $2 \times 10^{-3}$ |

TABLE 13-continued

Production of black composite hematite particles — Coating of carbon black

| Examples and Comparative Examples | Carbon black Kind | Amount added (part by weight) |
|---|---|---|
| Example 23 | B | 10.0 |
| Example 24 | B | 3.0 |
| Example 25 | C | 5.0 |
| Example 26 | C | 10.0 |
| Example 27 | D | 7.5 |
| Example 28 | B | 10.0 |
| Example 29 | B | 3.0 |
| Example 30 | C | 5.0 |
| Example 31 | C | 10.0 |
| Example 32 | D | 7.5 |
| Comparative Example 13 | — | — |
| Comparative Example 14 | B | 0.01 |
| Comparative Example 15 | C | 3.0 |

Production of black composite hematite particles — Coating of carbon black

| Examples and Comparative Examples | Edge runner treatment Linear load (N/cm) | Linear load (kg/cm) | Time (min) | Coating amount (calculated as C) (wt. %) |
|---|---|---|---|---|
| Example 23 | 588 | 60 | 30 | 9.06 |
| Example 24 | 588 | 60 | 45 | 2.90 |
| Example 25 | 588 | 60 | 30 | 4.75 |
| Example 26 | 294 | 30 | 20 | 9.09 |
| Example 27 | 588 | 60 | 30 | 6.95 |
| Example 28 | 588 | 60 | 45 | 9.06 |
| Example 29 | 588 | 60 | 30 | 2.89 |
| Example 30 | 441 | 45 | 20 | 4.72 |
| Example 31 | 588 | 60 | 30 | 9.08 |
| Example 32 | 441 | 45 | 45 | 6.93 |
| Comparative Example 13 | — | — | — | — |
| Comparative Example 14 | 588 | 60 | 30 | 0.01 |
| Comparative Example 15 | 588 | 60 | 30 | 2.91 |

TABLE 14

Properties of black composite hematite particles

| Examples and Comparative Examples | Average major axial diameter (average particle size) (µm) | Average minor axial diameter (µm) | Aspect ratio (-) | Geometrical standard deviation value (-) |
|---|---|---|---|---|
| Example 23 | 0.32 | — | — | 1.48 |
| Example 24 | 0.18 | — | — | 1.41 |
| Example 25 | 0.11 | — | — | 1.35 |
| Example 26 | 0.29 | — | — | 1.41 |
| Example 27 | 0.23 | 0.029 | 7.9:1 | 1.38 |
| Example 28 | 0.32 | — | — | 1.48 |
| Example 29 | 0.19 | — | — | 1.42 |
| Example 30 | 0.12 | — | — | 1.36 |
| Example 31 | 0.30 | — | — | 1.41 |
| Example 32 | 0.23 | 0.029 | 7.9:1 | 1.38 |
| Comparative Example 13 | 0.32 | — | — | 1.48 |

TABLE 14-continued

| Examples and Comparative Examples | BET specific surface area value (m²/g) | Mn content (wt. %) | Blackness (L* value) (—) | Volume resistivity value (Ω· cm) |
|---|---|---|---|---|
| Comparative Example 14 | 0.11 | — | — | 1.35 |
| Comparative Example 15 | 0.12 | — | — | 1.36 |

Properties of black composite hematite particles

| Examples and Comparative Examples | BET specific surface area value (m²/g) | Mn content (wt. %) | Blackness (L* value) (—) | Volume resistivity value (Ω· cm) |
|---|---|---|---|---|
| Example 23 | 4.4 | 12.2 | 18.3 | 5.6 × 10³ |
| Example 24 | 8.0 | 14.9 | 18.3 | 9.6 × 10³ |
| Example 25 | 15.3 | — | 20.9 | 2.6 × 10⁴ |
| Example 26 | 4.6 | — | 20.8 | 9.3 × 10³ |
| Example 27 | 36.4 | — | 18.6 | 1.4 × 10⁴ |
| Example 28 | 3.9 | 12.2 | 18.3 | 6.2 × 10³ |
| Example 29 | 8.3 | 14.9 | 20.9 | 1.7 × 10⁴ |
| Example 30 | 15.9 | — | 20.3 | 3.0 × 10⁴ |
| Example 31 | 4.4 | — | 20.2 | 9.8 × 10³ |
| Example 32 | 36.8 | — | 20.4 | 1.9 × 10⁴ |
| Comparative Example 13 | 3.9 | 12.9 | 21.2 | 3.6 × 10⁷ |
| Comparative Example 14 | 15.5 | — | 35.9 | 5.8 × 10⁸ |
| Comparative Example 15 | 18.6 | — | 25.7 | 3.3 × 10⁸ |

Properties of black composite hematite particles

| Examples and Comparative Examples | Carbon black desorption percentage (%) | Thickness of carbon black coated (μm) |
|---|---|---|
| Example 23 | 7.3 | 0.0024 |
| Example 24 | 8.9 | 0.0021 |
| Example 25 | 8.6 | 0.0022 |
| Example 26 | 6.9 | 0.0024 |
| Example 27 | 9.1 | 0.0023 |
| Example 28 | 4.6 | 0.0024 |
| Example 29 | 3.2 | 0.0021 |
| Example 30 | 4.8 | 0.0023 |
| Example 31 | 4.2 | 0.0024 |
| Example 32 | 1.6 | 0.0023 |
| Comparative Example 13 | — | — |
| Comparative Example 14 | — | — |
| Comparative Example 15 | 67.2 | — |

TABLE 15

Production of black composite hematite particles
Coating with modified polysiloxane Additive

| Examples and Comparative Examples | Kind of core particles | Kind | Amount added (part by weight) |
|---|---|---|---|
| Example 33 | Core particles 1 | BYK-080 | 1.0 |
| Example 34 | Core particles 2 | BYK-310 | 2.0 |
| Example 35 | Core particles 3 | BYK-322 | 5.0 |
| Example 36 | Core particles 4 | TSF4446 | 1.0 |
| Example 37 | Core particles 5 | YF3965 | 1.0 |
| Example 38 | Core particles 6 | BYK-080 | 1.0 |
| Example 39 | Core particles 7 | BYK-310 | 2.0 |
| Example 40 | Core particles 8 | BYK-322 | 5.0 |
| Example 41 | Core particles 9 | TSF4446 | 1.0 |
| Example 42 | Core particles 10 | YF3965 | 1.0 |
| Comparative Example 16 | Core particles 1 | BYK-080 | 1.0 |
| Comparative Example 17 | Core particles 3 | BYK-080 | 0.5 |
| Comparative Example 18 | Core particles 3 | BYK-080 | 0.005 |

Production of black composite hematite particles
Coating with modified polysiloxane

| Examples and Comparative Examples | Edge runner treatment Linear load (N/cm) | (kg/cm) | Time (min) | Coating amount (calculated as Si) (wt. %) |
|---|---|---|---|---|
| Example 33 | 588 | 60 | 30 | 0.17 |
| Example 34 | 588 | 60 | 20 | 0.34 |
| Example 35 | 441 | 45 | 45 | 0.85 |
| Example 36 | 588 | 60 | 30 | 0.18 |
| Example 37 | 294 | 30 | 25 | 0.16 |
| Example 38 | 588 | 60 | 30 | 0.17 |
| Example 39 | 441 | 45 | 30 | 0.33 |
| Example 40 | 588 | 60 | 25 | 0.86 |
| Example 41 | 294 | 30 | 45 | 0.17 |
| Example 42 | 588 | 60 | 30 | 0.17 |
| Comparative Example 16 | 588 | 60 | 30 | 0.17 |
| Comparative Example 17 | 588 | 60 | 30 | 0.08 |
| Comparative Example 18 | 588 | 60 | 30 | 6 × 10⁻⁴ |

Production of black composite hematite particles
Coating of carbon black
Carbon black

| Examples and Comparative Examples | Kind | Amount added (part by weight) |
|---|---|---|
| Example 33 | B | 7.5 |
| Example 34 | B | 5.0 |
| Example 35 | C | 10.0 |
| Example 36 | C | 15.0 |
| Example 37 | D | 5.0 |
| Example 38 | B | 7.5 |
| Example 39 | B | 5.0 |
| Example 40 | C | 10.0 |
| Example 41 | C | 15.0 |
| Example 42 | D | 5.0 |
| Comparative Example 16 | — | — |
| Comparative Example 17 | B | 0.01 |
| Comparative Example 18 | C | 5.0 |

Production of black composite hematite particles
Coating of carbon black

| Examples and Comparative Examples | Edge runner treatment Linear load (N/cm) | (kg/cm) | Time (min) | Coating amount (calculated as C) (wt. %) |
|---|---|---|---|---|
| Example 33 | 441 | 45 | 45 | 6.95 |
| Example 34 | 735 | 75 | 20 | 4.75 |
| Example 35 | 588 | 60 | 20 | 9.08 |
| Example 36 | 441 | 45 | 45 | 13.00 |
| Example 37 | 588 | 60 | 30 | 4.76 |
| Example 38 | 294 | 30 | 60 | 6.93 |
| Example 39 | 588 | 60 | 30 | 4.74 |
| Example 40 | 441 | 45 | 45 | 9.05 |
| Example 41 | 735 | 75 | 20 | 13.03 |
| Example 42 | 588 | 60 | 30 | 4.76 |
| Comparative Example 16 | — | — | — | — |

TABLE 15-continued

| | | | | |
|---|---|---|---|---|
| Comparative Example 17 | 588 | 60 | 30 | 0.01 |
| Comparative Example 18 | 588 | 60 | 30 | 4.73 |

TABLE 16

Properties of black composite hematite particles

| Examples and Comparative Examples | Average major axial diameter (average particle size) (μm) | Average minor axial diameter (μm) | Aspect ratio (–) | Geometrical standard deviation value (–) |
|---|---|---|---|---|
| Example 33 | 0.32 | — | — | 1.48 |
| Example 34 | 0.18 | — | — | 1.41 |
| Example 35 | 0.11 | — | — | 1.35 |
| Example 36 | 0.29 | — | — | 1.41 |
| Example 37 | 0.23 | 0.029 | 7.9:1 | 1.38 |
| Example 38 | 0.32 | — | — | 1.48 |
| Example 39 | 0.19 | — | — | 1.41 |
| Example 40 | 0.12 | — | — | 1.35 |
| Example 41 | 0.30 | — | — | 1.41 |
| Example 42 | 0.23 | 0.029 | 7.9:1 | 1.38 |
| Comparative Example 16 | 0.32 | — | — | 1.48 |
| Comparative Example 17 | 0.11 | — | — | 1.36 |
| Comparative Example 18 | 0.12 | — | — | 1.35 |

Properties of black composite hematite particles

| Examples and Comparative Examples | BET specific surface area value (m²/g) | Mn content (wt. %) | Blackness (L* value) (–) | Volume resistivity value (Ω·cm) |
|---|---|---|---|---|
| Example 33 | 4.1 | 12.2 | 18.0 | $7.1 \times 10^3$ |
| Example 34 | 8.3 | 14.9 | 18.1 | $8.2 \times 10^3$ |
| Example 35 | 15.1 | — | 20.5 | $1.0 \times 10^4$ |
| Example 36 | 4.3 | — | 20.5 | $8.5 \times 10^3$ |
| Example 37 | 36.4 | — | 20.8 | $2.3 \times 10^4$ |
| Example 38 | 4.1 | 12.3 | 18.4 | $7.4 \times 10^3$ |
| Example 39 | 8.1 | 15.0 | 18.6 | $8.4 \times 10^3$ |
| Example 40 | 15.8 | — | 20.6 | $1.7 \times 10^4$ |
| Example 41 | 3.9 | — | 20.3 | $9.4 \times 10^3$ |
| Example 42 | 36.8 | — | 20.6 | $2.5 \times 10^4$ |
| Comparative Example 16 | 4.1 | 12.8 | 21.3 | $3.9 \times 10^7$ |
| Comparative Example 17 | 15.2 | — | 35.9 | $6.0 \times 10^8$ |
| Comparative Example 18 | 17.9 | — | 26.1 | $1.6 \times 10^8$ |

Properties of black composite hematite particles

| Examples and Comparative Examples | Carbon black desorption percentage (%) | Thickness of carbon black coated (μm) |
|---|---|---|
| Example 33 | 7.1 | 0.0023 |
| Example 34 | 6.9 | 0.0022 |
| Example 35 | 8.4 | 0.0024 |
| Example 36 | 6.8 | 0.0025 |
| Example 37 | 6.1 | 0.0023 |
| Example 38 | 4.2 | 0.0024 |
| Example 39 | 3.6 | 0.0023 |
| Example 40 | 2.8 | 0.0024 |
| Example 41 | 1.6 | 0.0024 |
| Example 42 | 2.1 | 0.0023 |

TABLE 16-continued

| | | |
|---|---|---|
| Comparative Example 16 | — | — |
| Comparative Example 17 | — | — |
| Comparative Example 18 | 59.8 | — |

TABLE 17

Production of black composite hematite particles
Coating with terminal-modified polysiloxane

| Examples and Comparative Examples | Kind of core particles | Additive Kind | Amount added (part by weight) |
|---|---|---|---|
| Example 43 | Core particles 1 | TFS4770 | 2.0 |
| Example 44 | Core particles 2 | TFS4770 | 1.0 |
| Example 45 | Core particles 3 | TFS4751 | 0.5 |
| Example 46 | Core particles 4 | XF3905 | 5.0 |
| Example 47 | Core particles 5 | YF3804 | 2.0 |
| Example 48 | Core particles 6 | TFS4770 | 2.0 |
| Example 49 | Core particles 7 | TFS4770 | 1.0 |
| Example 50 | Core particles 8 | TFS4751 | 0.5 |
| Example 51 | Core particles 9 | XF3905 | 5.0 |
| Example 52 | Core particles 10 | YF3804 | 2.0 |
| Comparative Example 19 | Core particles 1 | TFS4770 | 1.0 |
| Comparative Example 20 | Core particles 3 | TFS4770 | 1.0 |
| Comparative Example 21 | Core particles 3 | TFS4770 | 0.005 |

Production of black composite hematite particles
Coating with terminal-modified polysiloxane

| Examples and Comparative Examples | Edge runner treatment Linear load (N/cm) | (kg/cm) | Time (min) | Coating amount (calculated as Si) (wt. %) |
|---|---|---|---|---|
| Example 43 | 294 | 30 | 45 | 0.70 |
| Example 44 | 588 | 60 | 20 | 0.35 |
| Example 45 | 294 | 30 | 60 | 0.18 |
| Example 46 | 588 | 60 | 20 | 1.75 |
| Example 47 | 441 | 45 | 45 | 0.40 |
| Example 48 | 441 | 45 | 30 | 0.69 |
| Example 49 | 588 | 60 | 30 | 0.35 |
| Example 50 | 588 | 60 | 20 | 0.17 |
| Example 51 | 588 | 60 | 30 | 1.74 |
| Example 52 | 588 | 60 | 20 | 0.41 |
| Comparative Example 19 | 588 | 60 | 30 | 0.34 |
| Comparative Example 20 | 588 | 60 | 30 | 0.35 |
| Comparative Example 21 | 588 | 60 | 30 | $1 \times 10^{-3}$ |

Production of black composite hematite particles
Coating of carbon black

| Examples and Comparative Examples | Carbon black Kind | Amount added (part by weight) |
|---|---|---|
| Example 43 | B | 10.0 |
| Example 44 | B | 5.0 |
| Example 45 | C | 7.5 |
| Example 46 | C | 10.0 |
| Example 47 | D | 7.5 |
| Example 48 | B | 10.0 |

TABLE 17-continued

| | | |
|---|---|---|
| Example 49 | B | 5.0 |
| Example 50 | C | 7.5 |
| Example 51 | C | 10.0 |
| Example 52 | D | 7.5 |
| Comparative Example 19 | — | — |
| Comparative Example 20 | B | 0.1 |
| Comparative Example 21 | C | 5.0 |

Production of black composite hematite particles
Coating of carbon black

| Examples and Comparative Examples | Edge runner treatment Linear load (N/cm) | Edge runner treatment Linear load (kg/cm) | Time (min) | Coating amount (calculated as C) (wt. %) |
|---|---|---|---|---|
| Example 43 | 441 | 45 | 30 | 9.08 |
| Example 44 | 294 | 30 | 60 | 4.76 |
| Example 45 | 588 | 60 | 20 | 6.96 |
| Example 46 | 294 | 30 | 45 | 9.09 |
| Example 47 | 441 | 45 | 30 | 6.95 |
| Example 48 | 441 | 45 | 45 | 9.07 |
| Example 49 | 294 | 30 | 60 | 4.76 |
| Example 50 | 588 | 60 | 30 | 6.96 |
| Example 51 | 735 | 75 | 20 | 9.05 |
| Example 52 | 588 | 60 | 30 | 6.95 |
| Comparative Example 19 | — | — | — | — |
| Comparative Example 20 | 588 | 60 | 30 | 0.01 |
| Comparative Example 21 | 588 | 60 | 30 | 4.76 |

TABLE 18

Properties of black composite hematite particles

| Examples and Comparative Examples | Average major axial diameter (average particle size) (µm) | Average minor axial diameter (µm) | Aspect ratio (-) | Geometrical standard deviation value (-) |
|---|---|---|---|---|
| Example 43 | 0.32 | — | — | 1.48 |
| Example 44 | 0.18 | — | — | 1.41 |
| Example 45 | 0.12 | — | — | 1.35 |
| Example 46 | 0.30 | — | — | 1.41 |
| Example 47 | 0.23 | 0.029 | 7.9:1 | 1.38 |
| Example 48 | 0.32 | — | — | 1.48 |
| Example 49 | 0.19 | — | — | 1.40 |
| Example 50 | 0.12 | — | — | 1.36 |
| Example 51 | 0.30 | — | — | 1.41 |
| Example 52 | 0.23 | 0.029 | 7.9:1 | 1.38 |
| Comparative Example 19 | 0.32 | — | — | 1.48 |
| Comparative Example 20 | 0.11 | — | — | 1.36 |
| Comparative Example 21 | 0.12 | — | — | 1.36 |

Properties of black composite hematite particles

| Examples and Comparative Examples | BET specific surface area value (m²/g) | Mn content (wt. %) | Blackness (L* value) (—) | Volume resistivity value (Ω·cm) |
|---|---|---|---|---|
| Example 43 | 4.4 | 12.4 | 18.3 | $6.2 \times 10^3$ |
| Example 44 | 8.2 | 14.9 | 18.6 | $8.6 \times 10^3$ |
| Example 45 | 15.1 | — | 20.7 | $1.5 \times 10^4$ |
| Example 46 | 4.1 | — | 20.1 | $9.6 \times 10^3$ |
| Example 47 | 35.9 | — | 20.6 | $1.8 \times 10^4$ |
| Example 48 | 4.1 | 12.3 | 18.6 | $6.8 \times 10^3$ |
| Example 49 | 8.1 | 15.0 | 18.8 | $9.4 \times 10^3$ |
| Example 50 | 15.6 | — | 20.6 | $1.6 \times 10^4$ |
| Example 51 | 4.2 | — | 19.9 | $1.1 \times 10^4$ |
| Example 52 | 36.1 | — | 20.1 | $2.6 \times 10^4$ |
| Comparative Example 19 | 3.8 | 12.9 | 21.5 | $3.9 \times 10^7$ |
| Comparative Example 20 | 17.2 | — | 35.6 | $5.4 \times 10^8$ |
| Comparative Example 21 | 19.1 | — | 25.8 | $1.9 \times 10^8$ |

Properties of black composite hematite particles

| Examples and Comparative Examples | Carbon black desorption percentage (%) | Thickness of carbon black coated (µm) |
|---|---|---|
| Example 43 | 5.3 | 0.0024 |
| Example 44 | 6.1 | 0.0023 |
| Example 45 | 7.2 | 0.0023 |
| Example 46 | 8.9 | 0.0024 |
| Example 47 | 9.1 | 0.0024 |
| Example 48 | 1.3 | 0.0024 |
| Example 49 | 2.6 | 0.0023 |
| Example 50 | 3.2 | 0.0023 |
| Example 51 | 4.4 | 0.0024 |
| Example 52 | 1.8 | 0.0023 |
| Comparative Example 19 | — | — |
| Comparative Example 20 | — | — |
| Comparative Example 21 | 61.2 | — |

TABLE 19

Production conditions of magnetic recording medium
Magnetic particles

| Examples | Kind | Amount blended (part by weight) |
|---|---|---|
| Example 53 | Magnetic particles used in Example 1 | 100.0 |
| Example 54 | Magnetic particles used in Example 1 | 100.0 |
| Example 55 | Magnetic particle 1 | 100.0 |
| Example 56 | Magnetic particle 1 | 100.0 |
| Example 57 | Magnetic particle 1 | 100.0 |
| Example 58 | Magnetic particle 1 | 100.0 |
| Example 59 | Magnetic particle 1 | 100.0 |
| Example 60 | Magnetic particle 1 | 100.0 |
| Example 61 | Magnetic particle 2 | 100.0 |
| Example 62 | Magnetic particle 3 | 100.0 |
| Example 63 | Magnetic particles used in Example 1 | 100.0 |
| Example 64 | Magnetic particles used in Example 1 | 100.0 |
| Example 65 | Magnetic particle 1 | 100.0 |
| Example 66 | Magnetic particle 1 | 100.0 |
| Example 67 | Magnetic particle 1 | 100.0 |
| Example 68 | Magnetic particle 1 | 100.0 |
| Example 69 | Magnetic particle 1 | 100.0 |
| Example 70 | Magnetic particle 1 | 100.0 |
| Example 71 | Magnetic particle 2 | 100.0 |
| Example 72 | Magnetic particle 3 | 100.0 |
| Example 73 | Magnetic particles used in Example 1 | 100.0 |
| Example 74 | Magnetic particles used in Example 1 | 100.0 |

TABLE 19-continued

| Examples | Kind | Amount blended (part by weight) | coating composition Viscosity (cP) |
|---|---|---|---|
| Example 75 | Magnetic particle 1 | 100.0 | |
| Example 76 | Magnetic particle 1 | 100.0 | |
| Example 77 | Magnetic particle 1 | 100.0 | |
| Example 78 | Magnetic particle 1 | 100.0 | |
| Example 79 | Magnetic particle 1 | 100.0 | |
| Example 80 | Magnetic particle 1 | 100.0 | |
| Example 81 | Magnetic particle 2 | 100.0 | |
| Example 82 | Magnetic particle 3 | 100.0 | |

Production conditions of magnetic recording medium — Filler / Properties of magnetic coating composition Viscosity (cP)

| Examples | Kind | Amount blended (part by weight) | Viscosity (cP) |
|---|---|---|---|
| Example 53 | Example 23 | 7.0 | 2,816 |
| Example 54 | Example 24 | 7.0 | 2,577 |
| Example 55 | Example 25 | 10.0 | 2,560 |
| Example 56 | Example 26 | 14.0 | 3,328 |
| Example 57 | Example 27 | 21.0 | 2,304 |
| Example 58 | Example 28 | 7.0 | 2,048 |
| Example 59 | Example 29 | 7.0 | 2,816 |
| Example 60 | Example 30 | 15.0 | 2,560 |
| Example 61 | Example 31 | 10.0 | 6,892 |
| Example 62 | Example 32 | 7.0 | 5,658 |
| Example 63 | Example 33 | 7.0 | 2,304 |
| Example 64 | Example 34 | 7.0 | 2,560 |
| Example 65 | Example 35 | 10.0 | 3,328 |
| Example 66 | Example 36 | 14.0 | 2,048 |
| Example 67 | Example 37 | 21.0 | 3,200 |
| Example 68 | Example 38 | 7.0 | 2,893 |
| Example 69 | Example 39 | 7.0 | 2,688 |
| Example 70 | Example 40 | 15.0 | 2,708 |
| Example 71 | Example 41 | 10.0 | 7,302 |
| Example 72 | Example 42 | 7.0 | 5,830 |
| Example 73 | Example 43 | 7.0 | 2,713 |
| Example 74 | Example 44 | 7.0 | 2,893 |
| Example 75 | Example 45 | 10.0 | 2,688 |
| Example 76 | Example 46 | 14.0 | 2,560 |
| Example 77 | Example 47 | 21.0 | 2,048 |
| Example 78 | Example 48 | 7.0 | 2,074 |
| Example 79 | Example 49 | 7.0 | 3,200 |
| Example 80 | Example 50 | 15.0 | 3,328 |
| Example 81 | Example 51 | 10.0 | 6,968 |
| Example 82 | Example 52 | 7.0 | 4,898 |

TABLE 20

Production conditions of magnetic recording medium — Magnetic particles

| Comparative Examples | Kind | Amount blended (part by weight) |
|---|---|---|
| Comparative Example 22 | Magnetic particle 1 | 100.0 |
| Comparative Example 23 | Magnetic particle 1 | 100.0 |
| Comparative Example 24 | Magnetic particle 1 | 100.0 |
| Comparative Example 25 | Magnetic particle 1 | 100.0 |
| Comparative Example 26 | Magnetic particle 1 | 100.0 |
| Comparative Example 27 | Magnetic particle 1 | 100.0 |
| Comparative Example 28 | Magnetic particle 1 | 100.0 |
| Comparative Example 29 | Magnetic particle 1 | 100.0 |
| Comparative Example 30 | Magnetic particle 1 | 100.0 |

TABLE 20-continued

Production conditions of magnetic recording medium — Filler / Properties of magnetic coating composition Viscosity (cP)

| Examples | Kind | Amount blended (part by weight) | Viscosity (cP) |
|---|---|---|---|
| Comparative Example 22 | Comparative Example 13 | 7.0 | 2,893 |
| Comparative Example 23 | Comparative Example 14 | 7.0 | 3,304 |
| Comparative Example 24 | Comparative Example 15 | 7.0 | 3,925 |
| Comparative Example 25 | Comparative Example 16 | 7.0 | 3,862 |
| Comparative Example 26 | Comparative Example 17 | 7.0 | 3,568 |
| Comparative Example 27 | Comparative Example 18 | 7.0 | 3,302 |
| Comparative Example 28 | Comparative Example 19 | 7.0 | 3,302 |
| Comparative Example 29 | Comparative Example 20 | 7.0 | 3,046 |
| Comparative Example 30 | Comparative Example 21 | 7.0 | 4,188 |

TABLE 21

| Examples | Reference tape | Properties of magnetic recording medium Coercive force value (kA/m) | (Oe) |
|---|---|---|---|
| Example 53 | Reference tape 1 | 59.8 | 751 |
| Example 54 | Reference tape 1 | 59.9 | 753 |
| Example 55 | Reference tape 2 | 80.4 | 1,010 |
| Example 56 | Reference tape 2 | 80.2 | 1,008 |
| Example 57 | Reference tape 2 | 80.1 | 1,006 |
| Example 58 | Reference tape 2 | 79.3 | 996 |
| Example 59 | Reference tape 2 | 79.4 | 998 |
| Example 60 | Reference tape 2 | 79.6 | 1,000 |
| Example 61 | Reference tape 3 | 185.1 | 2,326 |
| Example 62 | Reference tape 4 | 202.4 | 2,543 |

| Examples | Squareness (−) | Gloss (%) | Surface roughness Ra (nm) |
|---|---|---|---|
| Example 53 | 0.87 | 185 | 7.2 |
| Example 54 | 0.88 | 183 | 7.5 |
| Example 55 | 0.88 | 186 | 7.2 |
| Example 56 | 0.89 | 188 | 7.0 |
| Example 57 | 0.88 | 182 | 7.4 |
| Example 58 | 0.90 | 191 | 6.4 |
| Example 59 | 0.90 | 191 | 6.6 |
| Example 60 | 0.89 | 183 | 7.3 |
| Example 61 | 0.88 | 238 | 7.0 |
| Example 62 | 0.87 | 206 | 6.0 |

TABLE 21-continued

| | Properties of magnetic recording medium | | |
|---|---|---|---|
| | Linear | Electromagnetic performance | |
| Examples | absorption ($\mu m^{-1}$) | 4 MHz (dB) | 7 MHz (dB) |
| Example 53 | 1.63 | +2.1 | — |
| Example 54 | 1.65 | +2.5 | — |
| Example 55 | 1.56 | — | +2.2 |
| Example 56 | 1.57 | — | +2.4 |
| Example 57 | 1.58 | — | +2.3 |
| Example 58 | 1.56 | — | +2.7 |
| Example 59 | 1.56 | — | +3.0 |
| Example 60 | 1.58 | — | +2.1 |
| Example 61 | 1.81 | — | +5.0 |
| Example 62 | 1.53 | — | +4.0 |

| | Properties of magnetic recording medium | | |
|---|---|---|---|
| | Durability | | |
| Examples | Running durability time (min) | Head contamination | Surface resistivity value ($\Omega/cm^2$) |
| Example 53 | 26.2 | A | $6.3 \times 10^7$ |
| Example 54 | 27.3 | A | $5.2 \times 10^7$ |
| Example 55 | 26.6 | A | $2.6 \times 10^8$ |
| Example 56 | 26.8 | A | $3.4 \times 10^8$ |
| Example 57 | 26.9 | A | $8.6 \times 10^7$ |
| Example 58 | 29.3 | A | $6.1 \times 10^7$ |
| Example 59 | ≧30 | A | $1.6 \times 10^7$ |
| Example 60 | 28.3 | A | $2.8 \times 10^8$ |
| Example 61 | 26.6 | A | $4.1 \times 10^7$ |
| Example 62 | 26.8 | A | $4.6 \times 10^8$ |

TABLE 22

| | Reference | Properties of magnetic recording medium Coercive force value | |
|---|---|---|---|
| Examples | tape | (kA/m) | (Oe) |
| Example 63 | Reference tape 1 | 59.8 | 751 |
| Example 64 | Reference tape 1 | 59.7 | 750 |
| Example 65 | Reference tape 2 | 79.5 | 999 |
| Example 66 | Reference tape 2 | 79.4 | 998 |
| Example 67 | Reference tape 2 | 80.1 | 1,006 |
| Example 68 | Reference tape 2 | 80.4 | 1,010 |
| Example 69 | Reference tape 2 | 80.2 | 1,008 |
| Example 70 | Reference tape 2 | 80.1 | 1,006 |
| Example 71 | Reference tape 3 | 184.3 | 2,316 |
| Example 72 | Reference tape 4 | 201.5 | 2,532 |

| | Properties of magnetic recording medium | | |
|---|---|---|---|
| Examples | Squareness (—) | Gloss (%) | Surface roughness Ra (nm) |
| Example 63 | 0.88 | 183 | 7.3 |
| Example 64 | 0.87 | 183 | 7.6 |
| Example 65 | 0.88 | 185 | 7.3 |
| Example 66 | 0.88 | 183 | 7.6 |
| Example 67 | 0.87 | 186 | 7.2 |
| Example 68 | 0.88 | 185 | 7.5 |
| Example 69 | 0.88 | 183 | 7.3 |
| Example 70 | 0.88 | 186 | 7.0 |
| Example 71 | 0.88 | 236 | 7.3 |
| Example 72 | 0.87 | 202 | 6.8 |

| | Properties of magnetic recording medium | | |
|---|---|---|---|
| | Linear | Electromagnetic performance | |
| Examples | absorption ($\mu m^{-1}$) | 4 MHz (dB) | 7 MHz (dB) |
| Example 63 | 1.61 | +2.0 | — |
| Example 64 | 1.63 | +2.1 | — |
| Example 65 | 1.53 | — | +2.0 |
| Example 66 | 1.50 | — | +2.3 |
| Example 67 | 1.51 | — | +2.5 |
| Example 68 | 1.53 | — | +2.2 |
| Example 69 | 1.55 | — | +2.3 |
| Example 70 | 1.56 | — | +2.4 |
| Example 71 | 1.86 | — | +5.1 |
| Example 72 | 1.50 | — | +3.8 |

| | Properties of magnetic recording medium | | |
|---|---|---|---|
| | Durability | | |
| Examples | Running durability time (min) | Head contamination | Surface resistivity value ($\Omega/cm^2$) |
| Example 63 | 29.6 | A | $8.3 \times 10^7$ |
| Example 64 | 28.8 | A | $8.7 \times 10^7$ |
| Example 65 | 27.3 | A | $3.1 \times 10^8$ |
| Example 66 | 26.8 | A | $2.6 \times 10^8$ |
| Example 67 | 27.3 | A | $6.9 \times 10^7$ |
| Example 68 | 28.3 | A | $5.9 \times 10^7$ |
| Example 69 | ≧30 | A | $3.1 \times 10^7$ |
| Example 70 | ≧30 | A | $2.2 \times 10^8$ |
| Example 71 | 26.8 | A | $4.6 \times 10^7$ |
| Example 72 | 26.3 | A | $1.8 \times 10^8$ |

TABLE 23

| | Reference | Properties of magnetic recording medium Coercive force value | |
|---|---|---|---|
| Examples | tape | (kA/m) | (Oe) |
| Example 73 | Reference tape 1 | 59.9 | 753 |
| Example 74 | Reference tape 1 | 59.7 | 750 |
| Example 75 | Reference tape 2 | 80.5 | 1,011 |
| Example 76 | Reference tape 2 | 80.1 | 1,006 |
| Example 77 | Reference tape 2 | 79.8 | 1,003 |
| Example 78 | Reference tape 2 | 79.3 | 996 |
| Example 79 | Reference tape 2 | 79.5 | 999 |
| Example 80 | Reference tape 2 | 80.4 | 1,010 |
| Example 81 | Reference tape 3 | 185.7 | 2,333 |
| Example 82 | Reference tape 4 | 200.8 | 2,523 |

TABLE 23-continued

Properties of magnetic recording medium

| Examples | Squareness (–) | Gloss (%) | Surface roughness Ra (nm) |
|---|---|---|---|
| Example 73 | 0.88 | 186 | 7.0 |
| Example 74 | 0.87 | 188 | 6.7 |
| Example 75 | 0.88 | 189 | 6.5 |
| Example 76 | 0.89 | 191 | 6.0 |
| Example 77 | 0.89 | 186 | 6.9 |
| Example 78 | 0.88 | 189 | 6.4 |
| Example 79 | 0.90 | 192 | 5.8 |
| Example 80 | 0.88 | 190 | 6.2 |
| Example 81 | 0.88 | 237 | 6.4 |
| Example 82 | 0.87 | 201 | 6.4 |

Properties of magnetic recording medium

| | Linear absorption ($\mu m^{-1}$) | Electromagnetic performance 4 MHz (dB) | Electromagnetic performance 7 MHz (dB) |
|---|---|---|---|
| Examples | | | |
| Example 73 | 1.66 | +2.4 | — |
| Example 74 | 1.68 | +2.2 | — |
| Example 75 | 1.53 | — | +2.6 |
| Example 76 | 1.58 | — | +2.2 |
| Example 77 | 1.57 | — | +2.5 |
| Example 78 | 1.56 | — | +2.3 |
| Example 79 | 1.58 | — | +2.1 |
| Example 80 | 1.56 | — | +2.6 |
| Example 81 | 1.84 | — | +5.5 |
| Example 82 | 1.50 | — | +4.5 |

Properties of magnetic recording medium

| | Durability | | |
|---|---|---|---|
| Examples | Running durability time (min) | Head contamination | Surface resistivity value ($\Omega/cm^2$) |
| Example 73 | 26.9 | A | $6.9 \times 10^7$ |
| Example 74 | 26.9 | A | $7.3 \times 10^7$ |
| Example 75 | 27.1 | A | $2.6 \times 10^8$ |
| Example 76 | 28.3 | A | $3.2 \times 10^8$ |
| Example 77 | 28.0 | A | $8.3 \times 10^7$ |
| Example 78 | 29.3 | A | $6.1 \times 10^7$ |
| Example 79 | 29.6 | A | $4.4 \times 10^7$ |
| Example 80 | 29.8 | A | $2.3 \times 10^8$ |
| Example 81 | 27.7 | A | $4.4 \times 10^7$ |
| Example 82 | 27.1 | A | $4.6 \times 10^8$ |

TABLE 24

| Comparative Examples | Reference tape | Properties of magnetic recording medium Coercive force value (kA/m) | (Oe) |
|---|---|---|---|
| Comparative Example 22 | Reference tape 2 | 79.6 | 1,000 |
| Comparative Example 23 | Reference tape 2 | 79.0 | 993 |
| Comparative Example 24 | Reference tape 2 | 78.9 | 992 |
| Comparative Example 25 | Reference tape 2 | 79.3 | 996 |
| Comparative Example 26 | Reference tape 2 | 78.6 | 988 |
| Comparative Example 27 | Reference tape 2 | 78.7 | 989 |
| Comparative Example 28 | Reference tape 2 | 79.0 | 993 |
| Comparative Example 29 | Reference tape 2 | 79.2 | 995 |
| Comparative Example 30 | Reference tape 2 | 78.8 | 990 |

Properties of magnetic recording medium

| Comparative Examples | Squareness (–) | Gloss (%) | Surface roughness Ra (nm) |
|---|---|---|---|
| Comparative Example 22 | 0.84 | 156 | 9.6 |
| Comparative Example 23 | 0.84 | 158 | 9.4 |
| Comparative Example 24 | 0.84 | 152 | 10.4 |
| Comparative Example 25 | 0.84 | 153 | 10.2 |
| Comparative Example 26 | 0.85 | 156 | 9.8 |
| Comparative Example 27 | 0.84 | 158 | 9.2 |
| Comparative Example 28 | 0.84 | 151 | 9.9 |
| Comparative Example 29 | 0.84 | 153 | 10.4 |
| Comparative Example 30 | 0.84 | 155 | 10.0 |

Properties of magnetic recording medium

| Comparative Examples | Linear absorption ($\mu m^{-1}$) | Electromagnetic performance 4 MHz (dB) | Electromagnetic performance 7 MHz (dB) |
|---|---|---|---|
| Comparative Example 22 | 1.21 | — | +0.3 |
| Comparative Example 23 | 1.06 | — | +0.2 |
| Comparative Example 24 | 1.21 | — | 0.0 |
| Comparative Example 25 | 1.22 | — | +0.4 |
| Comparative Example 26 | 1.09 | — | −0.1 |
| Comparative Example 27 | 1.22 | — | −0.3 |
| Comparative Example 28 | 1.21 | — | +0.3 |
| Comparative Example 29 | 1.09 | — | +0.2 |
| Comparative Example 30 | 1.23 | — | +0.2 |

Properties of magnetic recording medium

| | Durability | | |
|---|---|---|---|
| Comparative Examples | Running durability time (min) | Head contamination | Surface resistivity value ($\Omega/cm^2$) |
| Comparative Example 22 | 15.0 | C | $1.9 \times 10^{10}$ |
| Comparative Example 23 | 14.3 | C | $3.2 \times 10^{10}$ |
| Comparative Example 24 | 14.1 | C | $2.1 \times 10^{10}$ |
| Comparative Example 25 | 12.2 | C | $1.6 \times 10^{10}$ |
| Comparative Example 26 | 10.6 | C | $3.6 \times 10^{10}$ |
| Comparative Example 27 | 11.3 | C | $2.4 \times 10^{10}$ |

TABLE 24-continued

| | | | |
|---|---|---|---|
| Comparative Example 28 | 13.8 | C | 1.9 × 10¹⁰ |
| Comparative Example 29 | 14.3 | C | 3.1 × 10¹⁰ |
| Comparative Example 30 | 11.9 | C | 2.6 × 10¹⁰ |

TABLE 25

Production of black composite hematite particles
Coating with fluoroalkylsilane

| Examples and Comparative Examples | Kind of core particles | Additive Kind | Amount added (part by weight) |
|---|---|---|---|
| Example 84 | Core particles 1 | Tridecafluorooctyl trimethoxysilane | 2.0 |
| Example 85 | Core particles 2 | Heptadecafluorodecyl trimethoxysilane | 4.0 |
| Example 86 | Core particles 3 | Trifluoropropyl trimethoxysilane | 3.0 |
| Example 87 | Core particles 4 | Tridecafluorooctyl trimethoxysilane | 1.5 |
| Example 88 | Core particles 5 | Heptadecafluorodecyl trimethoxysilane | 5.0 |
| Example 89 | Core particles 6 | Tridecafluorooctyl trimethoxysilane | 2.0 |
| Example 90 | Core particles 7 | Heptadecafluorodecyl trimethoxysilane | 4.0 |
| Example 91 | Core particles 8 | Trifluoropropyl trimethoxysilane | 3.0 |
| Example 92 | Core particles 9 | Tridecafluorooctyl trimethoxysilane | 2.5 |
| Example 93 | Core particles 10 | Heptadecafluorodecyl trimethoxysilane | 5.0 |
| Comparative Example 31 | Core particles 1 | Tridecafluorooctyl trimethoxysilane | 1.0 |
| Comparative Example 32 | Core particles 3 | Tridecafluorooctyl trimethoxysilane | 0.5 |
| Comparative Example 33 | Core particles 3 | Tridecafluorooctyl trimethoxysilane | 0.005 |

Production of black composite hematite particles
Coating with fluoroalkylsilane

| Examples and Comparative Examples | Edge runner treatment Linear load (N/cm) | (kg/cm) | Time (min) | Coating amount (calculated as Si) (wt. %) |
|---|---|---|---|---|
| Example 84 | 588 | 60 | 30 | 0.11 |
| Example 85 | 294 | 30 | 30 | 0.19 |
| Example 86 | 588 | 60 | 45 | 0.37 |
| Example 87 | 441 | 45 | 45 | 0.08 |
| Example 88 | 588 | 60 | 30 | 0.23 |
| Example 89 | 294 | 30 | 30 | 0.10 |
| Example 90 | 588 | 60 | 45 | 0.18 |
| Example 91 | 441 | 45 | 45 | 0.36 |
| Example 92 | 588 | 60 | 30 | 0.14 |
| Example 93 | 294 | 30 | 30 | 0.23 |
| Comparative Example 31 | 588 | 60 | 30 | 0.05 |
| Comparative Example 32 | 588 | 60 | 30 | 0.02 |
| Comparative Example 33 | 588 | 60 | 30 | 2 × 10⁻⁴ |

TABLE 25-continued

Production of black composite hematite particles
Coating of carbon black

| Examples and Comparative Examples | Carbon black Kind | Amount added (part by weight) |
|---|---|---|
| Example 84 | B | 7.5 |
| Example 85 | B | 5.0 |
| Example 86 | C | 5.0 |
| Example 87 | C | 10.0 |
| Example 88 | D | 10.0 |
| Example 89 | B | 7.5 |
| Example 90 | B | 5.0 |
| Example 91 | C | 5.0 |
| Example 92 | C | 10.0 |
| Example 93 | D | 10.0 |
| Comparative Example 31 | — | — |
| Comparative Example 32 | B | 0.01 |
| Comparative Example 33 | C | 5.0 |

Production of black composite hematite particles
Coating of carbon black

| Examples and Comparative Examples | Edge runner treatment Linear load (N/cm) | (kg/cm) | Time (min) | Coating amount (calculated as C) (wt. %) |
|---|---|---|---|---|
| Example 84 | 588 | 60 | 30 | 6.96 |
| Example 85 | 588 | 60 | 30 | 4.75 |
| Example 86 | 294 | 30 | 60 | 4.74 |
| Example 87 | 294 | 30 | 30 | 9.09 |
| Example 88 | 441 | 45 | 30 | 9.08 |
| Example 89 | 441 | 45 | 45 | 6.97 |
| Example 90 | 588 | 60 | 30 | 4.75 |
| Example 91 | 588 | 60 | 20 | 4.75 |
| Example 92 | 294 | 30 | 30 | 9.05 |
| Example 93 | 294 | 30 | 30 | 9.08 |
| Comparative Example 31 | — | — | — | — |
| Comparative Example 32 | 588 | 60 | 30 | 0.01 |
| Comparative Example 33 | 588 | 60 | 30 | 4.74 |

TABLE 26

Properties of black composite hematite particles

| Examples and Comparative Examples | Average major axial diameter (average particle size) (μm) | Average minor axial diameter (μm) | Aspect ratio (–) | Geometrical standard deviation value (–) |
|---|---|---|---|---|
| Example 84 | 0.32 | — | — | 1.48 |
| Example 85 | 0.18 | — | — | 1.41 |
| Example 86 | 0.11 | — | — | 1.35 |
| Example 87 | 0.29 | — | — | 1.41 |
| Example 88 | 0.23 | 0.029 | 7.9:1 | 1.38 |
| Example 89 | 0.32 | — | — | 1.48 |
| Example 90 | 0.19 | — | — | 1.42 |
| Example 91 | 0.12 | — | — | 1.36 |
| Example 92 | 0.30 | — | — | 1.41 |
| Example 93 | 0.23 | 0.029 | 7.9:1 | 1.38 |
| Comparative Example 31 | 0.32 | — | — | 1.49 |

TABLE 26-continued

| | | | | |
|---|---|---|---|---|
| Comparative Example 32 | 0.11 | — | — | 1.35 |
| Comparative Example 33 | 0.12 | — | — | 1.35 |

Properties of black composite hematite particles

| Examples and Comparative Examples | BET specific surface area value (m²/g) | Mn content (wt. %) | Blackness (L* value) (—) | Volume resistivity value (Ω · cm) |
|---|---|---|---|---|
| Example 84 | 4.3 | 11.9 | 18.1 | $8.6 \times 10^3$ |
| Example 85 | 8.1 | 14.3 | 18.3 | $9.0 \times 10^3$ |
| Example 86 | 15.0 | — | 20.4 | $2.4 \times 10^4$ |
| Example 87 | 4.1 | — | 20.2 | $9.8 \times 10^3$ |
| Example 88 | 36.1 | — | 20.3 | $1.1 \times 10^4$ |
| Example 89 | 3.8 | 11.8 | 18.2 | $8.9 \times 10^3$ |
| Example 90 | 7.9 | 14.3 | 18.5 | $9.3 \times 10^3$ |
| Example 91 | 15.6 | — | 20.5 | $2.6 \times 10^4$ |
| Example 92 | 4.1 | — | 20.2 | $1.4 \times 10^4$ |
| Example 93 | 35.9 | — | 20.0 | $1.9 \times 10^4$ |
| Comparative Example 31 | 3.8 | 12.9 | 21.3 | $4.6 \times 10^7$ |
| Comparative Example 32 | 15.1 | — | 36.0 | $5.9 \times 10^8$ |
| Comparative Example 33 | 18.3 | — | 25.8 | $2.6 \times 10^8$ |

Properties of black composite hematite particles

| Examples and Comparative Examples | Carbon black desorption percentage (%) | Thickness of carbon black coated (μm) |
|---|---|---|
| Example 84 | 6.6 | 0.0024 |
| Example 85 | 7.7 | 0.0023 |
| Example 86 | 8.3 | 0.0023 |
| Example 87 | 6.4 | 0.0024 |
| Example 88 | 5.9 | 0.0024 |
| Example 89 | 4.3 | 0.0023 |
| Example 90 | 3.8 | 0.0022 |
| Example 91 | 1.6 | 0.0023 |
| Example 92 | 2.9 | 0.0024 |
| Example 93 | 4.1 | 0.0024 |
| Comparative Example 31 | — | — |
| Comparative Example 32 | — | — |
| Comparative Example 33 | 66.6 | — |

TABLE 27

| | Production conditions of magnetic recording medium Magnetic particles | |
|---|---|---|
| Examples and Comparative Examples | Kind | Amount blended (part by weight) |
| Example 94 | Magnetic particles used in Example 1 | 100.0 |
| Example 95 | Magnetic particles used in Example 1 | 100.0 |
| Example 96 | Magnetic particle 1 | 100.0 |
| Example 97 | Magnetic particle 1 | 100.0 |
| Example 98 | Magnetic particle 1 | 100.0 |
| Example 99 | Magnetic particle 1 | 100.0 |
| Example 100 | Magnetic particle 1 | 100.0 |
| Example 101 | Magnetic particle 1 | 100.0 |
| Example 102 | Magnetic particle 2 | 100.0 |
| Example 103 | Magnetic particle 3 | 100.0 |
| Comparative Example 34 | Magnetic particle 1 | 100.0 |
| Comparative Example 35 | Magnetic particle 1 | 100.0 |
| Comparative Example 36 | Magnetic particle 1 | 100.0 |

| | Production conditions of magnetic recording medium Filler | | Properties of magnetic coating composition |
|---|---|---|---|
| Examples and Comparative Examples | Kind | Amount blended (part by weight) | Viscosity (cP) |
| Example 94 | Example 84 | 7.0 | 2,541 |
| Example 95 | Example 85 | 7.0 | 2,464 |
| Example 96 | Example 86 | 10.0 | 2,711 |
| Example 97 | Example 87 | 14.0 | 2,832 |
| Example 98 | Example 88 | 21.0 | 2,659 |
| Example 99 | Example 89 | 7.0 | 2,720 |
| Example 100 | Example 90 | 7.0 | 2,791 |
| Example 101 | Example 91 | 15.0 | 2,883 |
| Example 102 | Example 92 | 10.0 | 7,156 |
| Example 103 | Example 93 | 7.0 | 5,938 |
| Comparative Example 34 | Comparative Example 31 | 7.0 | 2,844 |
| Comparative Example 35 | Comparative Example 32 | 7.0 | 2,304 |
| Comparative Example 36 | Comparative Example 33 | 7.0 | 3,685 |

TABLE 28

| | | Properties of magnetic recording medium Coercive force value | |
|---|---|---|---|
| Examples and Comparative Examples | Reference tape | (kA/m) | (Oe) |
| Example 94 | Reference tape 1 | 59.7 | 750 |
| Example 95 | Reference tape 1 | 59.5 | 748 |
| Example 96 | Reference tape 2 | 80.1 | 1,006 |
| Example 97 | Reference tape 2 | 80.4 | 1,010 |
| Example 98 | Reference tape 2 | 80.5 | 1,012 |
| Example 99 | Reference tape 2 | 79.7 | 1,001 |
| Example 100 | Reference tape 2 | 79.8 | 1,003 |
| Example 101 | Reference tape 2 | 80.3 | 1,009 |
| Example 102 | Reference tape 3 | 183.9 | 2,311 |
| Example 103 | Reference tape 4 | 201.3 | 2,530 |
| Comparative Example 34 | Reference tape 2 | 79.3 | 996 |
| Comparative Example 35 | Reference tape 2 | 78.8 | 990 |
| Comparative Example 36 | Reference tape 2 | 79.4 | 998 |

TABLE 28-continued

Properties of magnetic recording medium

| Examples and Comparative Examples | Squareness (-) | Gloss (%) | Surface roughness Ra (nm) |
|---|---|---|---|
| Example 94 | 0.87 | 188 | 6.8 |
| Example 95 | 0.87 | 186 | 6.9 |
| Example 96 | 0.88 | 193 | 6.4 |
| Example 97 | 0.88 | 196 | 6.2 |
| Example 98 | 0.88 | 199 | 6.0 |
| Example 99 | 0.89 | 198 | 6.2 |
| Example 100 | 0.89 | 196 | 6.1 |
| Example 101 | 0.89 | 196 | 6.3 |
| Example 102 | 0.88 | 241 | 6.0 |
| Example 103 | 0.87 | 210 | 6.0 |
| Comparative Example 34 | 0.84 | 155 | 10.1 |
| Comparative Example 35 | 0.83 | 152 | 10.2 |
| Comparative Example 36 | 0.82 | 141 | 11.0 |

Properties of magnetic recording medium

| | | Electromagnetic performance | |
|---|---|---|---|
| Examples and Comparative Examples | Linear absorption ($\mu m^{-1}$) | 4 MHz (dB) | 7 MHz (dB) |
| Example 94 | 1.65 | +2.1 | — |
| Example 95 | 1.66 | +2.1 | — |
| Example 96 | 1.54 | — | +2.1 |
| Example 97 | 1.58 | — | +2.2 |
| Example 98 | 1.58 | — | +2.3 |
| Example 99 | 1.54 | — | +2.3 |
| Example 100 | 1.56 | — | +2.4 |
| Example 101 | 1.58 | — | +2.2 |
| Example 102 | 1.83 | — | +2.2 |
| Example 103 | 1.49 | — | +2.3 |
| Comparative Example 34 | 1.22 | — | ±0.0 |
| Comparative Example 35 | 1.05 | — | +0.3 |
| Comparative Example 36 | 1.20 | — | +0.1 |

Properties of magnetic recording medium

| | Durability | | |
|---|---|---|---|
| Examples and Comparative Examples | Running durability time (min) | Head contamination | Surface resistivity ($\Omega/cm^2$) |
| Example 94 | 26.8 | A | $6.9 \times 10^7$ |
| Example 95 | 28.5 | A | $8.3 \times 10^7$ |
| Example 96 | 26.9 | A | $2.4 \times 10^8$ |
| Example 97 | 28.3 | A | $4.8 \times 10^8$ |
| Example 98 | 26.9 | A | $9.2 \times 10^7$ |
| Example 99 | 29.6 | A | $6.1 \times 10^7$ |
| Example 100 | 28.3 | A | $1.6 \times 10^7$ |
| Example 101 | ≧30 | A | $2.3 \times 10^8$ |
| Example 102 | 26.6 | A | $2.6 \times 10^7$ |
| Example 103 | 26.0 | A | $1.9 \times 10^8$ |
| Comparative Example 34 | 14.2 | C | $2.8 \times 10^{10}$ |
| Comparative Example 35 | 9.6 | D | $3.1 \times 10^{10}$ |
| Comparative Example 36 | 8.3 | D | $2.4 \times 10^{10}$ |

TABLE 29

Production of black composite hematite particles
Coating with alkoxysilane, polysiloxane or silicon compound
Additive

| Examples and Comparative Examples | Kind of core particles | Kind | Amount added (part by weight) |
|---|---|---|---|
| Example 105 | Core particles 1 | Methyl triethoxysilane | 1.0 |
| Example 106 | Core particles 2 | Methyl trimethoxysilane | 2.0 |
| Example 107 | Core particles 3 | Dimethyl dimethoxysilane | 1.5 |
| Example 108 | Core particles 4 | Phenyl triethoxysilane | 2.0 |
| Example 109 | Core particles 5 | Isobutyl trimethoxysilane | 1.0 |
| Example 110 | Core particles 6 | Methyl triethoxysilane | 1.5 |
| Example 111 | Core particles 7 | Methyl trimethoxysilane | 1.5 |
| Example 112 | Core particles 8 | TSF484 | 1.0 |
| Example 113 | Core particles 11 | BYK-080 | 1.0 |
| Example 114 | Core particles 10 | TSF4770 | 1.5 |
| Example 115 | Core particles 1 | Methyl triethoxysilane | 1.5 |
| Example 116 | Core particles 1 | Methyl triethoxysilane | 1.5 |
| Comparative Example 37 | Core particles 1 | — | — |
| Comparative Example 38 | Core particles 1 | Methyl triethoxysilane | 0.005 |
| Comparative Example 39 | Core particles 1 | Methyl triethoxysilane | 1.0 |
| Comparative Example 40 | Core particles 1 | γ-aminopropyl triethoxysilane | 1.0 |

Production of black composite hematite particles
Coating with alkoxysilane, polysiloxane or silicon compound

| | Edge runner treatment | | | Coating amount (calculated as Si) |
|---|---|---|---|---|
| Examples and Comparative Examples | Linear load (N/cm) | (kg/cm) | Time (min) | (wt. %) |
| Example 105 | 392 | 40 | 30 | 0.15 |
| Example 106 | 441 | 45 | 30 | 0.39 |
| Example 107 | 735 | 75 | 30 | 0.21 |
| Example 108 | 588 | 60 | 20 | 0.13 |
| Example 109 | 588 | 60 | 30 | 0.22 |
| Example 110 | 588 | 60 | 20 | 0.23 |
| Example 111 | 392 | 40 | 45 | 0.29 |
| Example 112 | 588 | 60 | 20 | 0.65 |
| Example 113 | 735 | 75 | 20 | 0.36 |
| Example 114 | 441 | 45 | 35 | 0.34 |
| Example 115 | 392 | 40 | 25 | 0.22 |
| Example 116 | 735 | 75 | 20 | 0.23 |
| Comparative Example 37 | — | — | — | — |
| Comparative Example 38 | 294 | 30 | 20 | $7 \times 10^{-4}$ |
| Comparative Example 39 | 294 | 30 | 20 | 0.15 |
| Comparative Example 40 | 294 | 30 | 20 | 0.13 |

TABLE 29-continued

| Examples and Comparative Examples | Production of black composite hematite particles Coating of carbon black Carbon black Kind | Amount added (part by weight) |
|---|---|---|
| Example 105 | A | 15.0 |
| Example 106 | A | 25.0 |
| Example 107 | B | 7.5 |
| Example 108 | B | 17.5 |
| Example 109 | C | 10.0 |
| Example 110 | C | 20.0 |
| Example 111 | D | 10.0 |
| Example 112 | D | 15.0 |
| Example 113 | B | 12.5 |
| Example 114 | B | 15.0 |
| Example 115 | E | 15.0 |
| Example 116 | F | 15.0 |
| Comparative Example 37 | B | 15.0 |
| Comparative Example 38 | C | 15.0 |
| Comparative Example 39 | D | 35.0 |
| Comparative Example 40 | D | 15.0 |

| Examples and Comparative Examples | Production of black composite hematite particles Coating of carbon black: Edge runner treatment, Linear load (N/cm) | Linear load (kg/cm) | Time (min) | Coating amount (calculated as C) (wt. %) |
|---|---|---|---|---|
| Example 105 | 588 | 60 | 20 | 13.01 |
| Example 106 | 588 | 60 | 30 | 19.88 |
| Example 107 | 392 | 40 | 30 | 6.92 |
| Example 108 | 735 | 75 | 25 | 14.69 |
| Example 109 | 392 | 40 | 45 | 9.05 |
| Example 110 | 294 | 30 | 40 | 16.48 |
| Example 111 | 735 | 75 | 30 | 9.00 |
| Example 112 | 588 | 60 | 25 | 12.99 |
| Example 113 | 588 | 60 | 20 | 11.04 |
| Example 114 | 294 | 30 | 20 | 12.96 |
| Example 115 | 588 | 60 | 20 | 13.00 |
| Example 116 | 588 | 60 | 30 | 12.95 |
| Comparative Example 37 | 294 | 30 | 20 | 13.01 |
| Comparative Example 38 | 294 | 30 | 20 | 13.00 |
| Comparative Example 39 | 294 | 30 | 20 | 25.88 |
| Comparative Example 40 | 294 | 30 | 20 | 12.99 |

TABLE 30

| Examples and Comparative Examples | Properties of black composite hematite particles: Average major axial diameter (average particle size) (μm) | Average minor axial diameter (μm) | Aspect ratio (—) | Geometrical standard deviation value (—) |
|---|---|---|---|---|
| Example 105 | 0.32 | — | — | 1.48 |
| Example 106 | 0.19 | — | — | 1.42 |
| Example 107 | 0.11 | — | — | 1.37 |
| Example 108 | 0.29 | — | — | 1.41 |
| Example 109 | 0.23 | 0.029 | 7.9:1 | 1.37 |
| Example 110 | 0.32 | — | — | 1.49 |
| Example 111 | 0.18 | — | — | 1.41 |
| Example 112 | 0.12 | — | — | 1.35 |
| Example 113 | 0.29 | — | — | 1.40 |
| Example 114 | 0.24 | 0.030 | 8.0:1 | 1.38 |
| Example 115 | 0.32 | — | — | 1.49 |
| Example 116 | 0.32 | — | — | 1.49 |
| Comparative Example 37 | 0.32 | — | — | — |
| Comparative Example 38 | 0.32 | — | — | — |
| Comparative Example 39 | 0.32 | — | — | — |
| Comparative Example 40 | 0.32 | — | — | — |

TABLE 30-continued

| and Comparative Examples | Properties of black composite hematite particles: BET specific surface area value ($m^2/g$) | Mn content (wt. %) | Blackness ($L^*$ value) (—) | Volume resistivity value (Ω · cm) |
|---|---|---|---|---|
| Example 105 | 7.4 | 11.3 | 17.4 | $4.0 \times 10^3$ |
| Example 106 | 13.3 | 12.3 | 17.9 | $5.3 \times 10^3$ |
| Example 107 | 17.6 | — | 19.6 | $8.4 \times 10^3$ |
| Example 108 | 7.6 | — | 18.4 | $5.6 \times 10^3$ |
| Example 109 | 38.9 | — | 18.3 | $7.9 \times 10^3$ |
| Example 110 | 8.8 | 10.7 | 17.3 | $3.5 \times 10^3$ |
| Example 111 | 10.0 | 13.9 | 18.0 | $6.0 \times 10^3$ |
| Example 112 | 18.7 | — | 19.2 | $4.4 \times 10^3$ |
| Example 113 | 7.5 | — | 18.6 | $5.1 \times 10^3$ |
| Example 114 | 40.1 | — | 18.0 | $5.8 \times 10^3$ |
| Example 115 | 7.6 | 11.2 | 17.4 | $1.6 \times 10^3$ |
| Example 116 | 9.2 | 11.2 | 17.4 | $1.1 \times 10^3$ |
| Comparative Example 37 | 15.8 | 11.4 | 19.2 | $4.1 \times 10^6$ |
| Comparative Example 38 | 14.2 | 11.3 | 19.6 | $2.6 \times 10^6$ |
| Comparative Example 39 | 16.6 | 9.6 | 19.2 | $1.6 \times 10^5$ |
| Comparative Example 40 | 12.8 | 11.3 | 19.9 | $1.3 \times 10^6$ |

| Examples and Comparative Examples | Properties of black composite hematite particles: Carbon black desorption percentage (%) | Thickness of carbon black coated (μm) |
|---|---|---|
| Example 105 | 8.1 | 0.0025 |
| Example 106 | 8.6 | 0.0026 |
| Example 107 | 7.9 | 0.0023 |
| Example 108 | 8.2 | 0.0024 |
| Example 109 | 7.8 | 0.0024 |
| Example 110 | 4.7 | 0.0026 |
| Example 111 | 3.8 | 0.0024 |
| Example 112 | 4.6 | 0.0025 |
| Example 113 | 4.5 | 0.0024 |
| Example 114 | 4.1 | 0.0024 |
| Example 115 | 9.8 | 0.0026 |
| Example 116 | 9.9 | 0.0027 |
| Comparative Example 37 | 69.2 | — |
| Comparative Example 38 | 56.3 | — |
| Comparative Example 39 | 23.2 | — |
| Comparative Example 40 | 51.6 | — |

TABLE 31

Properties of non-magnetic particles for non-magnetic undercoat layer

| Non-magnetic particles | Kind | Particle size | Average major axial diameter ($\mu$m) | Average minor axial diameter ($\mu$m) |
|---|---|---|---|---|
| Non-magnetic particles 1 | Hematite particles | Spindle-shaped | 0.187 | 0.0240 |
| Non-magnetic particles 2 | Goethite particles | Acicular | 0.240 | 0.0272 |
| Non-magnetic particles 3 | Hematite particles | Acicular | 0.143 | 0.0210 |
| Non-magnetic particles 4 | Hematite particles | Acicular | 0.115 | 0.0179 |
| Non-magnetic particles 5 | Hematite particles | Acicular | 0.143 | 0.0211 |
| Non-magnetic particles 6 | Goethite particles | Acicular | 0.240 | 0.0273 |

Properties of non-magnetic particles for non-magnetic undercoat layer

| Non-magnetic particles | Aspect ratio (–) | Geometrical standard deviation value (–) | BET specific surface area value (m$^2$/g) | Coating amount of Al (wt. %) |
|---|---|---|---|---|
| Non-magnetic particles 1 | 7.8:1 | 1.33 | 43.3 | — |
| Non-magnetic particles 2 | 8.8:1 | 1.37 | 86.3 | — |
| Non-magnetic particles 3 | 6.8:1 | 1.37 | 54.9 | 0.98 |
| Non-magnetic particles 4 | 6.4:1 | 1.35 | 58.3 | — |
| Non-magnetic particles 5 | 6.8:1 | 1.37 | 55.6 | — |
| Non-magnetic particles 6 | 8.8:1 | 1.35 | 88.1 | — |

Properties of non-magnetic particles for non-magnetic undercoat layer

| Non-magnetic particles | Al content (wt. %) | Amount of carbon black coated (calculated as C) (wt. %) | Volume resistivity value ($\Omega \cdot$ cm) | Blackness (L* value) (–) |
|---|---|---|---|---|
| Non-magnetic particles 1 | — | — | $8.6 \times 10^8$ | 32.6 |
| Non-magnetic particles 2 | — | — | $9.6 \times 10^7$ | 34.6 |
| Non-magnetic particles 3 | — | — | $4.6 \times 10^8$ | 28.4 |
| Non-magnetic particles 4 | 0.67 | — | $3.2 \times 10^8$ | 29.6 |
| Non-magnetic particles 5 | — | 4.75 | $3.6 \times 10^4$ | 18.5 |
| Non-magnetic particles 6 | — | 4.81 | $5.8 \times 10^3$ | 20.3 |

TABLE 32

Production of non-magnetic coating composition / Properties of non-magnetic coating composition

| Undercoat layer | Kind of non-magnetic particles | Weight ratio of particles to resin (–) | Viscosity (cP) |
|---|---|---|---|
| Undercoat layer 1 | Non-magnetic particles 1 | 5.0 | 315 |
| Undercoat layer 2 | Non-magnetic particles 2 | 5.0 | 1,139 |
| Undercoat layer 3 | Non-magnetic particles 3 | 5.0 | 448 |
| Undercoat layer 4 | Non-magnetic particles 4 | 5.0 | 403 |
| Undercoat layer 5 | Non-magnetic particles 5 | 5.0 | 399 |
| Undercoat layer 6 | Non-magnetic particles 6 | 5.0 | 1,336 |

Properties of non-magnetic undercoat layer

| Undercoat layer | Thickness ($\mu$m) | Gloss (%) | Surface roughness Ra (nm) |
|---|---|---|---|
| Undercoat layer 1 | 3.4 | 191 | 8.2 |
| Undercoat layer 2 | 3.5 | 180 | 12.0 |
| Undercoat layer 3 | 3.4 | 205 | 6.3 |
| Undercoat layer 4 | 3.4 | 211 | 6.2 |
| Undercoat layer 5 | 3.4 | 199 | 7.1 |
| Undercoat layer 6 | 3.5 | 185 | 9.0 |

Properties of non-magnetic undercoat layer

| Undercoat layer | Young's modulus (relative value) | Linear absorption ($\mu$m$^{-1}$) | Surface resistivity value ($\Omega$/cm$^2$) |
|---|---|---|---|
| Undercoat layer 1 | 124 | 1.03 | $1.5 \times 10^{14}$ |
| Undercoat layer 2 | 125 | 0.79 | $2.1 \times 10^{13}$ |
| Undercoat layer 3 | 126 | 1.01 | $3.5 \times 10^{13}$ |
| Undercoat layer 4 | 125 | 0.98 | $3.6 \times 10^{13}$ |
| Undercoat layer 5 | 125 | 1.52 | $4.1 \times 10^9$ |
| Undercoat layer 6 | 129 | 1.49 | $2.3 \times 10^{10}$ |

TABLE 33

Production conditions of reference tape

| Reference tape | Undercoat layer Kind | Magnetic particles Kind | Amount blended (part by weight) |
|---|---|---|---|
| Reference tape 5 | Undercoat layer 1 | Magnetic particles used in Example 104 | 100.0 |
| Reference tape 6 | Undercoat layer 2 | Magnetic particles 4 | 100.0 |
| Reference tape 7 | Undercoat layer 3 | Magnetic particle 5 | 100.0 |
| Reference tape 8 | Undercoat layer 4 | Magnetic particle 6 | 100.0 |

| Reference tape | Production conditions of reference tape Filler Kind | Amount blended (part by weight) | Properties of magnetic coating composition Viscosity (cP) |
|---|---|---|---|
| Reference tape 5 | $Al_2O_3$ | 7.0 | 2,611 |
| Reference tape 6 | $Al_2O_3$ | 7.0 | 2,590 |
| Reference tape 7 | $Al_2O_3$ | 7.0 | 8,753 |
| Reference tape 8 | $Al_2O_3$ | 7.0 | 6,392 |

TABLE 34

| Reference tape | Properties of reference tape Coercive force value (kA/m) | (Oe) |
|---|---|---|
| Reference tape 5 | 60.0 | 754 |
| Reference tape 6 | 79.7 | 1,001 |
| Reference tape 7 | 178.7 | 2,246 |
| Reference tape 8 | 197.4 | 2,480 |

| Reference tape | Squareness (–) | Gloss (%) | Surface roughness Ra (nm) |
|---|---|---|---|
| Reference tape 5 | 0.82 | 136 | 12.5 |
| Reference tape 6 | 0.83 | 147 | 11.9 |
| Reference tape 7 | 0.82 | 180 | 10.6 |
| Reference tape 8 | 0.80 | 157 | 12.0 |

| Reference tape | Linear absorption ($\mu m^{-1}$) | Electromagnetic performance 4 MHz (dB) | 7 MHz (dB) |
|---|---|---|---|
| Reference tape 5 | 1.11 | ±0 | — |
| Reference tape 6 | 1.08 | — | ±0 |
| Reference tape 7 | 1.17 | — | ±0 |
| Reference tape 8 | 1.10 | — | ±0 |

TABLE 34-continued

| Reference tape | Running durability time (min) | Head contamination | Friction coefficient (–) | Surface resistivity ($\Omega/cm^2$) |
|---|---|---|---|---|
| Reference tape 5 | 23.5 | A | 0.32 | $1.6 \times 10^{10}$ |
| Reference tape 6 | 22.0 | A | 0.32 | $4.0 \times 10^{10}$ |
| Reference tape 7 | 20.6 | B | 0.35 | $3.8 \times 10^{10}$ |
| Reference tape 8 | 21.3 | B | 0.40 | $7.1 \times 10^{10}$ |

TABLE 35

Production conditions of magnetic recording medium

| Examples and Comparative Examples | Undercoat layer Kind | Magnetic particle Kind | Amount blended (part by weight) |
|---|---|---|---|
| Example 117 | Undercoat layer 1 | Magnetic particle 4 | 100.0 |
| Example 118 | Undercoat layer 1 | Magnetic particle 4 | 100.0 |
| Example 119 | Undercoat layer 1 | Magnetic particle 5 | 100.0 |
| Example 120 | Undercoat layer 1 | Magnetic particle 5 | 100.0 |
| Example 121 | Undercoat layer 1 | Magnetic particle 5 | 100.0 |
| Example 122 | Undercoat layer 2 | Magnetic particle 5 | 100.0 |
| Example 123 | Undercoat layer 3 | Magnetic particle 5 | 100.0 |
| Example 124 | Undercoat layer 4 | Magnetic particle 6 | 100.0 |
| Example 125 | Undercoat layer 5 | Magnetic particle 5 | 100.0 |
| Example 126 | Undercoat layer 6 | Magnetic particle 5 | 100.0 |
| Example 127 | Undercoat layer 3 | Magnetic particle 5 | 100.0 |
| Example 128 | Undercoat layer 3 | Magnetic particle 5 | 100.0 |
| Comparative Example 41 | Undercoat layer 1 | Magnetic particle 4 | 100.0 |
| Comparative Example 42 | Undercoat layer 1 | Magnetic particle 4 | 100.0 |
| Comparative Example 43 | Undercoat layer 1 | Magnetic particle 5 | 100.0 |
| Comparative Example 44 | Undercoat layer 1 | Magnetic particle 5 | 100.0 |

| Examples | Production conditions of magnetic recording medium Filler Kind | Amount blended (part by weight) | Properties of magnetic coating composition Viscosity (cP) |
|---|---|---|---|
| Example 117 | Example 105 | 7.0 | 2,864 |
| Example 118 | Example 106 | 7.0 | 2,560 |
| Example 119 | Example 107 | 10.0 | 5,680 |
| Example 120 | Example 108 | 14.0 | 5,762 |
| Example 121 | Example 109 | 21.0 | 4,140 |

TABLE 35-continued

| | | | |
|---|---|---|---|
| Example 122 | Example 110 | 7.0 | 6,243 |
| Example 123 | Example 111 | 7.0 | 7,250 |
| Example 124 | Example 112 | 15.0 | 3,834 |
| Example 125 | Example 113 | 10.0 | 6,326 |
| Example 126 | Example 114 | 7.0 | 5,813 |
| Example 127 | Example 115 | 7.0 | 5,216 |
| Example 128 | Example 116 | 7.0 | 4,896 |
| Comparative Example 41 | Comparative Example 37 | 7.0 | 2,768 |
| Comparative Example 42 | Comparative Example 38 | 7.0 | 2,832 |
| Comparative Example 43 | Comparative Example 39 | 7.0 | 10,240 |
| Comparative Example 44 | Comparative Example 40 | 7.0 | 9,680 |

TABLE 36

| Examples and Comparative Examples | Reference tape | Properties of magnetic recording medium Coercive force value (kA/m) | (Oe) |
|---|---|---|---|
| Example 117 | Reference tape 2 | 79.3 | 996 |
| Example 118 | Reference tape 2 | 79.4 | 998 |
| Example 119 | Reference tape 3 | 180.5 | 2,268 |
| Example 120 | Reference tape 3 | 184.0 | 2,312 |
| Example 121 | Reference tape 3 | 182.9 | 2,298 |
| Example 122 | Reference tape 3 | 182.3 | 2,291 |
| Example 123 | Reference tape 3 | 181.7 | 2,283 |
| Example 124 | Reference tape 3 | 206.1 | 2,590 |
| Example 125 | Reference tape 3 | 182.5 | 2,293 |
| Example 126 | Reference tape 4 | 184.3 | 2,316 |
| Example 127 | Reference tape 3 | 180.5 | 2,268 |
| Example 128 | Reference tape 3 | 181.1 | 2,276 |
| Comparative Example 41 | Reference tape 3 | 177.5 | 2,231 |
| Comparative Example 42 | Reference tape 3 | 179.8 | 2,259 |
| Comparative Example 43 | Reference tape 3 | 180.5 | 2,268 |
| Comparative Example 44 | Reference tape 3 | 180.7 | 2,271 |

| Examples and Comparative Examples | Properties of magnetic recording medium | | |
|---|---|---|---|
| | Squareness (-) | Gloss (%) | Surface roughness Ra (nm) |
| Example 117 | 0.90 | 192 | 6.8 |
| Example 118 | 0.90 | 193 | 6.9 |
| Example 119 | 0.88 | 224 | 6.6 |
| Example 120 | 0.89 | 230 | 6.4 |
| Example 121 | 0.88 | 228 | 6.8 |
| Example 122 | 0.89 | 233 | 6.5 |
| Example 123 | 0.89 | 236 | 6.4 |
| Example 124 | 0.88 | 202 | 6.6 |
| Example 125 | 0.88 | 233 | 6.2 |

TABLE 36-continued

| Example 126 | 0.89 | 230 | 6.0 |
|---|---|---|---|
| Example 127 | 0.90 | 215 | 6.9 |
| Example 128 | 0.90 | 213 | 7.0 |
| Comparative Example 41 | 0.85 | 152 | 13.6 |
| Comparative Example 42 | 0.86 | 151 | 14.2 |
| Comparative Example 43 | 0.80 | 158 | 18.3 |
| Comparative Example 44 | 0.83 | 146 | 16.5 |

| Examples and Comparative Examples | Properties of magnetic recording medium | | |
|---|---|---|---|
| | Linear absorption ($\mu m^{-1}$) | Electromagnetic performance 4 MHz (dB) | 7 MHz (dB) |
| Example 117 | 1.35 | +2.2 | — |
| Example 118 | 1.37 | +2.3 | — |
| Example 119 | 1.36 | — | +2.3 |
| Example 120 | 1.41 | — | +2.4 |
| Example 121 | 1.42 | — | +2.4 |
| Example 122 | 1.42 | — | +2.3 |
| Example 123 | 1.46 | — | +2.5 |
| Example 124 | 1.48 | — | +2.4 |
| Example 125 | 1.50 | — | +2.5 |
| Example 126 | 1.43 | — | +2.4 |
| Example 127 | 1.35 | — | +2.2 |
| Example 128 | 1.36 | — | +2.2 |
| Comparative Example 41 | 1.16 | — | +0.3 |
| Comparative Example 42 | 1.13 | — | +0.1 |
| Comparative Example 43 | 1.19 | — | −1.3 |
| Comparative Example 44 | 1.10 | — | −1.3 |

| Examples and Comparative Examples | Properties of magnetic recording medium Durability | | |
|---|---|---|---|
| | Running durability time (min) | Head contamination | Surface resistivity ($\Omega/cm^2$) |
| Example 117 | 27.2 | B | $7.3 \times 10^7$ |
| Example 118 | 28.6 | A | $7.1 \times 10^7$ |
| Example 119 | 27.2 | B | $9.4 \times 10^7$ |
| Example 120 | ≧30 | A | $8.6 \times 10^7$ |
| Example 121 | 26.9 | B | $6.9 \times 10^7$ |
| Example 122 | 28.8 | B | $5.1 \times 10^7$ |
| Example 123 | ≧30 | A | $4.3 \times 10^7$ |
| Example 124 | ≧30 | A | $6.1 \times 10^7$ |
| Example 125 | 28.6 | A | $1.3 \times 10^7$ |
| Example 126 | 27.5 | A | $3.1 \times 10^7$ |
| Example 127 | 25.0 | B | $3.2 \times 10^7$ |
| Example 128 | 25.5 | B | $2.5 \times 10^7$ |
| Comparative Example 41 | 11.6 | D | $7.6 \times 10^9$ |
| Comparative Example 42 | 14.6 | C | $8.6 \times 10^9$ |
| Comparative Example 43 | 15.2 | C | $8.3 \times 10^9$ |
| Comparative Example 44 | 12.3 | C | $7.6 \times 10^9$ |

What is claimed is:

1. A magnetic recording medium comprising:
a non-magnetic base film; and
a magnetic recording layer comprising a binder resin, magnetic particles, and as a filler black composite hematite particles having an average diameter of 0.08 to 1.0 μm and comprising:
hematite particles as core particles;
an organosilicon coating layer formed on the surface of said hematite particle, comprising at least one organosilicon compound selected from the group consisting of:
(1) organosilane compounds obtained from alkoxysilane compounds,
(2) polysiloxanes or modified polysiloxanes, and
(3) fluoroalkyl organosilane compounds obtained from fluoroalkylsilane compounds; and
a carbon black coating formed on said organosilicon coating layer, in an amount of 1 to 30 parts by weight based on 100 parts by weight of said hematite particles.

2. A magnetic recording medium according to claim 1, wherein said fluoroalkylsilane compounds are represented by the general formula (VII):

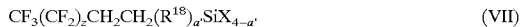

$$CF_3(CF_2)_z CH_2 CH_2 (R^{18})_{a'} SiX_{4-a'} \quad \text{(VII)}$$

wherein $R^{18}$ is $CH_3$—, $C_2H_5$—, $CH_3O$— or $C_2H_5O$—; X is $CH_3O$— or $C_2H_5O$—; and z is an integer of 0 to 15; and a is an integer of 0 to 3.

3. A magnetic recording medium according to claim 1, wherein said hematite particles are manganese-containing hematite particles.

4. A magnetic recording medium according to claim 1, wherein the amount of said organosilicon compound coating is 0.02 to 5.0% by weight, calculated as Si, based on the total weight of the organosilicon compounds and said hematite particles.

5. A magnetic recording medium according to claim 1, wherein said carbon black coating is obtained by mixing carbon black fine particles having a particle size of 0.002 to 0.05 μm with the organosilicon coated hematite particles while applying a shear force.

6. A magnetic recording medium according to claim 1, wherein the amount of said black composite hematite particles as a filler is 1 to 30 parts by weight based on 100 parts by weight of said magnetic particles.

7. A magnetic recording medium according to claim 1, which further comprises a gloss of the coating film of the magnetic recording layer of 160 to 300%, a surface roughness Ra of the coating film of the magnetic recording layer of not more than 10.0 nm, a linear absorption of the coating film of the magnetic recording layer of 1.20 to 5.00 μm$^{-1}$, and a surface resistivity of not more than $1.0 \times 10^{10}$ Ω/cm$^2$.

8. A magnetic recording medium according to claim 1, wherein said hematite core particles have an oxide or hydroxide coating thereon comprising at least one compound selected from the group consisting of hydroxides of aluminum, oxides of aluminum, hydroxides of silicon and oxides of silicon in an amount of 0.01 to 50% by weight, calculated as Al or SiO$_2$, based on the total weight of the hematite particles,
the oxide or hydroxide coating being formed on at least part of the surface of the hematite core particle, and between the organosilicon coating layer and the surface of hematite core particle.

9. A magnetic recording medium according to claim 1, which further comprises a gloss of the coating film of the magnetic recording layer of 165 to 300%, a surface roughness Ra of the coating film of the magnetic recording layer of not more than 9.5 nm, a linear absorption of the coating film of the magnetic recording layer of 1.20 to 5.00 μm$^{-1}$, and a surface resistivity of not more than $1.0 \times 10^{10}$ Ω/cm$^2$.

10. A magnetic recording medium according to claim 1 or 8, wherein said magnetic particles are magnetic acicular metal particles containing iron as a main component.

11. A magnetic recording medium according to claim 1 or 8, which further comprises a non-magnetic undercoat layer disposed between said non-magnetic base film and said magnetic recording layer.

12. A magnetic recording medium according to claim 1, wherein said modified polysiloxanes are selected from the group consisting of:
(A) polysiloxanes modified with at least one compound selected from the group consisting of polyethers, polyesters and epoxy compounds, and
(B) polysiloxanes whose molecular terminal is modified with at least one group selected from the group consisting of carboxylic acid groups, alcohol groups and a hydroxyl group.

13. A magnetic recording medium according to claim 12, wherein said polysiloxanes modified with at least one compound selected from the group consisting of polyethers, polyesters and epoxy compounds are represented by the general formula (III), (IV) or (V):

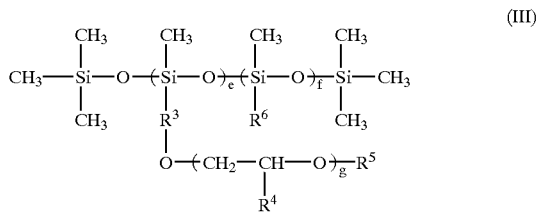

wherein $R^3$ is —($-CH_2-$)$_h$—; $R^4$ is —($-CH_2-$)$_i$—$CH_3$; $R^5$ is —OH, —COOH, —CH=CH$_2$, —C(CH$_3$)=CH$_2$ or —($-CH_2-$)$_j$—CH$_3$; $R^6$ is —($-CH_2-$)$_k$—CH$_3$; g and h are an integer from 1 to 15; i, j and k are an integer from 0 to 15; e is an integer from 1 to 50; and f is an integer from 1 to 300;

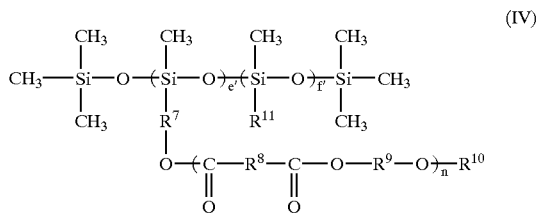

wherein $R^7$, $R^8$ and $R^9$ are —($-CH_2-$)$_q$— and may be the same or different; $R^{10}$ is —OH, —COOH, —CH=CH$_2$, —C(CH$_3$)=CH$_2$ or —($-CH_2-$)$_r$—CH$_3$; $R^{11}$ is —($-CH_2-$)$_s$—CH$_3$; n and q are an integer of 1 to 15; r and s are an integer of 0 to 15; e' is an integer of 1 to 50; and f is an integer of 1 to 300; or

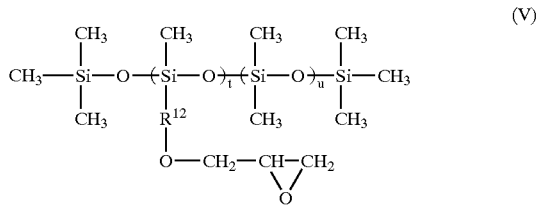

wherein $R^{12}$ is —($-CH_2-$)$_v$—; v is an integer of 1 to 15; t is an integer of 1 to 50; and u is an integer of 1 to 300.

14. A magnetic recording medium according to claim 12, wherein said polysiloxanes whose molecular terminal is modified with at east one group selected from the group consisting of carboxylic acid groups, alcohol groups and a hydroxyl group are represented by the general formula (VI):

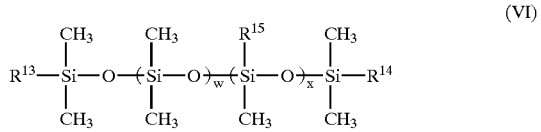

(VI)

wherein $R^{13}$ and $R^{14}$ are —OH, $R^{16}$OH or $R^{17}$COOH and may be the same or different; $R^{15}$ is —CH$_3$ or —C$_6$H$_5$; $R^{16}$ and $R^{17}$ are —(—CH$_2$—)$_y$—; y is an integer from 1 to 15; w is a integer from 1 to 200; and x is an integer of 0 to 100.

15. A magnetic recording medium according to claim 1, wherein said alkoxysilane compound is represented by the general formula (I):

(I)

wherein $R^1$ is $C_6H_5$—, $(CH_3)_2CHCH_2$— or n-$C_bH_{2b+1}$— wherein b is an integer of 1 to 18; X is CH$_3$O— or C$_2$H$_5$O—; and a is an integer of 0 to 3.

16. A magnetic recording medium according to claim 15, wherein said alkoxysilane compound is methyl triethoxysilane, dimethyl diethoxysilane, phenyl triethoxysilane, diphenyl diethoxysilane, methyl trimethoxysilane, dimethyl dimethoxysilane, phenyl trimethoxysilane, diphenyl dimethoxysilane, isobutyl trimethoxysilane or decyl trimethoxysilane.

17. A magnetic recording medium according to claim 1, wherein said polysiloxanes are represented by the general formula (II):

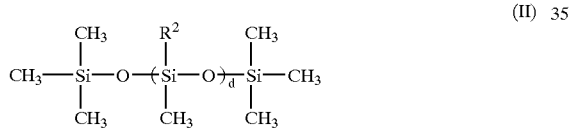

(II)

wherein $R^2$ is H— or particle, particle-, and d is an integer of 15 to 450.

18. A magnetic recording medium according to claim 17, wherein said polysiloxanes have methyl hydrogen siloxane units.

19. A magnetic recording medium according to claim 1, wherein the thickness of said carbon black coating is not more than 0.04 μm.

20. A magnetic recording medium according to claim 19, which further comprises a gloss of the surface of the magnetic recording layer of 165 to 300%, a surface roughness Ra of the coating film of the magnetic recording layer of not more than 9.5 nm, a linear absorption of the coating film of the magnetic recording layer of 1.30 to 5.00 μm$^{-1}$, and a surface resistivity of not more than $1.0 \times 10^9$ Ω/cm$^2$.

21. A filler comprising black composite hematite particles having an average diameter of 0.08 to 1.0 μm and comprising:

hematite particles as core particles;

an organosilicon coating layer formed on surface of said hematite particle, comprising at least one organosilicon compound selected from the group consisting of:
(1) organosilane compounds obtained from alkoxysilane compounds,
(2) polysiloxanes or modified polysiloxanes, and
(3) fluoroalkyl organosilane compounds obtained from fluoroalkylsilane compounds; and a carbon black coating formed on said organosilicon coating layer comprising at least one organosilicon compound, in an amount of 1 to 30 parts by weight based on 100 parts by weight of said hematite particles.

22. A filler according to claim 21, wherein the thickness of said carbon black coating is not more than 0.04 μm.

23. A filler according to claim 21, wherein said hematite core particles have an oxide or hydroxide coating thereon comprising at least one compound selected from the group consisting of hydroxides of aluminum, oxides of aluminum, hydroxides of silicon and oxides of silicon in an amount of 0.01 to 50% by weight, calculated as Al or SiO2, based on the total weight of the hematite particles, the oxide or hydroxide coating being formed on at least part of the surface of the hematite core particle, and between the organosilicon coating layer and the surface of hematite particle.

* * * * *